United States Patent
Sapoznik et al.

(10) Patent No.: US 9,807,037 B1
(45) Date of Patent: Oct. 31, 2017

(54) AUTOMATICALLY SUGGESTING COMPLETIONS OF TEXT

(71) Applicant: ASAPP, INC, New York, NY (US)

(72) Inventors: Gustavo Sapoznik, Miami, FL (US); Shawn Henry, Brooklyn, NY (US)

(73) Assignee: ASAPP, INC., New York, NY (US)

( * ) Notice: Subject to any disclaimer, the term of this patent is extended or adjusted under 35 U.S.C. 154(b) by 26 days.

(21) Appl. No.: 15/254,041

(22) Filed: Sep. 1, 2016

Related U.S. Application Data

(60) Provisional application No. 62/359,841, filed on Jul. 8, 2016.

(51) Int. Cl.

| | | |
|---|---|---|
| H04L 12/58 | (2006.01) | |
| H04L 29/08 | (2006.01) | |
| G06Q 10/10 | (2012.01) | |
| G06F 17/28 | (2006.01) | |
| G06Q 30/00 | (2012.01) | |
| G06F 17/27 | (2006.01) | |
| H04L 12/24 | (2006.01) | |

(52) U.S. Cl.
CPC .............. *H04L 51/02* (2013.01); *H04L 51/32* (2013.01); *H04L 67/02* (2013.01); *H04L 67/20* (2013.01); *H04L 67/306* (2013.01); *G06F 17/271* (2013.01); *G06F 17/28* (2013.01); *G06Q 10/1053* (2013.01); *G06Q 30/01* (2013.01); *H04L 41/04* (2013.01)

(58) Field of Classification Search
CPC ............. G06F 17/271; G06F 17/30684; G06F 17/2785; G06F 17/28; G06F 17/3064
See application file for complete search history.

(56) References Cited

U.S. PATENT DOCUMENTS

| | | |
|---|---|---|
| 6,981,040 B1 | 12/2005 | Konig et al. |
| 7,644,057 B2 | 1/2010 | Nelken et al. |
| 8,577,671 B1 | 11/2013 | Barve et al. |
| 8,626,509 B2 | 1/2014 | Roy et al. |
| 9,336,269 B1 | 5/2016 | Smith et al. |
| 2003/0033288 A1* | 2/2003 | Shanahan ........... G06F 17/3064 |
| 2005/0105712 A1* | 5/2005 | Williams ............. G10L 13/027 |
| | | 379/265.02 |

(Continued)

OTHER PUBLICATIONS

"Scikit-learn: Machine Learning in Python", scikit-learn 0.17.1 documentation, hilp://scikit-learn.org/stable/ (accessed on Sep. 20, 2016), 3 pages.

(Continued)

*Primary Examiner* — Barbara B Anyan
(74) *Attorney, Agent, or Firm* — GTC Law Group PC & Affiliates

(57) ABSTRACT

A user may respond to a request of another user by entering text, such as a customer service representative responding to a customer. As the responding user enters text, a completion of the text may be suggested to the responding user so that the responding user may select the completion instead of continuing to enter text. Previous messages between the two users and other information may be used to determine an appropriate completion to the entered text. A topic vector may be determined from previous messages, and a feature vector may be determined from the entered text. The topic vector and the feature vector may be used to identify characters that may follow the entered text.

20 Claims, 39 Drawing Sheets

(56) References Cited

U.S. PATENT DOCUMENTS

| | | | |
|---|---|---|---|
| 2005/0228790 A1* | 10/2005 | Ronnewinkel | G06Q 10/107 |
| 2007/0094217 A1* | 4/2007 | Ronnewinkel | G06F 17/30707 706/52 |
| 2007/0100618 A1 | 5/2007 | Lee et al. | |
| 2008/0091435 A1 | 4/2008 | Strope et al. | |
| 2011/0082825 A1* | 4/2011 | Sathish | G06Q 10/1053 706/46 |
| 2012/0053945 A1 | 3/2012 | Gupta et al. | |
| 2013/0317808 A1 | 11/2013 | Kruel et al. | |
| 2014/0075004 A1* | 3/2014 | Van Dusen | H04L 41/04 709/223 |
| 2014/0317030 A1* | 10/2014 | Shen | G06Q 30/01 706/12 |
| 2015/0006143 A1* | 1/2015 | Skiba | G06F 17/271 704/2 |
| 2015/0032724 A1 | 1/2015 | Thirugnanasundaram et al. | |
| 2015/0142704 A1 | 5/2015 | London | |
| 2015/0228275 A1 | 8/2015 | Watanabe et al. | |
| 2015/0363393 A1 | 12/2015 | Williams et al. | |
| 2016/0163311 A1 | 6/2016 | Crook et al. | |
| 2016/0163314 A1 | 6/2016 | Fujii et al. | |
| 2016/0247068 A1* | 8/2016 | Lin | G06F 17/28 |

OTHER PUBLICATIONS

Al-Rfou, et al., "Conversational Contextual Cues: The Case of Personalization and History for Response Ranking", CoRR abs/1606.00372, http://arxiv.org/abs/1606.00372, 2016, 10 pages.

Bahdanau, et al., "Neural Machine Translation by Jointly Learning to Align and Translate", CoRR abs/1409.0473, http://arxiv.org/abs/1409.0473, 2014, 15 pages.

Bengio, et al., "A Neural Probabilistic Language Model", Journal of Machine Learning Research, vol. 3 accessed at http://www.jmlr.org/papers/volume3/bengio03a/bengio03a.pdf, 2003 (accessed on Jan. 3, 2017), pp. 1137-1155.

Brown, et al., "Class-Based n-gram Models of Natural Language", Computational Linguistics, vol. 18, No. 4, accessed at http://aclweb.org/anthology/J/J92/J92-4003.pdf, 1992, pp. 467-479 (accessed on Jan. 3, 2017).

Carrier, et al., "LSTM Networks for Sentiment Analysis", http://deeplearning.net/tutorial/lstm.html, accessed on Sep. 20, 2016, 5 pages.

Chen, "An empirical investigation of sparse log-linear models for improved dialogue act classification.", 2013 IEEE International Conference on Acoustics, Speech and Signal Processing. IEEE, 2013, pp. 1-6.

Courbarius, et al., "BinaryConnect: Training Deep Neural Networks with binary weights during propagations", CoRR, accessed at https://arxiv.org/pdf/1511.00363v3.pdf, 2015 (Jan. 3, 2017), 9 pages.

Gong, et al., "Iterative Quantization: A Procrustean Approach to Learning Binary Codes", CVPR 2011, accessed at http://www.cs.unc.edu/~lazebnik/publications/cypr11_small_code.pdf, 2011 (accessed on Jan. 3, 2017), pp. 817-824.

Hochreitner, et al., "Long Short-Term Memory", Neural Computation, vol. 9, Iss. 8, accessed at http://deeplearning.cs.cmu.edu/pdfs/Hochreiter97_lstm.pdf, 1997 (accessed on Jan. 3, 2017), pp. 1735-1780.

Ji, et al. "An Information Retrieval Approach to Short Text Conversation", CoRR, accessed at https://arxiv.org/pdf/1408.6988v1.pdf, Aug. 29, 2014 (accessed on Jan. 3, 2017), 21 pages.

Karpathy, "The Unreasonable Effectiveness of Recurrent Neural Networks", http://karpathy.github.io/2015/05/21/rnn-effectiveness/, (accessed on Sep. 20, 2016), May 21, 2015, 42 pages.

Kim, et al., "Character-Aware Neural Language Models", CoRR abs/1508.06615, http://arxiv.org/abs/1508.06615, 2015, 9 pages.

Kim, "Convolutional Neural Networks for Sentence Classification", Proceedings of the 2014 Conference on Empirical Methods in Natural Language Processing (EMNLP), Oct. 25-29, 2014, Doha, Qatar, 2014, pp. 1746-1751.

Lai, et al. "Recurrent Convolutional Neural Networks for Text Classification", AAAI'15 Proceedings of the Twenty-Ninth AAAI Conference on Artificial Intelligence, 2015, pp. 2267-2273.

Lai, et al., "Simultaneous Feature Learning and Hash Coding with Deep Neural Networks", CoRR, accessed at http://www.cv-foundation.org/openaccess/content_cvpr_2015/papers/Lai_Simultaneous_Feature_Learning_2015_CVPRpaper.pdf, 2015 (accessed Jan. 3, 2017), pp. 3270-3278.

Larochelle, et al., "A Neural Autoregressive Topic Model", Advances in Neural Information Processing Systems 25, Editors: F. Pereira and C. J. C. Burges and L. Bottou and K. Q. Weinberger, Published by Curran Associates, Inc., 2012, pp. 2708-2716.

Lee, et al., "Robust Dialog Management with N-best Hypotheses Using Dialog Examples and Agenda", Proceedings of ACL-08: HLT, Columbus, Ohio, Jun. 2008, pp. 630-637.

Levy, et al., "Neural Word Embedding as Implicit Matrix Factorization", Advances in Neural Information Processing Systems 27: Annual Conference on Neural Information Processing Systems 2014, Dec. 8-13, 2014, Montreal, Quebec, Canada, http://papers.nips.cc/paper/5477-neural-word-embedding-as-implicit-matrix-factorization.pdf, 2014, pp. 2177-2185.

Li, et al., "A Hierarchical Neural Autoencoder for Paragraphs and Documents", Proceedings of the 53rd Annual Meeting of the Association for Computational Linguistics and the 7th International Joint Conference on Natural Language Processing, Beijing, China, http://web.stanford.edu/~jurafsky/pubs/P15-1107.pdf, Jul. 26-31, 2015 (accessed on Jan. 3, 2017), pp. 1106-1115.

Miao, et al., "Neural Variational Inference for Text Processing", CoRR abs/1511.06038, http://arxiv.org/abs/1511.06038, 2015, 15 pages.

Mikolov, et al., "Distributed Representations of Words and Phrases and their Compositionality", CoRR abs/1310.4546, http://arxiv.org/abs/1310.4546, 2013, 9 pages.

Mikolov, et al., "Distributed Representations ofWords and Phrases and their Compositionality", CoRR, accessed at https://papers.nips.cc/paper/5021-distributed-representations-of-words-and-phrases-and-their-compositionality.pdf, 2013 (accessed on Jan. 3, 2017), 9 pages.

Mikolov, et al., "Recurrent neural network based language model", Interspeech 2010, Sep. 26-30, 2010, Makuhari, Chiba, Japan, 2010, pp. 1045-1048.

Mikolov, et al., "Recurrent neural network based language model", INTERSPEECH 2010, Makuhari, Chiba, Japan, accessed at http://www.fit.vutbr.cz/research/groups/speech/publi/2010/mikolov_interspeech2010_IS100722.pdf, Sep. 26-30, 2010 (accessed on Jan. 3, 2017), pp. 1045-1048.

Rush, et al., "Optimal Beam Search for Machine Translation", Proceedings of EMNLP 2013, Oct. 18-21, 2013, Seattle, Washington, USA, 2013, 12 pages.

Shi, et al., "Contextual spoken language understanding using recurrent neural networks.", 2015 IEEE International Conference on Acoustics, Speech and Signal Processing (ICASSP). IEEE, 2015, pp. 5271-5275.

Sutskever, et al., "Sequence to Sequence Learning with Neural Networks", CoRR abs/1409.3215, http://arxiv.org/abs/1409.3215, 2014, 9 pages.

Tai, et al., "Improved Semantic Representations From Tree-Structured Long Short-Term Memory Networks", CoRR, accessed at https://arxiv.org/pdf/1503.00075v3.pdf, 2015 (accessed on Jan. 3, 2017), 11 pages.

Vinyals, et al., "A Neural Conversational Model", CoRR abs/1506.05869, http://arxiv.org/abs/1506.05869, 2015, 8 pages.

Zhang, et al., "Character-level Convolutional Networks for Text Classification", CoRR abs/1509.01626, http://arxiv.org/abs/1509.01626, 2015, 9 pages.

U.S. Appl. No. 15/254,008, filed Sep. 1, 2016, Pending.
U.S. Appl. No. 15/254,061, filed Sep. 1, 2016, pending.
U.S. Appl. No. 15/254,086, filed Sep. 1, 2016, Pending.
U.S. Appl. No. 15/254,101, filed Sep. 1, 2016, Pending.
PCT/US2016/049896, Sep. 1, 2016, Pending.
U.S. Appl. No. 15/383,603, filed Dec. 19, 2016, Pending.
U.S. Appl. No. 15/383,707, filed Dec. 19, 2016, Pending.

* cited by examiner

1810

| Don Miller | 05:03 |
| GENERAL BILLING ISSUE | |

Waiting for reply...

| Ray Jackson | 06:07 |
| PAYMENT | |

The strange charge on my account is still there. I tried to fix it myself...

| Cathy Washington | 01:25 |
| GENERAL BILLING ISSUE | |

I need to pay the bill to my account and...

| Julie Cooper ⊘ | 00:13 |
| INVALID PURCHASE | |

Waiting for reply...

| John Allen ⊘ | 00:13 |
| GENERAL BILLING ISSUE | |

GREAT! Thanks so much for helping me.

EMPTY SLOT

EMPTY SLOT

1820

[ TIME OUT ] [ TRANSFER ] [ END ]

——— OPENED SERVICE CHAT: 10:08AM ———

( How can we help you? )

( I need to pay the bill to my account and cancel the movie that was billed to me )

( Before a representative joins the chat, please provide your pin and account number so we can view your account. )

( ****○ and 1123454350 ○ )

——— 10:10AM ———
You are now connected with Cathy type here

1830

🔍

Dec 28, 2016  • [ Chat ]          Current
                  General Billing Issue New Events Past Events Dec 22, 2016  • Customer Profile
                Email Change Dec 22, 2016  • Customer Profile
                Address Change Dec 22, 2016  • [ Chat ]          RESOLVED
                  Account Access Dec 04, 2016  • Service Change
                Cancelled Satellite Service Dec 04, 2016  • [ Chat ]          RESOLVED
                  Billing Issues

| Knowledge Base | Customer History | • Customer Profile |

Left panel (1810):

| Don Miller | 05:03 |
GENERAL BILLING ISSUE
Waiting for reply...

| Ray Jackson | 00:07 |
PAYMENT
The strange charge on my account is still there. I tried to fix it myself...

| Cathy Washington | 01:25 |
GENERAL BILLING ISSUE
I need to pay the bill to my account and...

| Julie Cooper ⊘ | 00:13 |
INVALID PURCHASE
Waiting for reply...

| John Allen ⊘ | 00:13 |
GENERAL BILLING ISSUE
GREAT! Thanks so much for helping me.

EMPTY SLOT

EMPTY SLOT

Middle panel (1820):

[TIME OUT] [TRANSFER] [END]

——OPENED SERVICE CHAT: 10:08AM——

How can we help you?

I need to pay the bill to my account and cancel the movie that was billed to me

Before a representative joins the chat, please provide your pin and account number so we can view your account.

✓and112354350✓

——10:10AM——
You are now connected with Cathy

Hello there Cathy! I'll be more than happy to assist you today. I would love to check on that. Please give me a moment will I look through your account.

type here

Right panel (1830):

🔍 search...

RETURN TO ACCOUNT DETAILS

● 11/15/2016-12/15/2016

| $126.22 | $0.00 | $0.00 | $0.00 |
| Today's Balance | Unbilled Charges | Past Due Amount | Credits |

[More Info] [Refund]

| 12/11 | Movie | $5.99 |
| 12/10 | Internet: Misc Charge | $00.00 |
| 12/10 | Movie Channel Charge | $00.00 |
| 12/05 | Internet: Misc Charge | $00.00 |
| 12/01 | Internet: Misc Charge | $00.00 |
| 11/30 | Movie Channel Charge | $00.00 |
| 11/28 | Internet: Misc Charge | $00.00 |
| 11/20 | Movie Channel Charge | $00.00 |
| 11/19 | Internet: Misc Charge | $00.00 |

● 10/15/2016-11/15/2016          $138.26
                           Statement Paid ● 9/15/2016-10/15/2016           $112.38
                           Statement Paid ● 8/15/2016-9/15/2016            $121.98
                           Statement Paid Knowledge Base | Customer History | ● Customer Profile

| | | | |
|---|---|---|---|
| Don Miller | 05:03 | | |
| GENERAL BILLING ISSUE | | | |
| Waiting for reply... | | | |
| Ray Jackson | 00:07 | | |
| PAYMENT | | | |
| The strange charge on my account is still there. I tried to fix it myself... | | | |
| Cathy Washington | 01:25 | | |
| GENERAL BILLING ISSUE | | | |
| I need to pay the bill to my account and... | | | |
| Julie Cooper | 00:13 | | |
| INVALID PURCHASE | | | |
| Waiting for reply... | | | |
| John Allen | 00:13 | | |
| GENERAL BILLING ISSUE | | | |
| GREAT! Thanks so much for helping me. | | | |

1810

1820

| TIME OUT | TRANSFER | END |

OPENED SERVICE CHAT: 10:08AM

How can we help you?

I need to pay the bill to my account and cancel the movie that was billed to me

Before a representative joins the chat, please provide your pin and account number so we can view your account.

10:10AM

You are now connected with Cathy

Hello there Cathy! I'll be more than happy to assist you today. I would love to check on that. Please give me a moment will I look through your account.

SUGGESTED RESPONSE:
There is currently no pin setup for you account, which is why you have unwanted purchases.
Would you like me to provide you the steps on how to set it up to your email on file: cathyw@aol.com?

type here

1830

Q search...

RETURN TO ACCOUNT DETAILS

• 11/15/2016-12/15/2016

| $126.22 | $0.00 | $0.00 | $0.00 |
|---|---|---|---|
| Today's Balance | Unbilled Charges | Past Due Amount | Credits |

| 12/11 | Movie 1 | $5.99 |
| 12/10 | Internet: Misc Charge | $00.00 |
| 12/10 | Movie Channel Charge | $00.00 |
| 12/05 | Internet: Misc Charge | $00.00 |
| 12/01 | Internet: Misc Charge | $00.00 |
| 11/30 | Movie Channel Charge | $00.00 |
| 11/28 | Internet: Misc Charge | $00.00 |
| 11/20 | Movie Channel Charge | $00.00 |
| 11/19 | Internet: Misc Charge | $00.00 |

1821

• 10/15/2016-11/15/2016            $138.26
                                  Statement Paid

• 9/15/2016-10/15/2016             $112.33
                                  Statement Paid

| Knowledge Base | Customer History | • Customer Profile |

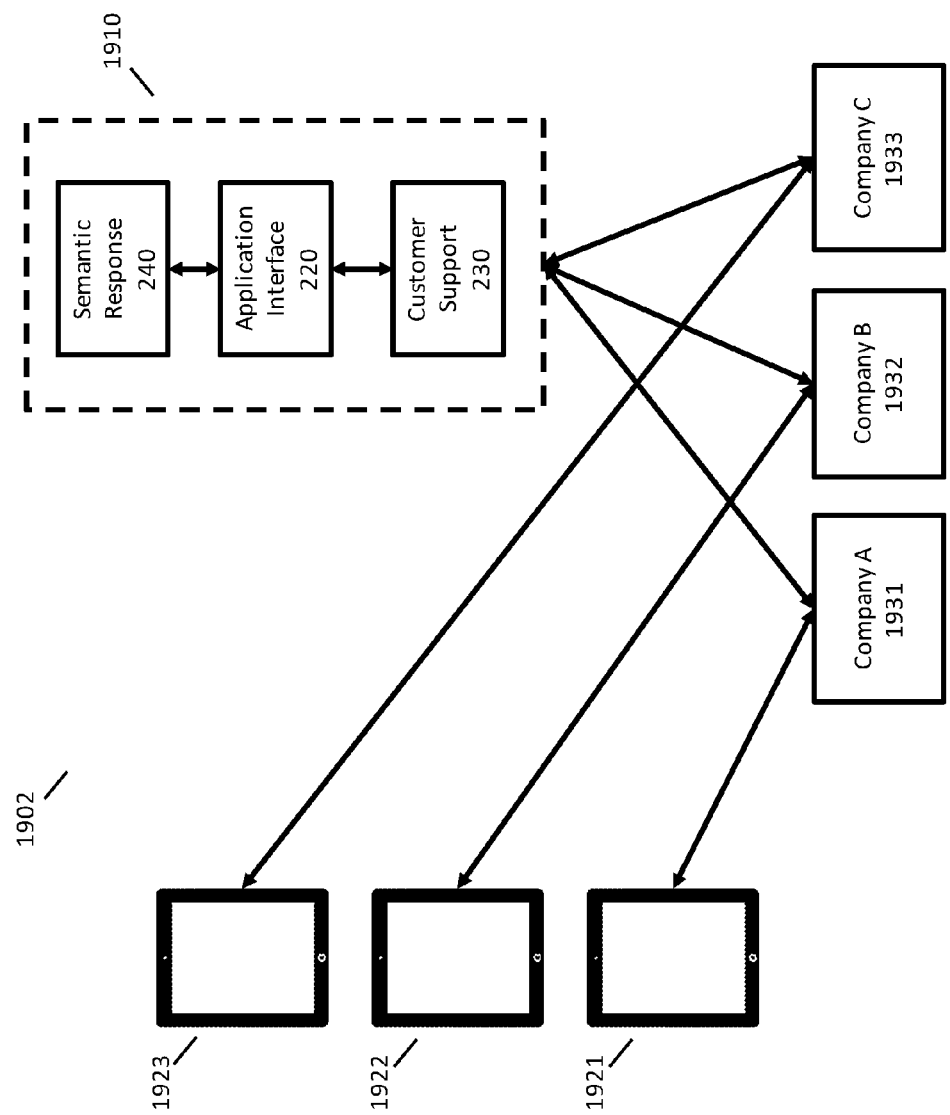

US 9,807,037 B1

AUTOMATICALLY SUGGESTING COMPLETIONS OF TEXT

CLAIM OF PRIORITY

This patent application claims the benefit of the following provisional patent application, which is hereby incorporated by reference in its entirety: U.S. Patent Application Ser. No. 62/359,841, filed Jul. 8, 2016 (ASAP-0001-P01).

FIELD OF THE INVENTION

The present invention relates to automating or assisting communications using semantic processing.

BACKGROUND

Companies need to efficiently interact with customers to provide services to their customers. For example, customers may need to obtain information about services of the company, may have a question about billing, or may need technical support from the company. Companies interact with customers in a variety of different ways. Companies may have a website and the customer may navigate the website to perform various actions. Companies may have an application ("app") that runs on a user device, such as a smart phone or a tablet, that provides similar services as a website. Companies may have a phone number that customers can call to obtain information via interactive voice response or to speak with a customer service representative. Companies may also respond to customers using various social media services, such as Facebook or Twitter.

Some existing techniques for allowing customers to interact with companies may be a nuisance to the customer. Navigating to the right page on a website or an app or navigating a voice menu on a phone call may be time consuming. Some existing techniques for allowing customers to interact with companies may be expensive for a company to implement. Hiring customer service representatives to manually respond to requests and answer phone calls may be a significant expense.

BRIEF DESCRIPTION OF THE FIGURES

The invention and the following detailed description of certain embodiments thereof may be understood by reference to the following figures:

FIGS. 19A-19C illustrate systems for providing a semantic processing service.

DETAILED DESCRIPTION

Described herein are techniques for using semantic processing to respond to a request of a user. Although the techniques described herein may be used for a wide variety of users and requests, for clarity of presentation, an example of a company providing a response to a request of a customer will be used. The techniques described herein, however, are not limited to customers and companies, responses may be provided to requests from users who are not customers, and responses may be from an entity that is not a company, such as an individual. Semantic processing may be used to automate responses to a request and to assist a responding user in formulating a response to a request.

Semantic processing may be used to provide a fully automated experience for the customer. The use of semantic processing allows a customer to obtain needed information or needed support by making a request using natural language. The use of natural language for making requests, may allow the customer to receive a resolution to his request more quickly than with other methods of making requests. In some instances, the customer's request may be resolved with a single interaction. For example, where the customer asks "When is my package arriving?," the response may be, "Your package is scheduled to arrive on Wednesday and has tracking number 1234."

Figure 1A:
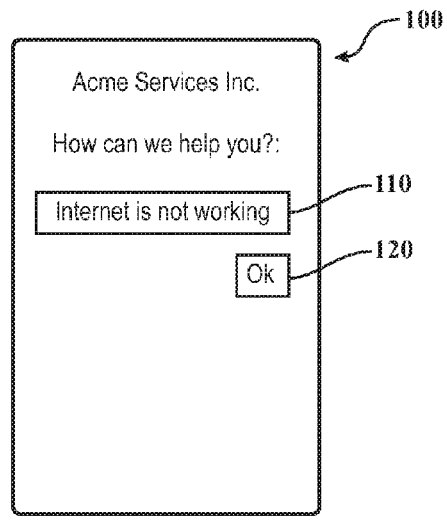
FIGS. 1A and 1B illustrate an example user interface on a customer device.
Figure 1B:
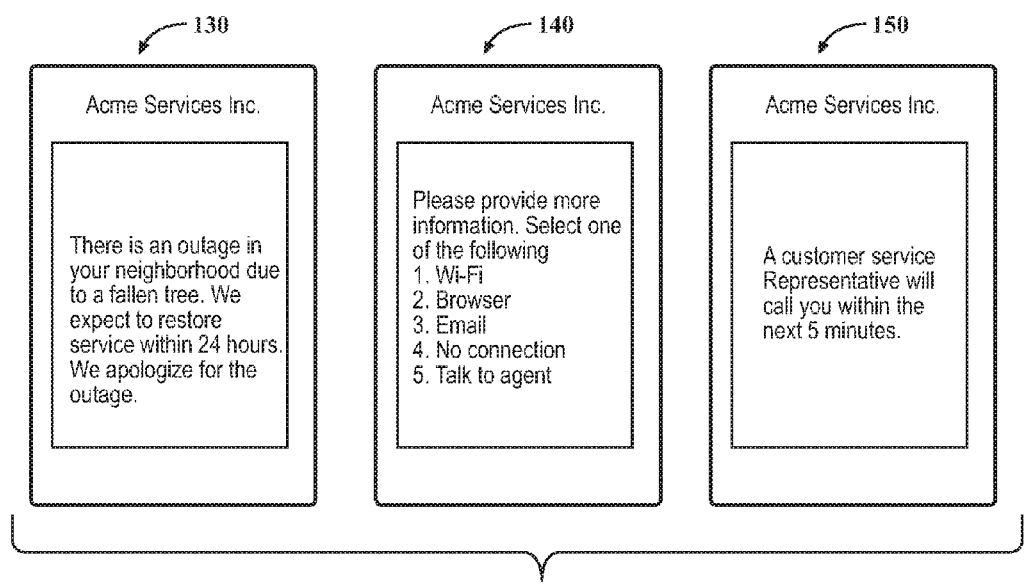

FIGS. 1A and 1B illustrate an example user interface 100 on a customer device that may be used for providing automatic responses. FIG. 1A illustrates an example of a text box 110 presented on a customer device where a customer can send a request to a company. The customer may type the request using natural language in the same manner as if the customer was sending the message to a person. The customer may submit the request using a button, such as button 120. In some implementations, the customer may speak the request and the speech may be converted to text on the customer device or at a server computer.

After the customer submits the request, the request may be automatically processed. For example, semantic processing techniques may be used to understand the request and provide a response. FIG. 1B illustrates three example responses to the customer's request. In user interface 130, a response is provided that immediately answers the customer's question. In user interface 140, the automatic processing has determined that more information is needed from the customer to provide a response, and the customer is asked to provide additional information. In user interface 140, the customer is asked to select one of several possible options but in other instances or implementations, the customer may be asked to provide additional information in other ways, such as by clarifying the response by typing additional text. In user interface 150, the automatic processing has determined to connect the customer with a customer service representative. The techniques described herein are not limited to the foregoing example responses, and any suitable response may be provided to a customer. For example, a customer requesting to change his or her phone number may be immediately provided with a form to allow the customer to enter a new phone number (e.g., by automatically navigating the app to the appropriate screen or providing an appropriate web page).

In addition to providing automatic responses, semantic processing may also be used to assist a customer service representative (CSR) in responding to a request of a user. For instance, in a conversation between a customer and a CSR, semantic processing may be used to understand the meaning of a customer request and to provide suggestions to a CSR, such as when a CSR starts typing a response, completions to the typed text may be suggested; before a CSR starts typing, complete responses may be suggested to the CSR; resources may be suggested to the CSR to provide the CSR with relevant information or to make it easier for the CSR to perform actions; and the like.

Semantic Processing System

Figure 2:
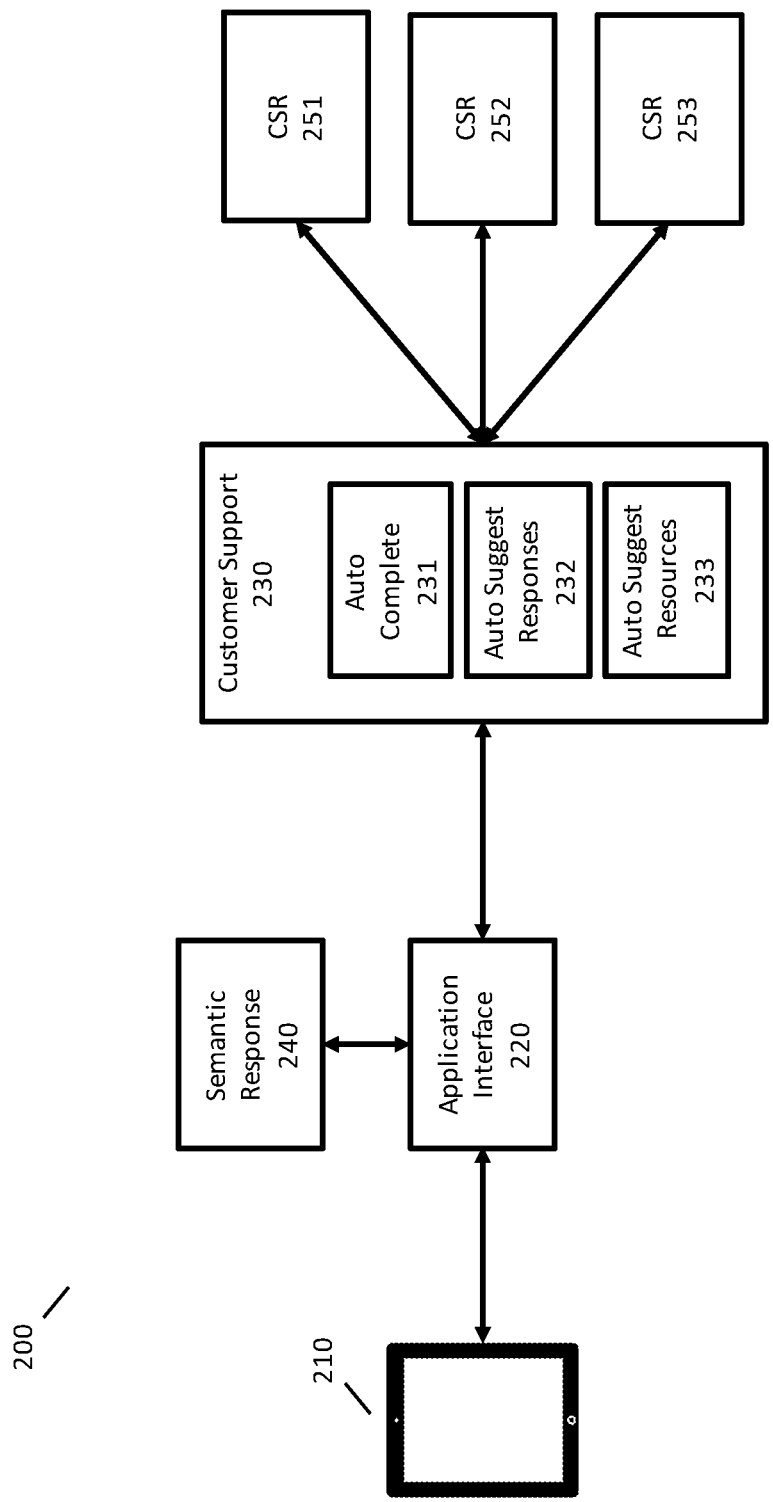
FIG. 2 illustrates a system for using semantic processing to respond to a customer request.

FIG. 2 illustrates a system 200 for using semantic processing to respond to a customer request. In FIG. 2, a customer may use customer device 210 to communicate with a company. Customer device 210 may include any appropriate device, such as a smart phone, tablet, wearable device, or Internet of things device. The customer may submit the request using any appropriate technique, such as typing or speaking a request to an app running on customer device 210 (e.g., an app of a particular company or a third-party app created for processing customer requests), typing or speaking a request on a web page, sending a text message, or sending an email. As used herein, a text message includes any message sent as text including but not limited to a message sent using SMS (short message service) or a special purpose application (e.g., Facebook messenger, Apple iMessage, Google Hangouts, or WhatsApp).

The customer's request may be sent by customer device 210 to application interface component 220, and may be sent either directly or indirectly using any appropriate network (e.g., Internet, Wi-Fi, or a cellular data network). The request may be sent using any appropriate transmission protocols that include sending one or more of the text of the message or audio of the customer speaking the request. Where the customer speaks a request to customer device 210, speech recognition may be performed by customer device 210, at a server computer, or by another component of FIG. 2. Application interface component 220 may include, for example, one or more server computers operated by a company.

Application interface component 220 receives the customer request and may coordinate further processing of the customer request. Where the customer request is to be processed automatically, the customer request may be routed to semantic response component 240 to determine a response without the involvement of a CSR. Semantic response component 240 may perform semantic processing on the text of the customer request to understand the meaning of the request, select an action to perform in response to the request, and cause a response to be presented to the customer. In addition, semantic response component 240 may provide results to application interface component 220 for use by customer support component 230.

Where the customer request from customer device 210 is to be sent to a CSR, the customer request may be routed to customer support component 230 to direct the request to a CSR and obtain a response from the CSR. Customer support component 230 may be connected with multiple CSRs, such as CSR 251, CSR 252, and CSR 253. Each CSR may use a user interface, such as an application on a computer or a web page, to receive customer requests and provide responses to them.

Customer support component 230 may include other components to assist the CSRs, such as auto-complete component 231, auto-suggest responses component 232, and auto-suggest resources component 233. These three components may perform semantic processing on the text of messages between the customer and the CSR to understand the meaning of the conversations, and provide suggestions to the CSR to assist the CSR in responding to a customer. Auto-complete component 231 may assist a CSR by providing suggested completions to text that the CSR has started typing, auto-suggest resources component 232 may suggest complete responses to a CSR before a CSR has started typing, and auto-suggest resources component 233 may suggest resources to the CSR to provide the CSR with relevant information or allow the CSR to take appropriate actions.

System 200 is one example implementation of using semantic processing to respond to a customer request, but the techniques described herein may use any appropriate implementation and are not limited to the example of FIG. 2. For example, the components of FIG. 2 may be split into multiple components or merged together, some processing may be performed by customer device 210, and other components may be included, such as load balancing or any other components that may be used with a network service. In addition, some components of system 200 may be implemented by a company whose products and services are being supported, and other components may be provided by a third-party. For example, the company may provide customer support component 230 in association with CSRs 251, 252, and 253, but may have the semantic response component 240 functionality provided by a third-party.

Automated Responses

Figure 3:
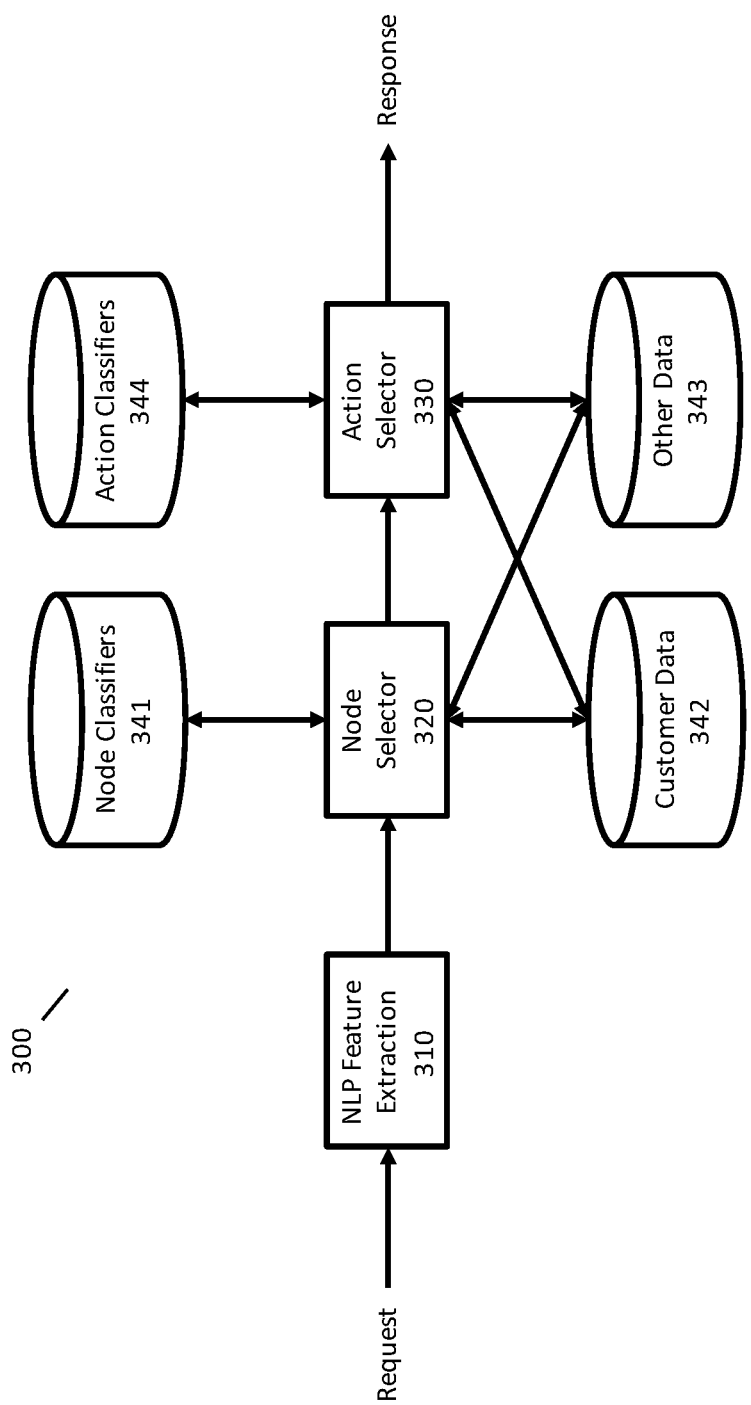
FIG. 3 illustrates a system for automatically responding to a customer request using semantic processing.

FIG. 3 illustrates a system 300 for implementing semantic response component 240. System 300 may receive the customer request (e.g., in the form of text) from application interface component 220 and perform automated semantic processing on the request using one or more of NLP (natural language processing) feature extraction component 310, node selector component 320, and action selector component 330, which are described in greater detail below.

NLP feature extraction component 310 may compute features from the text to be used in subsequent processing. The features may include any appropriate features that are used for natural language processing. Operations that may be performed by NLP feature extraction component 310 may include one or more of preprocessing, encoding, and feature extraction.

Preprocessing in NLP feature extraction component 310 may include any appropriate preprocessing tasks. For example, the text may be converted to lower case, stripped of punctuation, and tokenized. In some implementations, less common words (e.g., words not on an allowed words list) may be replaced by an unknown token (e.g., "UNK") indicating that the word is not on the allowed words list.

After preprocessing, the text may be encoded. Any appropriate encoding techniques may be used. In some implementations, the text may be vectorized into a bag of words (BOW) vector, a term frequency inverse document frequency (TFIDF) vector, or a matrix of word embeddings (e.g., as obtained using a Word2Vec model or a GloVE algorithm).

After encoding, features may be extracted or computed. Any appropriate features may be used. In some implementations, where the text was encoded with BOW or TFIDF, the features may be extracted by processing the encoded text with a topic model, such as a latent semantic indexing model or a latent Dirichlet allocation model, or by processing the encoded text with a neural network, such as a multi-layer perceptron neural network. In some implementations, where the text is encoded using word embeddings, features may be obtained by processing the matrix with a neural network, such as a deep averaging network, a convolution neural network, a recurrent neural network, a recursive neural network, or any other suitable type of neural network.

The features may be processed to determine an appropriate action to take in response to the customer's request. In some implementations, the possible actions may be organized using an action graph, where a graph is a number of nodes connected by edges or links. For example, the action graph may be a directed acyclic graph or a tree.

As used herein, a graph is a data structure or a data type that may be used in implementing an algorithm on a computer. A graph comprises nodes or vertices that may be connected by edges or arcs. The nodes and/or edges of a graph may be associated with other data being processed. In some implementations, edges may be directed, which allows a transition between nodes in only one direction. Although graphs are presented visually herein, when used to implement an algorithm, the graphs need not be presented visually, and data describing the graph (e.g., data describing nodes and edges) may be used in implementing an algorithm.

Figure 4:
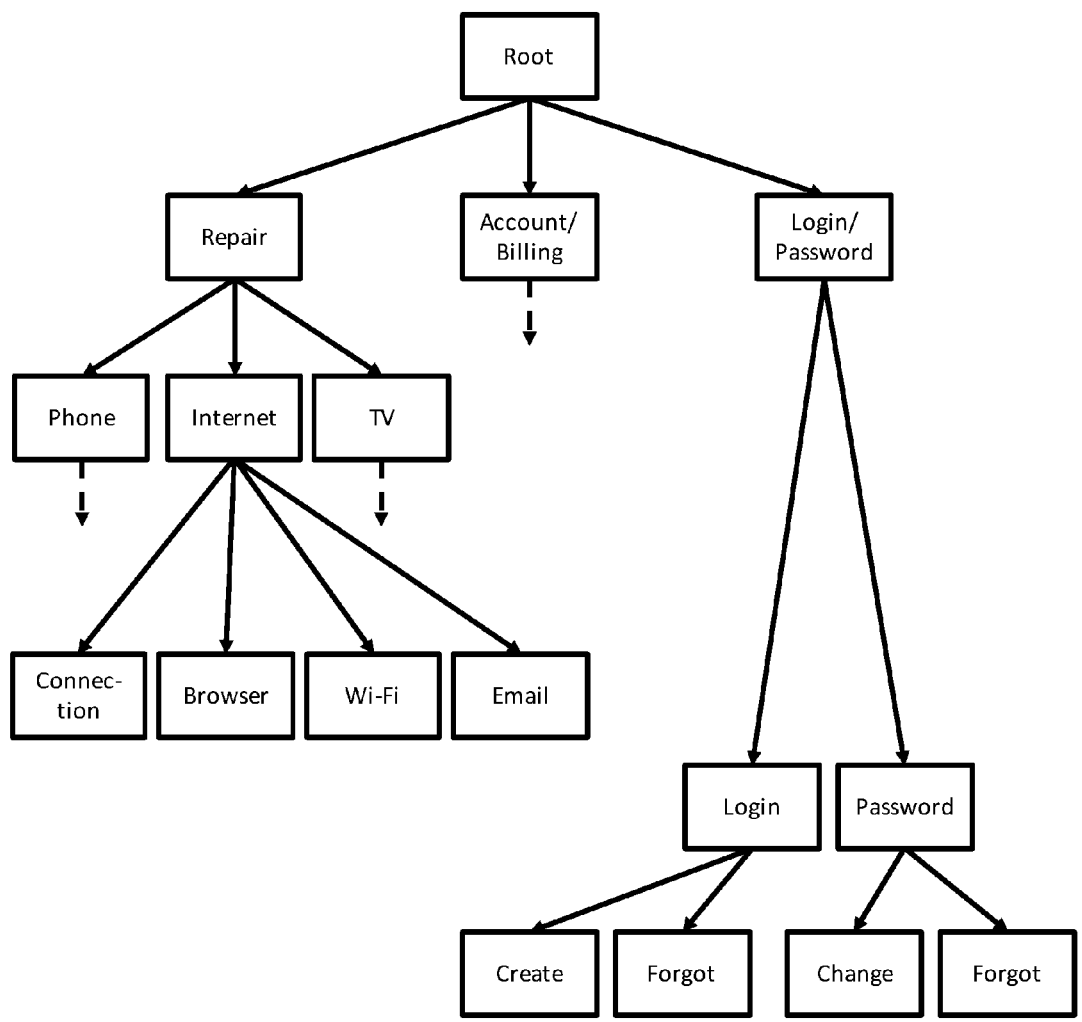
FIG. 4 illustrates an action graph that may be used to determine an action in response to a customer request.

FIG. 4 illustrates an example action graph that may be used to determine an action in response to a customer request. Although the action graph of FIG. 4 is illustrated as a tree, the action graph need not be a tree and may be another type of graph. In the example of FIG. 4, the top node is a Root node and all other nodes may be connected either directly or indirectly to the Root node. Underneath the Root node are three nodes labeled Repair, Account/Billing, and Login/Password. Each of these three nodes may be used to determine an action to respond to a request of the corresponding type.

For example, the Repair node, is connected to three further nodes labeled Phone, Internet, and TV. Each of the Phone, Internet, and TV nodes may be associated with actions that may be used to provide responses for those particular types of repairs. FIG. 4 further shows other examples of nodes that provide examples of types of actions that are more specific than the nodes discussed above (e.g., the four nodes underneath the Internet node). The dashed lines in FIG. 4 indicate edges where subsequent nodes are possible but have been omitted for the sake of clarity.

In some implementations, node selector component 320 may select a node from the action graph using the NLP features. The selected node of the action graph may be associated with one or more possible actions, and action selector component 330, may then select an action from the one or more actions associated with the selected node.

In some implementations, each node of the action graph may be associated with a node selector classifier, where a node selector classifier is configured to determine a score (e.g., a likelihood or probability) indicating a match between the node and the customer's request. Node selector component 320 may select a node using the node selector classifiers by computing scores using the node selector classifiers and the NLP features. In some implementations, at least some nodes of the action graph may also be associated with an action selector classifier, and action selector component 330 may select an action using an action selector classifier. In some implementations, however, each node of the action graph may be associated with a single action, and action selector component 330 and action selector classifiers may be omitted.

Figure 5:
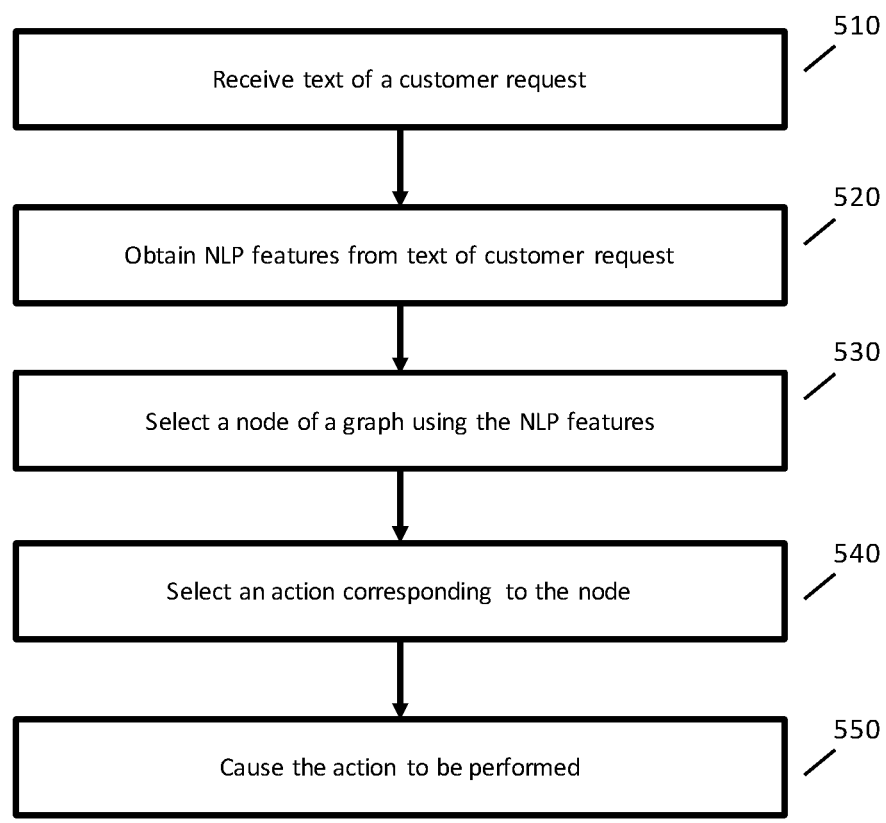
FIG. 5 is a flowchart of an example implementation of automatically responding to a customer request using semantic processing.

FIG. 5 is a flowchart of an example implementation of using semantic processing to determine an action to provide a response to a customer. In FIG. 5, the ordering of the steps is exemplary and other orders are possible, not all steps are required and, in some implementations, some steps may be omitted or other steps may be added. The process of the flowcharts may be implemented, for example, by any of the computers or systems described herein.

At step 510, text of a customer request is obtained, and at step 520 features are obtained from the customer text. Steps 510 and 520 may be implemented using any of the techniques described herein, and step 520 may be implemented, for example, by NLP feature extraction component 310. For example, at step 510, an audio signal comprising speech of a customer request may be processed using speech recognition to obtain text of the customer request.

At step 530, a node of the action graph is selected using the features. For example, step 530 may be implemented by node selector component 320. In some implementations, each node of the action graph may be associated with a node selector classifier. A score may be generated for a node by processing the features with the node selector classifier that is associated with the node. Scores may be generated for some or all of the nodes of the action graph, and a node may be selected using the scores. Some example implementations of selecting a node include (i) computing a score for every node of the action graph and selecting a node with a highest score; (ii) implementing a greedy algorithm that starts at the root of the action graph, selects a child node having a highest score, and subsequently selecting a next child node with a highest score until a termination criteria is reached (e.g., reaching a leaf of the action graph); or (iii) implementing a beam search in traversing the action graph.

The node selector classifier may be any appropriate classifier, and node selector classifiers may be retrieved from a data store, such as node classifiers data store 341. In some implementations, the node selector classifier may include a logistic regression classifier (such as a structured multinomial logistic regression classifier), a support vector machine, or a decision tree. Further details of example implementations of selecting a node are described below.

Step 530 may be implemented using other data in addition to the NLP features. For example, step 530 may be implemented using customer data, such as customer data retrieved from customer data data store 342 and other data, such as other data retrieved from other data data store 343. When receiving a request from the customer, the request may include a customer identifier (such as a customer identification number, customer user name, or device identifier) that may be used to obtain information about the customer from customer data data store 343. The customer data may include any information about the customer, such as a customer profile, a customer location, billing and payment data, and services provided to the customer.

The customer data may be used by node selector component 320 to select a node to provide a response to a customer. For example, a customer may be subscribed to Internet services but may not be subscribed to phone or TV services. When selecting a node to respond to the customer's request, the nodes of the action graph relating to phone and TV services may be penalized in computing a score or may not be considered at all.

Other data may also be used by node selector component 320 in selecting a node. In some implementations, the company may have a knowledge base that contains relevant information for responding to a customer request. For example, the company knowledge base may include information about current or recent service outages, and this information may be used in selecting a node. When a customer asks for help with the Internet not working, the customer's address can be compared with locations of current service outages. If a service outage is affecting the customer, a node may be selected relating to providing a response with information about the service outage, such as an expected resolution of the outage. If the customer is not affected by any outages, then a node may be selected to help the customer troubleshoot why his or her Internet is not working.

The customer data and other data may be combined with the NLP features in selecting a node. In some implementations, a feature vector of NLP features may be augmented with additional features generated from the customer data or the other data. The features relating the customer data and other data may be in any appropriate format. For example, a feature may be 0 or 1 to indicate a state, such as whether there is an outage or whether there is a past due amount for the customer's bill. Features may take integer values, floating point values, or may be one a specified set of values (e.g., services provided to the customer may be set to some combination of the strings "Internet," "Phone," and "TV"). The combined feature vector may be input into the node selector classifiers to generate scores that may be used in selecting a node.

At step 540, an action is selected using the selected node. For example, step 540 may be implemented by action selector component 330. Where the selected node is associated with only a single action, that action may be selected. Where the selected node is associated with multiple actions, an action selector classifier may be used to select an action. Action selector component 330 may also use customer data from customer data store 342 and other data from other data data store 343 in selecting an action for the selected node. For example, a selected node may have a multiple actions available depending on the customer data or the other data.

At step 550, one or more components of system 200 may cause the action to be performed. For example, application interface component 220 may perform steps that cause a response to be presented to the customer, such as the responses of FIG. 1B. Additional details of performing an action to provide a response to a customer are described below.

Further details of example implementations of node selector component 320 are now presented. Node selector component 320 may implement a search algorithm in selecting a node. For example, node selector component 330 may implement a greedy search, a beam search, or a Viterbi search.

Figure 6:
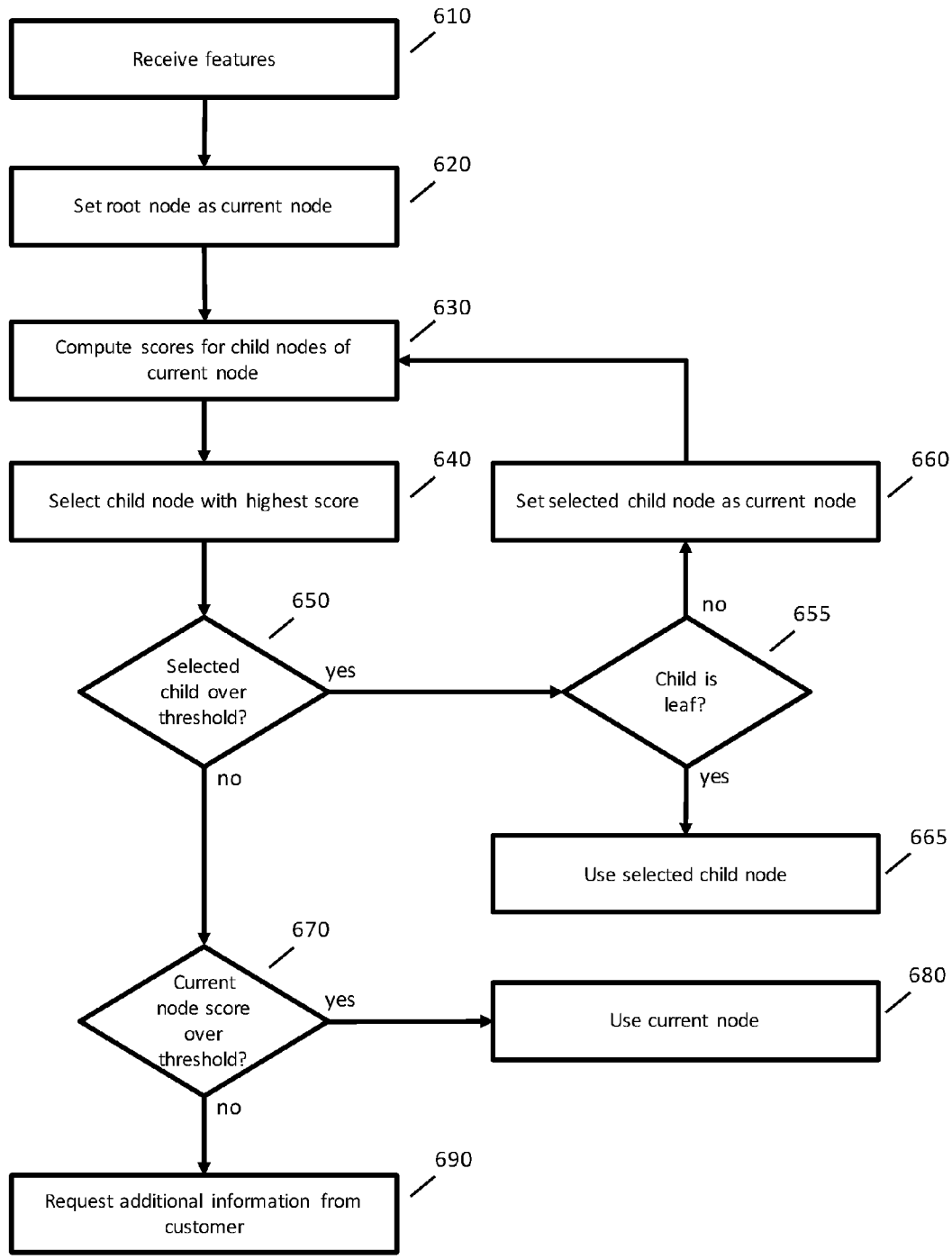
FIG. 6 is a flowchart of an example implementation of a greedy algorithm for selecting a node.

FIG. 6 is a flowchart of an example implementation of a greedy search for selecting a node of the action graph. In FIG. 6, the ordering of the steps is exemplary and other orders are possible, not all steps are required and, in some implementations, some steps may be omitted or other steps may be added. The process of the flowcharts may be implemented, for example, by any of the computers or systems described herein.

At step 610, features are received. The features may include NLP features and/or features obtained from customer data or other data.

At step 620, the root of the action graph is set as a "current node." The current node may be a node that is being processed during an iteration of an algorithm. For example, the current node may be specified by a node ID or a pointer. The root node of the action graph may be any node that is considered to be a starting point of a search. In some implementations, the root node may only have outbound edges and may not have any inbound edges.

At step 630, a score is computed for each child node of the current node. In some implementations, a score may also be computed for the current node. The scores may be computed using any of the techniques described herein. In some implementations, each node may be associated with a node selector classifier, and the node selector classifier associated with the node may be configured to compute scores for each child of the current node and optionally a score for the current node.

In some implementations, the node selector classifier may be a logistic regression classifier. For a node n, the logistic regression classifier, for instance, may have as parameters, a matrix $W_n$ and a vector $b_n$. Where there are N features (e.g., NLP features or features from customer data or other data) and M child nodes of the current node, the matrix $W_n$ may have M+1 rows (one for the current node and each child node) and N columns and the vector $b_n$ may have length N. The classifier may compute scores using the following equation $$p(c_i|x) = \text{SoftMax}(W_n x + b_n)_i$$

where x is a feature vector, $c_i$ represents a node (e.g., a child of the current node or the current node), and the subscript i indicates the $i^{th}$ element of a vector. For example, $c_0$ may represent the current node, $c_1$ may represent the first child of the current node, and $c_M$ may represent the last child of the current node. The function SoftMax may be computed as follows:

$$\text{SoftMax}(y)_i = \frac{e^{y_i}}{\sum_{j=0}^{M} e^{y_i}}$$

In some implementations, the node selector classifier may include an ensemble of classifiers. For example, the node selector classifier may be implemented using bootstrap aggregating or bagging or may be implemented using stacking or feature weighted stacking.

At step 640, the child node with the highest score may be selected, and at step 650, the score of the highest scoring child may be compared to a threshold. If the score of the selected child node is above the threshold, then processing may proceed to step 655 where it is determined if the selected child node is a leaf node (e.g., does not have edges directed to another node). If the selected child node is a leaf node, then processing may proceed to step 665 where the selected child node is used for further processing, such as selecting an action using an action selector model.

If the selected child node is not a leaf node, then processing may proceed to step 660, where the selected child node is set as the current node. After step 660, processing may proceed back to step 630 where scores may be computed for the children of the new current node. By iterating in this manner, the action graph may be traversed by repeatedly traversing to a best-scoring child node. The algorithm may be referred to as a greedy algorithm because each step of the processing chooses a highest-scoring child as the next step.

If the score of the selected child node is not above the threshold, then processing proceeds to step 670, where a score for the current node is compared to a threshold (which may be the same as or different from the threshold of step 650). If the score of the current node exceeds the threshold, then processing proceeds to step 680 where the current node is selected. The selected current node may then be used for further processing, such as selecting an action using an action selector model.

If the score for the current node is below the threshold, then processing may proceed to step 690 where additional information is requested from the customer. Where all the child nodes and the current node have scores below the threshold (or respective thresholds) then the low scores may indicate an uncertainty as to the correct node for responding to the customer's request. Instead of selecting a node (which may be an incorrect node), it may provide a better experience for the customer to obtain additional information and to have greater certainty in finding an appropriate node to respond to the customer's request. For example, the customer may be asked to select one of several possible choices or to provide additional text to clarify his or her request.

Many variations of the steps of FIG. 6 are possible. For example, in some implementations, the current node at step 670 may always be selected even if the score for the current node is under the threshold. In such an implementation, steps 670 and 690 may be omitted, and the "no" branch of step 650 may connect to step 680.

Figure 7:
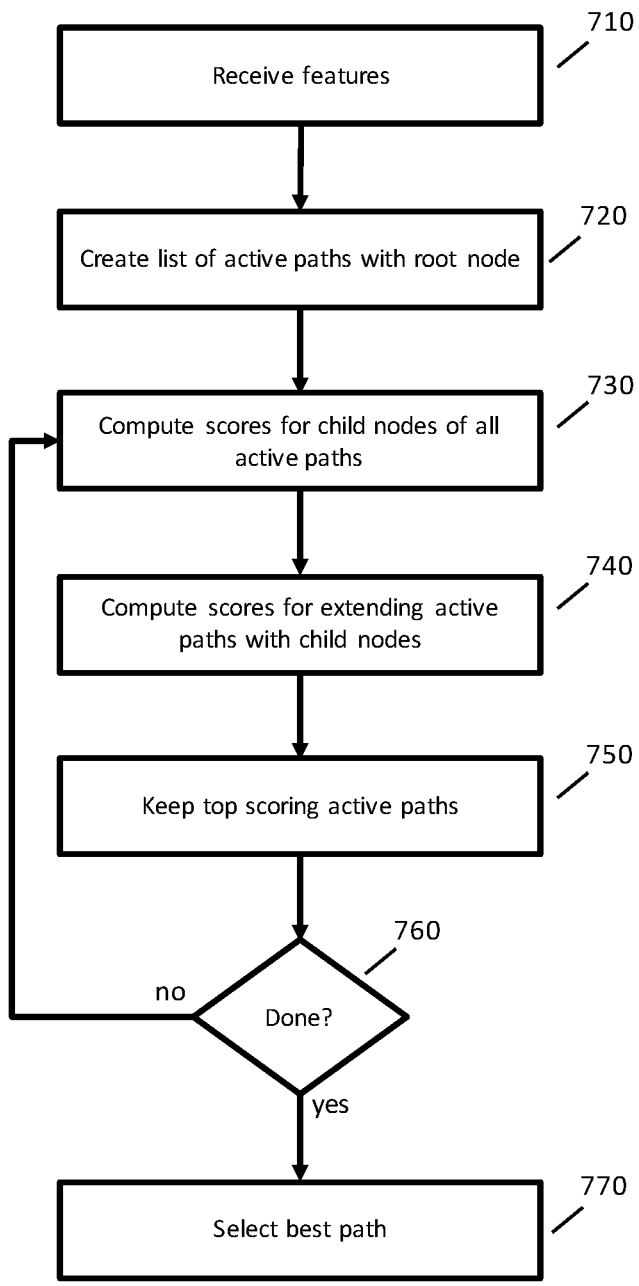
FIG. 7 is a flowchart of an example implementation of a beam search algorithm for selecting a node.

FIG. 7 is a flowchart of an example implementation of a beam search for selecting a node of the action graph. In FIG. 7, the ordering of the steps is exemplary and other orders are possible, not all steps are required and, in some implementations, some steps may be omitted or other steps may be added. The process of the flowcharts may be implemented, for example, by any of the computers or systems described herein.

At step 710, features are received. The features may include NLP features and/or features obtained from customer data or other data.

At step 720, a list of active paths of a search graph is initialized, and the number of active paths may be referred to as a beam width. The list of active paths may be initialized with the root node as an active path consisting of just the root node. During subsequent steps, the existing active paths may be extended and other active paths may be added up to the specified beam width. A number of active paths may be a fixed number or may include all paths with a score exceeding a threshold. Each active path may be initialized with a path score that is updated during subsequent steps.

At step 730, scores are computed for child nodes for the ends of all of the active paths. Scores may be computed using any of the techniques described herein. The first time step 730 is performed, the only active path may correspond to the root node, and thus scores may be computed only for children of the root node. For subsequent instances of performing step 730, there may be multiple active paths, and scores may be computed for the child nodes of all active paths.

At step 740, path scores are computed for extending each of the active paths with the child nodes of each active path. The path score of an extended path may be the product of the existing path score with the score for the child node (or in some implementations may be the sum or some other combination of the path score with the score for the child node). Since each active path may have multiple child nodes, the number of extended path scores computed at step 740 may be larger than the beam width.

At step 750, a number of top scoring extended paths corresponding to the beam width are retained and other paths are discarded. The kept extended paths are the new set of active paths for subsequent processing. For example, a top scoring number of paths or all paths with a path score above a threshold may be kept. In some implementations, a path may be retained as an active path without the addition a child node, and this may be indicated by a special "stop" node in the search graph. For example, a path of length two may have a higher score than many paths of length three, and thus the shorter path may be retained (path scores may also be normalized to account for different lengths).

At step 760, it is determined whether processing has completed. Any appropriate criteria may be used to determine whether processing has completed. For example, processing may be completed when all of the active paths (i) have reached a leaf node or (ii) do not have any child nodes with a sufficiently high score. If processing has not completed, then processing returns to step 730 where scores are computed for child nodes of the new set of active paths. If processing has completed, then a best active path is selected at step 770 and the node at the end of this path may be selected for determining an action to respond to the customer request.

Figure 8:
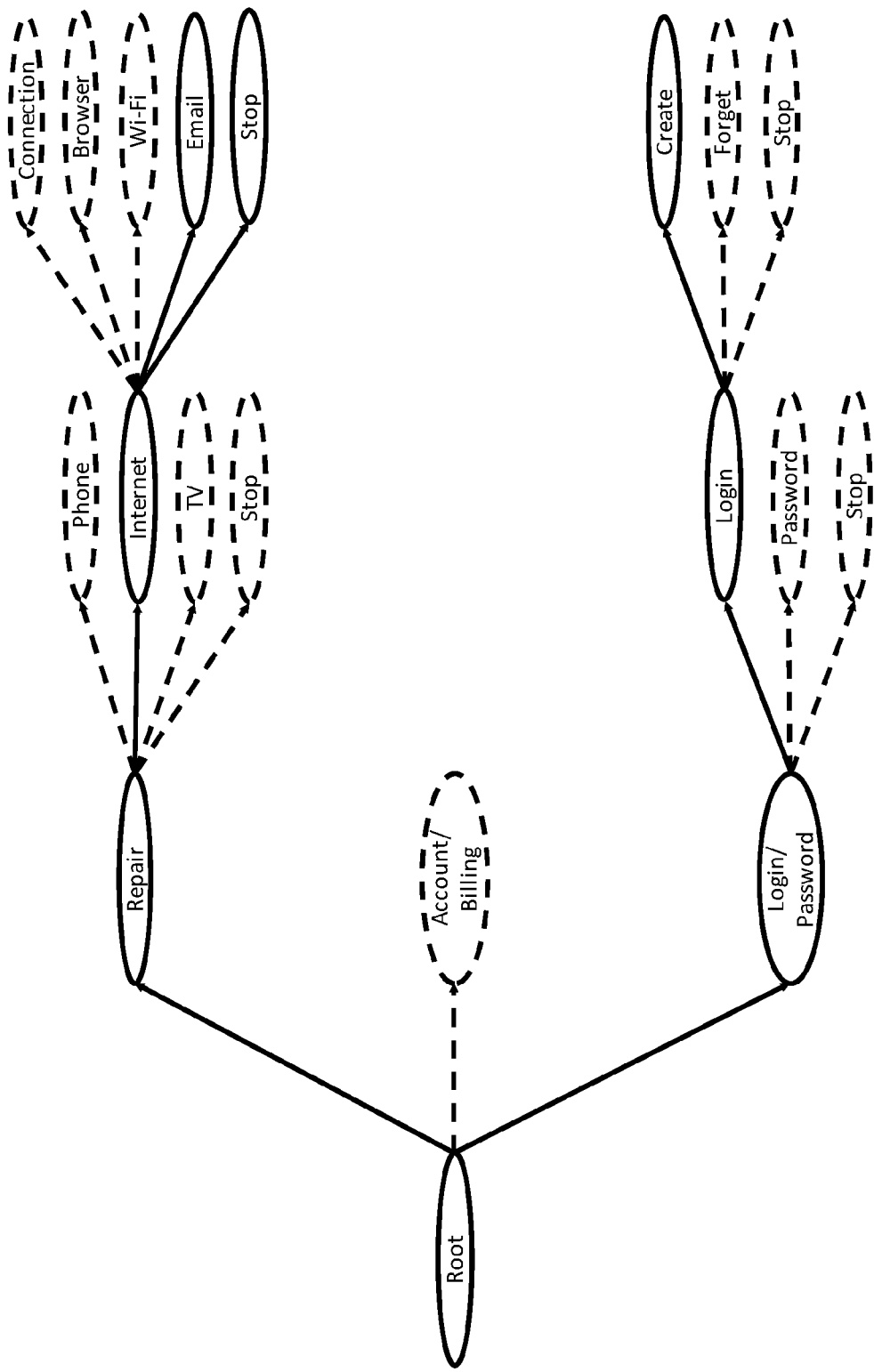
FIG. 8 illustrates a search graph that may be used to select a node of an action graph.

FIG. 8 illustrates a search graph generated by an example beam search. In the example of FIG. 8, the beam width is 3 (the 3 top scoring paths are retained), and at the end of the search, the three top scoring paths are (1) Repair, Internet, Stop; (2) Repair Internet, Email; and (3) Login/Password, Login, Create. The active paths (nodes and edges) at the end of the search are indicated with solid lines and non-active paths are indicated with dashed lines (a non-active path at the end of a search may have been an active path during an earlier stage of the search). Note that the first selected path terminated before reaching a leaf node because the Repair, Internet path had a higher score than the unselected paths of length three. The termination of the Repair, Internet path may be indicated by the special Stop node that follows the Internet node.

Other search techniques may be used in addition to the search techniques described above. For example, a Viterbi search may be performed where a score is computed along every possible path using a depth-first search. The node at the end of the highest scoring path may be selected.

Further details of example implementations of action selector component 330 are now presented. In some implementations, each node is associated with a single action, and action selector component 330 may be omitted. In some implementations, each node will be associated with multiple actions, and action selector component 330 may be needed to select an action regardless of which node is selected. In some implementations, some nodes may be associated with a single action and some nodes may be associated with multiple actions, and action selector component 330 may only be needed when a node with more than one action is selected.

Action selector component 330 may use an action selector classifier to select an action from a list of possible actions and may retrieve action selector classifiers from a data store, such as action classifier data store 344. The action selector classifier may be specific to a particular node. Any suitable classifier may be used to select an action. For example, an action selector classifier may include a logistic regression classifier, a support vector machine, or a decision tree.

An action that is available at a node may include any sequence of events that may be used to provide a response to a customer. For example, actions may include any of the following: (i) making a query to a database and providing the customer with the results of the query (e.g., the customer asks when a package will be delivered, the delivery information is retrieved from a database, and the delivery information is presented to the customer); (ii) directing the customer to a page of an app or of a website (e.g., a customer asks to change his password, and the app is directed to the appropriate page of the app or the browser is redirected to an appropriate web page); (iii) asking the customer to provide additional information about his or her request (e.g., the customer states that the Internet is not working and asking the customer if the problem is with Wi-Fi, email, etc.); or (iv) connecting the customer with a CSR (e.g., starting a chat session or a phone call between the customer and a CSR). Where a company has CSRs with different specialties (e.g., technical support and billing), the action to connect the customer with a CSR may also include connecting the customer to CSR with the specialty corresponding to the customer's request. For example, where the customer is having a problem with the Internet connection, the customer may be connected to a CSR who specializes in technical support.

An action selector classifier may use any of the feature types described above in selecting an action. For example, an action selector classifier may use NLP features, features obtained from customer data, or features obtained from other data (such as a company knowledge base). A feature vector may be created and the action selector classifier may process the feature vector to generate a score for each possible action. In some implementations, an action with a highest score may be selected.

The output of semantic response component 240 may be an action. In some implementations or instances, the node selected by node selector component 320 may have only one action associated with it, and this action is output by semantic response component. In some implementations, the node selected by node selector component 320 may be associated with multiple actions, and action selector component 330 may select the action to be output by semantic response component. The action output by semantic response component may take any appropriate form. For example, action may include an identification number specifying the processing to be performed or may include structured data specifying the processing to be performed.

An example of the overall operation of semantic response component 240 is now provided. A customer may send a request to a company stating that "My Internet connection is not working." NLP feature extraction component 310 may process the text to generate NLP features. Next, node selector component 320 may use the NLP features, and optionally other features as described above, to select a node of the action graph. Starting at the root of the action graph of FIG. 4, node selector component 320 may compute a score for each child of the root node using a node selector classifier. Node selector component 320 may traverse the action graph to similarly compute scores for subsequent child nodes. For example, the action graph may be traversed from the Root node to the Repair node to the Internet node and to the Connection node. Node selector component 320 may then select the Connection node (e.g., because it is a best scoring node according to the search algorithm). The Connection node may have two actions associated with it. The first action may be to provide the customer with information to troubleshoot his or her Internet connection, and the second action may be to inform the customer that there is a service outage in the customer's area. Because the selected node has more than one action, action selector component 330 may select an action from the available actions using an action selector classifier. The features input to the action selector classifier may include the location of current service outages and the address of the customer. The action selector classifier may output a score for each of the two possible actions, and a highest scoring action may be selected. Semantic response component 240 may return the highest scoring action to another component, such as application interface component 220.

In some implementations, the only available action at each node of the action graph may be to connect the customer with a CSR, and the operation of the classifiers is to select an appropriate CSR to handle the customer's request. For example, for a large company, the company may have several teams of CSRs where each team is trained to handle particular types of request. For example, for the action graph of FIG. 4, a company may have different teams of CSRs where each team is responsible for responding to requests relating to one or more of the nodes. In these implementations, the only action at each node may be to connect the customer with a CSR with the difference being which CSR team the customer will be connected to.

Other components of system 200, such as application interface component 220 may cause the action to be performed and ultimately cause a response to be presented by customer device 210 to the customer, such as any of the responses in FIG. 1B. In causing the action to be performed, application interface component 220 may interface with other components to obtain needed information and causing a response to be displayed to the customer. For example, application interface component 220 may perform one or more of the following steps: obtain a template (e.g., an HTML template) to present information on a display of customer device 210; obtain text-to-speech audio to be played by a speaker of customer device 210; retrieve information from a data store using the action; or obtain the results of other processing by making a request to another component (e.g., using a REST interface to determine information about an outage at the customer's address); or transmit a request to a customer service representative (such as CSR 251, 252, or 253) for the CSR to contact the customer.

Application interface component 220 may communicate with customer device 210 using any appropriate techniques. For example, application interface component 220 may transmit any of the following to customer device 210: HTML to be presented by a display; audio to be played by a speaker (or text to be used to generate audio at the customer device); a link to a page of an app or a website (e.g., a "deep link").

Accordingly, a customer may submit a request to a company using natural language, and receive an automatic response from the company. In some implementations, a response may be provided to a user as described in the following clauses, combinations of any two or more of them, or in combination with other clauses presented herein.

1. A computer-implemented method for automatically responding to a request of a user, the method comprising:
   receiving text corresponding to a user request;
   computing a plurality of features from the text;
   using a graph comprising a plurality of nodes, wherein:
   the plurality of nodes comprises a first node and a second node,
   the first node is associated with a first classifier and a first action, and
   the second node is associated with a second classifier and a second action;
   computing a first score for the first node using the first classifier and the plurality of features;
   computing a second score for the second node using the second classifier and the plurality of features;
   selecting the first node using the first score and the second score; and
   causing the first action associated with the first node to be performed.

2. The computer-implemented method of clause 1, wherein the user is a customer of a company and the user request seeks assistance from the company.

3. The computer-implemented method of clause 1, wherein causing the first action to be performed comprises transmitting information to the user, requesting additional information from the user, or connecting the user with a customer support representative.

4. The computer-implemented method of clause 1, wherein receiving text corresponding to a user request comprises performing speech recognition on an audio signal comprising speech of the user.

5. The computer-implemented method of clause 1, wherein the text is received via a text message, electronic mail, a web server, or an application running on a user device.

6. The computer-implemented method of clause 1, wherein selecting the first node comprises using a greedy search algorithm.

7. The computer-implemented method of clause 1, wherein computing the first score comprises using information about the user.

8. A system for automatically responding to a request of a user, the system comprising:
   at least one server computer comprising at least one processor and at least one memory, the at least one server computer configured to:
   receive text corresponding to a user request;
   compute a plurality of features from the text;
   use a graph comprising a plurality of nodes, wherein:
   the plurality of nodes comprises a first node and a second node,
   the first node is associated with a first classifier and a first action, and
   the second node is associated with a second classifier and a second action;
   compute a first score for the first node using the first classifier and the plurality of features;
   compute a second score for the second node using the second classifier and the plurality of features;
   select the first node using the first score and the second score; and
   cause the first action associated with the first node to be performed.

9. The system of clause 8, wherein the first node is associated with a first plurality of actions, the first plurality of actions comprising the first action; and wherein the at least one server computer is configured to select the first action from the first plurality of actions.

10. The system of clause 9, wherein the at least one server computer is configured to select the first action using information about the user.

11. The system of clause 8, wherein the graph is a directed acyclic graph.

12. The system of clause 8, wherein the at least one server computer is configured to select the first node using a beam search algorithm.

13. The system of clause 8, wherein the at least one server computer is configured to select the first node by:
   setting a beginning node as a current node, the current node comprising a plurality of child nodes;
   computing a score for each child node of the plurality of child nodes to generate a plurality of scores;
   selecting a first child node of the plurality of child nodes using the plurality of scores; and
   setting the first child node as the current node.

14. The system of clause 8, wherein the first classifier comprises a logistic regression classifier.

15. One or more non-transitory computer-readable media comprising computer executable instructions that, when executed, cause at least one processor to perform actions comprising:
   receiving text corresponding to a user request;
   computing a plurality of features from the text;
   using a graph comprising a plurality of nodes, wherein:
   the plurality of nodes comprises a first node and a second node,
   the first node is associated with a first classifier and a first action, and
   the second node is associated with a second classifier and a second action;
   computing a first score for the first node using the first classifier and the plurality of features;
   computing a second score for the second node using the second classifier and the plurality of features;
   selecting the first node using the first score and the second score; and
   causing the first action associated with the first node to be performed.

16. The one or more non-transitory computer-readable media of clause 15, wherein selecting the first node comprises:
   setting a beginning node as a current node, the current node comprising a plurality of child nodes;
   computing a score for each child node of the plurality of child nodes to generate a plurality of scores;
   selecting a first child node of the plurality of child nodes using the plurality of scores; and
   setting the first child node as the current node.

17. The one or more non-transitory computer-readable media of clause 15, wherein computing the plurality of features comprises encoding words of the text and processing the encoded words with a neural network.

18. The one or more non-transitory computer-readable media of clause 15, wherein the first classifier comprises a logistic regression classifier.

19. The one or more non-transitory computer-readable media of clause 15, wherein selecting the first node using the first score and the second score comprises:

comparing the first score to a first threshold; and
comparing the second score to a second threshold, wherein the second threshold is not equal to the first threshold.

20. The one or more non-transitory computer-readable media of clause 15, wherein selecting the first node comprises using information about the user.

Generation of Graphs and Classifiers

In the above description, an action graph, node selector classifiers, and action selector classifiers were used to perform semantic processing of a customer request and provide a response to a customer. The action graph and classifiers need to be created or trained before they can be used to perform semantic processing and techniques for creating an action graph and classifiers are now described.

In some implementations, an action graph, such as the action graph of FIG. 4, may be created manually. A person familiar with customer requests for a company may be able to identify common subjects of customer requests, create nodes for different categories of requests, and connect related nodes together.

In some implementations, an action graph may be created to mirror an existing structure that allows customers to obtain information. For example, a menu hierarchy from an app or a website may be converted to an action graph where each page of the app or website may become a node of the action graph. Similarly, an existing hierarchy of an interactive voice response system may be converted into an action graph.

In some implementations, existing logs of customer support sessions may be used to automatically create an action graph. For example, a company may have previously provided support to customers via an online chat system where customer support representatives would manually respond to customer requests. The transcripts of these chat sessions may be automatically processed using natural language processing techniques (e.g., topic modeling) to identify the most common subject matter of customer support requests, and the most common subject matters may become nodes of an action graph. Recordings of phone support calls could be used in a similar manner after converting the recordings to text using speech recognition.

Node selector classifiers may be specified by models that are trained using a training corpus. Where no existing data is available for training node selector classifiers, a training corpus may be created manually by generating text that a customer may be expected to use for various types of requests. For example, for the action graph of FIG. 4, a training corpus could be created manually by asking 100 people what phrases they would likely use to make requests corresponding to each type of node. The node selector classifiers could then be trained using this manually created corpus.

In some situations, existing data may be converted into a format that may be used as a training corpus for node selector classifiers. For example, where a company previously had online chat support, the transcripts of the chat support could be used to create a training corpus. Each text message written by a customer could be labeled by a person as corresponding to a node of the action graph. The labeled data may then be used to train node selector classifiers.

After the company has implemented a semantic response system, the customer requests may be saved to further improve node selector classifiers. The performance of the semantic response system can be manually evaluated. Where it is determined that a node selector classifier selected an incorrect node, that customer request may be labeled with the correct node and added to the training corpus to later train better node selector classifiers.

The company may obtain a labeled training corpus for training node selector classifiers using any of the techniques above. With this labeled training corpus, node selector classifiers may be created using techniques known to one of skill in the art. In some implementations, encoding techniques (from NLP feature extraction) may be trained jointly with the classifiers.

In some implementations, a node selector classifier may be created for each node independent from the other nodes in the action graph. To train a first node of the action graph, a subset of the training corpus may be extracted that relates to the first node of the action graph, and node selector classifier for the first node may be trained with that subset of the corpus. For example, if the NLP features are encoded using bag of words or term frequency inverse document frequency, the node selector models may be trained by using BFGS (Broyden-Fletcher-Goldfarb-Shanno algorithm) to minimize the cross entropy between the negative log likelihood of the data and the training labels represented as one-hot vectors. In another example, if the NLP features are encoded using a matrix of word embeddings, the node selector models may be trained by using stochastic gradient descent to minimize the cross entropy of the classifier for the labeled training data. In some implementations, the entire action graph of node selector classifiers may be trained jointly using the entire corpus of training data.

In addition to training the node selector classifiers, a threshold may need to be determined for when a score of a node is high enough for the node to be accepted as a correct choice. In some implementations, it may be decided that the threshold should be high to minimize the probability of an incorrect node being selected. As described above, each node selector classifier may have its own threshold. To determine an appropriate threshold for a node selector classifier, a precision/recall curve may be plotted for the node selector classifier (e.g., using a portion of the training corpus that was reserved for tuning the classifiers), and a point on the curve may be selected according to a desired probability for an error rate, such as a probability of a false alarm or false acceptance. Once the probability has been specified, a threshold may be determined from precision/recall curve that will allow the node selector classifier to obtain the desired error rate in practice.

The action selector classifiers may be trained in a similar manner as the node selector classifiers. Training data may be created manually, may be created by labeling an existing data set (e.g., existing online chat transcripts), or obtained from operation of the semantic response system with an initial (e.g., bootstrap) model. Once training data has been obtained, the action selector classifiers may be trained using techniques known to one of skill in the art. In some implementations, such as when the action selector classifiers are implemented using decision trees, the action selector classifiers may be created manually.

Customer Service Representative Interface

The above description of providing responses to customer requests using semantic processing allowed for an automated response (e.g., without the involvement of a person). In some situations, a customer may communicate with a CSR to obtain assistance. The customer and CSR may communicate with each other using any combination of typing messages or by speaking (e.g., using a microphone of a customer device or in a phone call).

Where the customer and CSR are communicating by text, the messages may be typed using any suitable user interface or transcribed using speech recognition. For example, the customer may type a text message, an email, into a text box on an app, or in a text box on a website. The customer may communicate with the company directly (e.g., using a company phone number, email address, app, or website) or may communicate via a third party, such as a social networking company or a third-party service (discussed in greater detail below). When the customer and CSR are communicating using speech, their speech may be transmitted to each other using any suitable interface, such as a phone call or an online communication tool (e.g., Skype or Google Hangouts).

For clarity of presentation, the following description will use text communication as an example, but the same techniques may also be used when communicating by speech.

A CSR may be assisting multiple customers simultaneously. A company may desire for its CSRs to be as efficient as possible in order to provide the best experience for customers and also to reduce costs. FIGS. 18A-Q provide examples of user interfaces that may be used by a CSR and a customer in communicating with each other. For example, FIG. 18A presents a user interface that may be used by a CSR. FIG. 18A includes a customer list portion 1810, that may include a list of customers that the CSR is currently communicating with. FIG. 18A also includes conversation portion 1820 that allows the CSR to see messages typed by a customer, type messages to the customer, and see the conversation history. FIG. 18A also includes an information portion 1830 that provides additional information to assist the CSR, such as a customer profile or trouble shooting information.

During a conversation between a customer and a CSR, each of the customer and the CSR may see the entire history of the conversation with messages from both the customer and the CSR. For example, each message transmitted by the customer may appear on a display of the customer device and in conversation portion 1820 of the CSR user interface. Each message transmitted by the CSR may also appear on the display of the customer device and in conversation portion 1820 of the CSR user interface.

A CSR user interface may include various features to facilitate the CSR in responding more quickly to customers. For example, semantic processing techniques may be used to understanding the meaning of a customer request and provide suggestions to the CSR. The following are three examples of how semantic processing may be used to assist a CSR. (1) As the CSR starts typing a response to a customer, one or more possible completions to the text may be presented on the CSR user interface to allow the CSR to select one of the completions. Selecting an appropriate completion may make the CSR more efficient because it may take less time to select a completion than to finishing typing a message. For example, if the CSR has typed "how m," a suggested completion may include "how may I help you today?" The CSR way select the completion and not have to type the entire response. (2) A list of possible complete responses may be presented to the CSR where the list of possible complete responses may be generated by processing the history of the conversation and other information (e.g., information about the customer). For example, if a customer says "The MAC address is 12345," the phrase "What is the model?" may be immediately suggested to the CSR before the CSR starts typing. (3) Resources may be automatically suggested to the CSR to provide information to the CSR or allow the CSR to perform actions. For example, if a customer is having a problem with an Internet connection, a trouble shooting procedure may be suggested to the CSR, such as in information portion 1830. These three examples of providing suggestions and/or information to a CSR are now described.

Automatic Suggestion of Completions

As a CSR starts typing a response to a customer, one or more possible completions to what the CSR is typing may be presented to allow the CSR to select one of the possible completions. The possible completions may be updated after each character or word typed by the CSR. After selecting a completion, the CSR may send it to the customer as part of the conversation. FIG. 18I illustrates an example of a suggested auto-completion for a text box 1822. In text box 1822, the CSR has typed "You're very welcome It's" and the suggested completion is "been my pleasure to help."

The techniques described herein for suggesting completions are not limited to customer support sessions and may be applied to any applications where automatic completions may assist a user. For example, automatic completions may be used when typing search terms into a search engine or when an individual types a text message to a friend.

The suggested completions need not be complete sentences or phrases. The suggested completions may provide a suggestion for characters and/or words to follow what the CSR has typed, but the suggested characters and/or words may not be a complete and/or grammatically correct phrase or sentence. As used herein, a suggested completion refers to any characters and/or words that are suggested to follow what a CSR has typed but they need not be grammatically correct or an entire message that is ready to be sent to a customer.

The auto-completion may be implemented using any appropriate techniques. In some implementations, the auto-completion may be implemented using a language model, such as a Knesser-Ney 5-gram language model. As the CSR types, sequences of likely subsequent words may be suggested. In some implementations, the subsequent words may be determined using a beam search with a language model.

Figure 9:
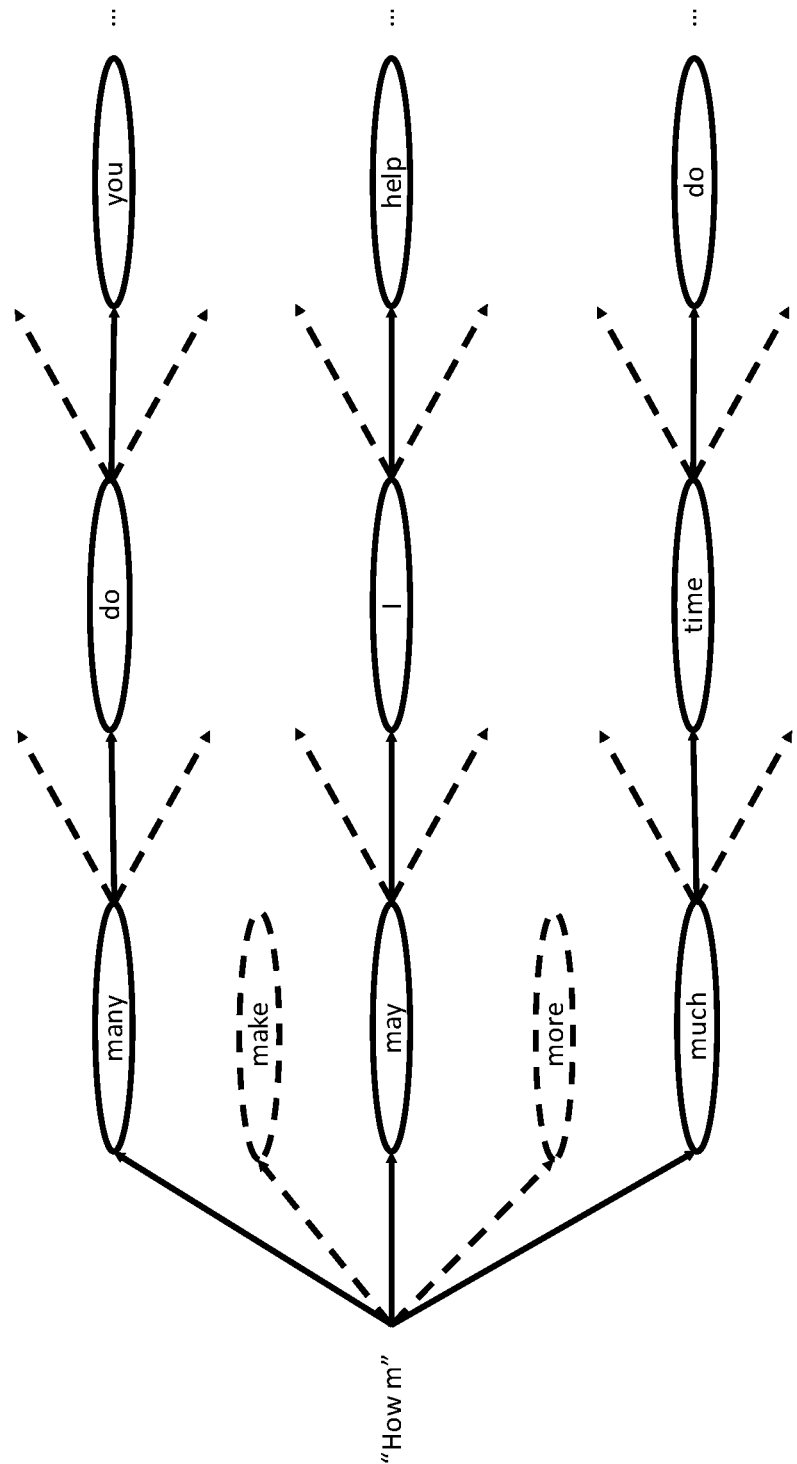
FIG. 9 illustrates a search graph that may be used to determine a completion of text using a word-based language model.

FIG. 9 illustrates an example of a search graph generated from a beam search with a language model. In the example of FIG. 9, the CSR has typed "how m," and the search graph has identified possible subsequent words. In this example, the beam width is 3, and the three highest scoring paths are "how many do you . . . ", "how may I help . . . ", and "how much time do . . . ", where the ellipses indicate possible successive words.

In creating the search graph, the first step may be to identify words that may follow what the CSR has typed and to add paths to the search graph for the most likely following words. For example, bigrams from a language model may be used to identify the most likely words that follow "how." In some implementations, the set of considered words may be limited to words that start with "m" because the CSR has already typed "m." In this example, the three most likely following words are "many," "may," and "much," and these are added to the search graph as active paths.

Next, each of the active paths may be extended by identifying the most likely following words for each active path and retaining the top three extended paths. For example, for each active path, trigrams from a language model may be used to select a next word, compute path scores, and retain the top scoring paths. In this example, the most likely paths are "how many do," "how may I", and "how much time." Similarly, the paths may continue to be extended until a termination criteria is reached for each active path.

One or more auto-complete suggestions may then be obtained from the search graph and presented to the CSR.

For example, the top scoring suggestion, a top number of scoring suggestions, or all suggestions with a score above a threshold may be presented. The CSR may then select a suggestion and transmit it to the customer.

Many variations of the above example of a beam search using a language model are possible, and the techniques described herein are not limited to the above example. Any appropriate techniques known by one of skill in the art for performing auto-completion using a beam search with a language model may additionally be used.

The language model used for auto-completion may be general in that it is the same for all CSRs for all conversations with all customers. The language model may also be more specific in that it is generated for particular CSRs or categories of CSRs, customers or types of customers, or particular topics. For example, a company have different groups of CSRs (e.g., one group may handle technical support and another group may handle billing), and a language model may be created for each group. In another example, a language model may be created for each CSR that is adapted to the communication style of that particular CSR.

In some implementations, language models may be created for different topics. For example, a company may identify multiple topics (e.g., the nodes or leaves of the action graph of FIG. 4) and create a language model for each topic. During a conversation between a customer and a CSR, the conversation history and other information may be used to select a topic of the support session (e.g., one of the previously identified topics). A language model corresponding to the selected topic may then be used to perform auto-completion for the CSR. In some implementations, the topic may be updated after each communication between the customer and the CSR, and where the topic changes, a language model for the new topic may then be used to perform auto-completion for the CSR.

The language models used for auto-completion may be trained using any appropriate techniques. The training data may be obtained from previous support sessions, such as all support sessions, support sessions with a particular CSR, support sessions with high performing CSRs, or support sessions relating to particular topics (e.g., where previous sessions are manually annotated). The data used to train language models may be preprocessed, such as by performing normalization or tokenization. Any appropriate training techniques may be used for training language models, such as the expectation-maximization algorithm.

In some implementations, auto-complete may be implemented using a neural network language model, such as a recurrent neural network (RNN) language model implemented with long short-term memory units. In some implementations, a neural network language model may use other information in addition to text already typed by the CSR, and this other information may be used to improve the performance of the auto-complete. For example, the other information may include previous messages in the session or a topic model. A neural network language model for implementing auto-completion may be word based or character based, and the following describes a character-based implementation.

Figure 10:
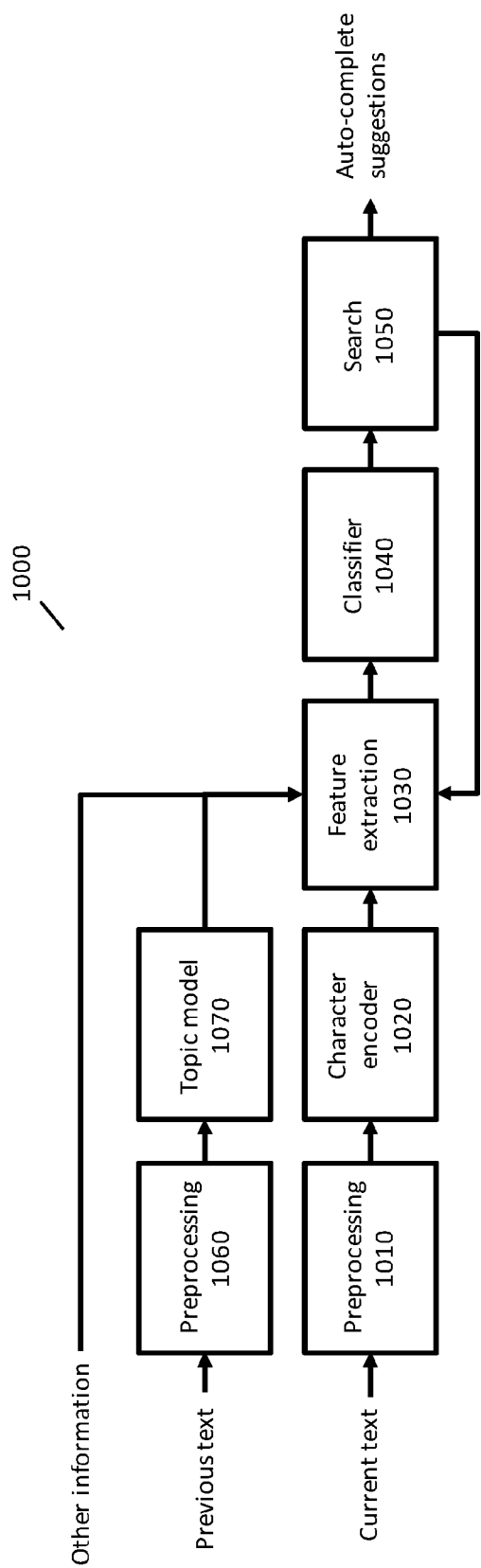
FIG. 10 illustrates a system for determining completions of text using a classifier.

FIG. 10 illustrates a system 1000 for implementing auto-completion with a neural network. In FIG. 10, current text is received. The current text may be text typed into a text entry box, such as text typed by a CSR.

FIG. 10 includes a preprocessing component 1010 that may convert the current text into a suitable form for further processing. For example, a set of allowed characters may be defined, such as a set of 70 common keyboard characters, and each character in the current text may be mapped to an index of the allowed set. For characters outside of the allowed set, the characters may be discarded or mapped to a special character to represent unknown characters.

FIG. 10 includes a character encoder component 1020 that may further process the current text. In some implementations, the current text may be encoded using 1-hot vectors. For example, where 70 characters are allowed, each character may be converted into a 1-hot vector of length 70, where one element of the vector is one and the other elements are all zero. The encoded current text may also include a special 1-hot vector that indicates the start of the encoded current text.

FIG. 10 includes a feature extraction component 1030 that may determine a feature vector using the encoded characters of the current text. In some implementations, a feature vector may be computed using a neural network. For example, an RNN may be implemented as follows.

Let $x_t$ represent 1-hot vectors for t from 1 to N, where N indicates the number of characters received (possibly including a special start vector). Let M be the hidden vector size of the RNN. The following may be computed iteratively for t from 1 to N to obtain a feature vector:

$$g_t^1 = \sigma(U_1 x_1 + V_1 h_{t-1} + b_1)$$
$$g_t^2 = \sigma(U_2 x_1 + V_2 h_{t-1} + b_2)$$
$$g_t^3 = \sigma(U_3 x_1 + V_3 h_{t-1} + b_3)$$
$$g_t^4 = \tanh(U_4 x_1 + V_4 h_{t-1} + b_4)$$
$$\sigma(x)_i = \frac{1}{1 + e^{-x_i}}$$
$$\tanh(x)_i = \frac{e^{x_i} - e^{-x_i}}{e^{x_i} + e^{-x_i}}$$
$$c_t = g_t^2 \odot c_{t-1} + g_t^1 \odot g_t^4$$
$$h_t = g_t^3 \odot \tanh(c_t)$$

where the $U_i$ are M by N matrices of parameters, $V_i$ are M by M matrices of parameters, $b_i$ are vectors of parameters of length M, $\odot$ is the element-wise multiplication operator, $h_0$ is initialized as a zero vector, and $c_0$ is initialized as a zero vector. After computing the above, the vector $h_t$ is a feature vector that may be used for subsequent processing.

FIG. 10 includes a classifier component 1040 that may be used to determine one or more characters that may follow the current text using the feature vector. Any appropriate classifier may be used, such as a logistic regression classifier. For example, a logistic regression classifier may be implemented as follows.

A logistic regression classifier may have as parameters, a matrix W and a vector b. The matrix W may have M rows and N columns and the vector b may have length N. The classifier may compute scores using the following equation $$p(c_t = k_i | c_1, c_2, \ldots, c_{t-1}) = \text{SoftMax}(W h_t + b)_i$$

where $k_i$ represents the $i^{th}$ character of the allowed characters. Accordingly, the classifier may determine a score (e.g., a likelihood or probability) for each character that may follow characters that have already been typed. For example, where the current text is "How m", a score may be generated for each possible subsequent character.

FIG. 10 includes a search component 1050 that may be used to identify the highest scoring sequences of characters that may follow the current text. In some implementations, search component 1050 may perform a search for high scoring sequences using a beam search as described above. Search component 1050 may create a search graph and add or extend paths in the search graph using the scores received from classifier component 1040.

Figure 11:
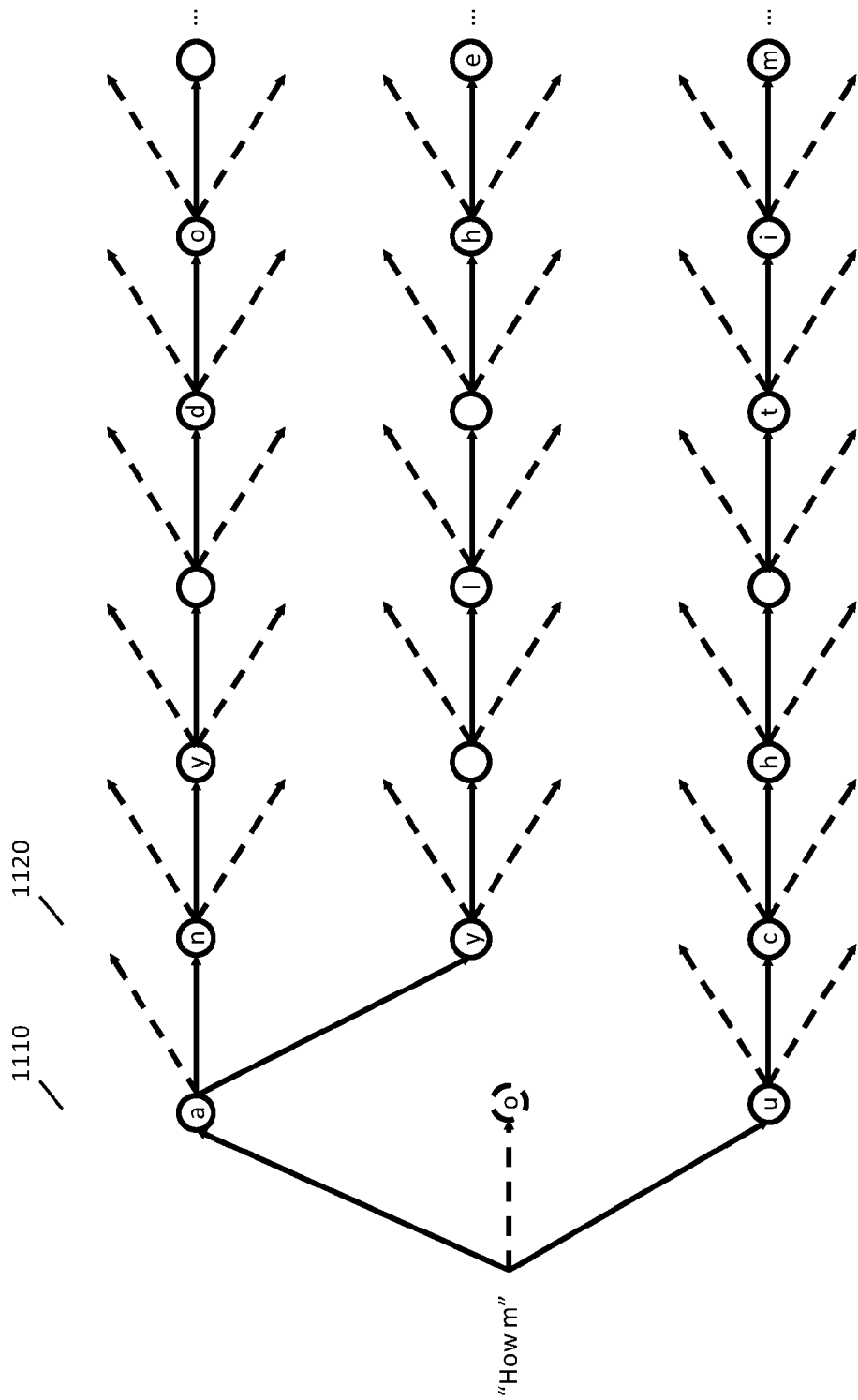
FIG. 11 illustrates a search graph that may be used to determine a completion of text using a character-based language model.

FIG. 11 illustrates an example of a search graph that may be created by search component 1050. In FIG. 11, the current text is shown on the left, and possible sequences of subsequent characters are shown. In this example, the beam width is 3, and the highest scoring sequences are "How many do you . . . ", "How may I he . . . ", and "How much tim . . . ", where the ellipses indicate possible subsequent characters. At the first step of building the search graph, the characters "a", "o", and "u" are the three characters with the highest scores and added as paths to the search graph.

To further add subsequent characters to the search graph, processing may return to feature extraction component 1030 for each character added to the search graph (or optionally preprocessing component 1010 or character encoder component 1020, where needed). Feature extraction component 1030 may compute a new feature vector that takes into account the new character that was added to a search path. For example, where feature extraction component 1030 is implemented using an RNN, a new feature vector $h_{t+1}$ may be computed using the encoded new character, the previous feature vector $h_t$, and the state of the RNN stored in $c_t$.

This above process may be repeated to determine scores for successive characters, and as above, the search graph may be updated and the highest scoring paths retained. In the example of FIG. 11, a first stage of processing 1110, added the nodes "a", "o", and "u" to the search graph. At a second stage of processing 1120, paths were considered for characters that could follow "a", "o", and "u". At the second stage, the paths "How man", "How may", and "How muc" had the highest scores. Accordingly, the path "How mo" was removed from the search and that path was discarded or marked as inactive. This process may be repeated to build a search graph as shown in FIG. 11 where the dashed lines indicated paths that were considered but discarded during the beam search.

The search process may finish when an appropriate termination criteria has been met. For example, the search may terminate when each active path exceeds a length threshold or reaches an end of phrase marker. After the search is completed, one or more high scoring paths through the search graph may then be presented as possible auto-completions to a user.

The above description of determining auto-completion suggestions used only the current text when determining features for performing auto-completion. In some implementations, previous messages from the same conversation may be used to improve the auto-completion results. For example, the CSR may currently be typing a message in response to the customer saying "I am having a problem with my Internet connection." The content of the previous message from the customer (and other previous messages in the conversation) may be able to improve the results of the auto-completion for the current text being typed by the CSR. Previous messages in the conversation will be referred to as previous text to distinguish the current text being typed by the CSR.

In some implementations, a topic vector may be computed from the previous text, and the topic vector may be used during the feature extraction process. FIG. 10 includes a preprocessing component 1060 (which may be different from preprocessing component 1010) that may preprocess the previous text by performing any appropriate operations, such as converting the text to lower case, removing punctuation, and performing tokenization.

FIG. 10 includes a topic model component 1070 that may generate a topic vector from the preprocessed previous text. Topic model component 1070 uses a previously-trained topic model to process the previous text and produce a topic vector. Each element of the topic vector may be a score (e.g., a probability or a likelihood) that indicates a match between the previous text and a topic. A topic model may be trained on an existing corpus of customer support data using algorithms such as latent semantic indexing, latent Dirichlet allocation, or an autoencoder (such as a variational autoencoder). The topics of the topic model may be generative in that they are deduced from the training data rather than specified. The topic model may be a supervised topic model or an unsupervised topic model.

Feature extraction component 1030 may receive the topic vector and use the topic vector in performing feature extraction. In some implementations, feature extraction component 1030 may combine the encoded text (from character encoder component 1020 or search component 1050) with the topic vector, such as concatenating the two sets of data to create a longer vector. The combined vector may then be the $x_t$ in the processing described above. In some implementations the topic vector may be combined with an encoded character vector for each iteration of processing by feature extraction component 1030.

In some implementations, other information may be used by feature extraction component 1030 in computing a feature vector. For example, an identification of the customer, an identification of the customer service representative, or information about a customer, such as data from a customer profile, may be combined with an encoded character vector when performing feature extraction.

The parameters of feature extraction component 1030 (e.g., a neural network or RNN) and classifier component 1040 (e.g., a logistic regression classifier) need to be trained using an appropriate training corpus. For example, existing customer support session logs may be used to train these parameters. For example, an RNN may be trained by minimizing the cross entropy between the negative log likelihood of the training corpus and encoded character input using stochastic gradient descent. A logistic regression classifier may be trained, for example, by minimizing the cross-entropy of the model for a labeled training corpus.

Figure 12:
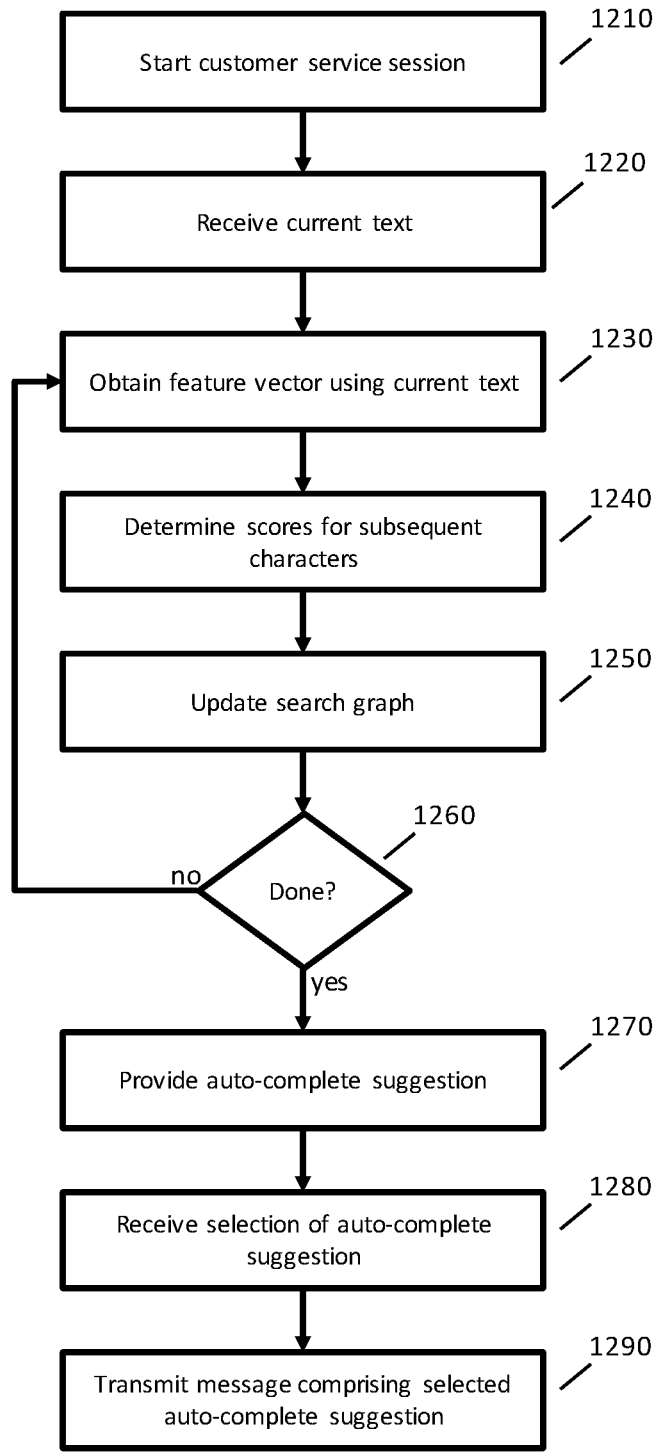
FIG. 12 is a flowchart of an example implementation of a determining a completion of text using semantic processing.

FIG. 12 is a flowchart of an example implementation of suggesting completions to a CSR. In FIG. 12, the ordering of the steps is exemplary and other orders are possible, not all steps are required and, in some implementations, some steps may be omitted or other steps may be added. The process of the flowcharts may be implemented, for example, by any of the computers or systems described herein.

At step 1210, a customer service is session is started between a customer and a CSR, and at step 1220, current text is received. The current text may be text entered by a CSR using any appropriate input mechanism, such as a keyboard or using speech recognition.

At step 1230, features are obtained for the current text, such as a feature vector. Any appropriate techniques may be used to obtain a features for the current text. In some implementations, the current text may be preprocessed or encoded before extracting features, for example, using any of the techniques described above. In some implementations, the current text may be processed with a neural network, such as an RNN. For example, the current text may be processed iteratively where each iteration processes a character of the current text. In some implementations, other information may be used during the feature extraction process. For example, an encoded representation of a character may be combined with a topic vector describing previous messages in the session, and this combined data may be input into a neural network at each iteration.

At step 1240, scores are determined for one or more characters that may follow the current text. In some implementations, a score may be computed for each allowed character (e.g., the 70 common keyboard characters). Any appropriate techniques may be used to determine the scores, such as processing the feature vector from the previous step with a classifier. Any appropriate classifier may be used, such as a logistic regression classifier.

At step 1250, a search graph is updated. In some implementations, paths of the search graph may be extended using the characters and scores from the previous step. Path scores may be computed for extended paths, and some paths with lower path scores may be discarded. A beam search algorithm may be used to decide with paths to maintain and which paths to discard.

At step 1260, it is determined if the process is complete. Any appropriate criteria may be used to determine whether the process is complete. In some implementations, the process may be complete when (i) the lengths of the paths have exceeded a threshold or (ii) all the paths of the search graph have reached a node indicating an end of a phrase.

If processing is not complete, then processing may proceed to step 1230 for each active path of the search graph. Steps 1230, 1240, and 1250 may be repeated to further extend each active path of the search graph.

If processing is complete, then processing proceeds to step 1270 where auto-complete suggestions are provided. One or more top scoring paths from the search graph may be used to determine auto-complete suggestions. For example, a top scoring path, a number of top scoring paths, or paths with a score exceeding a threshold may be used to provide auto-complete suggestions. The auto-complete suggestions may be presented to the CSR using any appropriate techniques, such as displaying the auto-complete suggestions below a text box where the CSR is entering text.

At step 1280, a selection of an auto-complete suggestion by a CSR is received. For example, a CSR may click on a suggestion using a mouse or touch a suggestion on a touch screen.

At step 1290, a message is sent to the customer using the selected auto-complete suggestion. For example, the text typed by the CSR may be combined with the selected auto-complete suggestion and transmitted to the customer using any appropriate messaging techniques.

In some implementations, suggested completions may be provided to a user as described in the following clauses, combinations of any two or more of them, or in combination with other clauses presented herein.

1. A computer-implemented method for suggesting a completion to text entered by a user, the method comprising:
   receiving text of a message from a first user;
   generating a topic vector using the text of the message from the first user, wherein each element of the topic vector comprises a score corresponding to a topic of a plurality of topics;
   causing the message to be presented to a second user;
   receiving text entered by the second user;
   generating a first feature vector using the topic vector and the text entered by the second user;
   identifying a first plurality of characters to follow the text entered by the second user by processing the first feature vector, wherein the first plurality of characters comprises a first character;
   generating a second feature vector using the topic vector and the first character;
   identifying a second plurality of characters to follow the first character by processing the second feature vector, wherein the second plurality of characters comprises a second character; and
   generating a suggested completion to the text entered by the second user, the suggested completion comprising the first character and the second character.

2. The computer-implemented method of clause 1, wherein generating the topic vector comprises using text of a second message between the first user and the second user.

3. The computer-implemented method of clause 1, wherein generating the first feature vector comprises using a neural network.

4. The computer-implemented method of clause 3, wherein the neural network comprises a recurrent neural network with long short-term memory units.

5. The computer-implemented method of clause 1, wherein identifying the first plurality of characters comprises processing the first feature vector with a classifier.

6. The computer-implemented method of clause 5, wherein the classifier comprises a logistic regression classifier.

7. The computer-implemented method of clause 1, wherein the first user is a customer of a company and the second user is a customer service representative of the company.

8. A system for suggesting a completion to text entered by a user, the system comprising:
   at least one server computer comprising at least one processor and at least one memory, the at least one server computer configured to:
   receive text of a message from a first user;
   generate a topic vector using the text of the message from the first user, wherein each element of the topic vector comprises a score corresponding to a topic of a plurality of topics;
   cause the message to be presented to a second user;
   receive text entered by the second user;
   generate a first feature vector using the topic vector and the text entered by the second user;
   identify a first plurality of characters to follow the text entered by the second user by processing the first feature vector, wherein the first plurality of characters comprises a first character;
   generate a second feature vector using the topic vector and the first character;
   identify a second plurality of characters to follow the first character by processing the second feature vector, wherein the second plurality of characters comprises a second character; and
   generate a suggested completion to the text entered by the second user, the suggested completion comprising the first character and the second character.

9. The system of clause 8, wherein the at least one server computer is configured to generate the first feature vector using a neural network.

10. The system of clause 8, wherein the at least one server computer is configured to generate the first feature vector by:
   generating a sequence of 1-hot vectors using the text entered by the second user;
   generating a sequence of input vectors by combining each of the 1-hot vectors with the topic vector; and processing the sequence of input vectors with a neural network.

11. The system of clause 8, wherein the at least one server computer is configured to generate the suggested completion by creating a graph, wherein the first character corresponds to a first node of the graph and the second character corresponds to a second node of the graph.

12. The system of clause 11, wherein the at least one server computer is configured to generate the suggested completion by selecting the suggested completion using a beam search algorithm and the graph.

13. The system of clause 8, wherein the at least one server computer is configured to:
present the suggested completion to the second user;
receive a selection of the suggested completion by the second user;
transmit a message to the first user, the transmitted message comprising the suggested completion.

14. The system of clause 8, wherein the at least one server computer is configured to generate a second suggested completion to the text entered by the second user, the second suggested completion comprising the first character and the second character.

15. One or more non-transitory computer-readable media comprising computer executable instructions that, when executed, cause at least one processor to perform actions comprising:
receiving text of a message from a first user;
generating a topic vector using the text of the message from the first user, wherein each element of the topic vector comprises a score corresponding to a topic of a plurality of topics;
causing the message to be presented to a second user;
receiving text entered by the second user;
generating a first feature vector using the topic vector and the text entered by the second user;
identifying a first plurality of characters to follow the text entered by the second user by processing the first feature vector, wherein the first plurality of characters comprises a first character;
generating a second feature vector using the topic vector and the first character;
identifying a second plurality of characters to follow the first character by processing the second feature vector, wherein the second plurality of characters comprises a second character; and
generating a suggested completion to the text entered by the second user, the suggested completion comprising the first character and the second character.

16. The one or more non-transitory computer-readable media of clause 15, wherein generating the topic vector comprises using an autoencoder.

17. The one or more non-transitory computer-readable media of clause 15, wherein generating the first feature vector comprises using a neural network.

18. The one or more non-transitory computer-readable media of clause 17, wherein the neural network comprises a recurrent neural network.

19. The one or more non-transitory computer-readable media of clause 15, wherein identifying the first plurality of characters comprises processing the first feature vector with a classifier.

20. The one or more non-transitory computer-readable media of clause 19, wherein the classifier comprises a logistic regression classifier.

Automatic Suggestion of Responses

When a CSR receives a message from a customer, complete responses may be presented as suggestions to the CSR as possible responses. Where one of the responses is appropriate, the CSR may simply select the response instead of typing it. For example, where a customer types "My Internet connection is not working," a suggested response may include "I'm sorry to hear that. Let me help you with that." The suggested responses may be determined using the message received from the customer, other previous messages in the conversation, and/or any other relevant information.

The techniques described herein for suggesting responses are not limited to customer support sessions and may be applied to any applications where response suggestions may assist a user. For example, suggested responses may be used when an individual types a text message to a friend.

FIG. 18D illustrates an example of a suggested response 1821. In FIG. 18D the suggested response is presented next to a text box where the CSR may type a response. Instead of typing a response, the CSR may select the suggested response. Selecting the suggested response may send it to the customer or may copy it to the text box to allow the CSR to review and/or edit before sending.

The automatic suggestion of responses may be implemented using any appropriate techniques. In some implementations, suggestions for responses may be determined by using conversation features that describe previous messages in the conversation and response features to iteratively generate the words of a suggested response.

Figure 13:
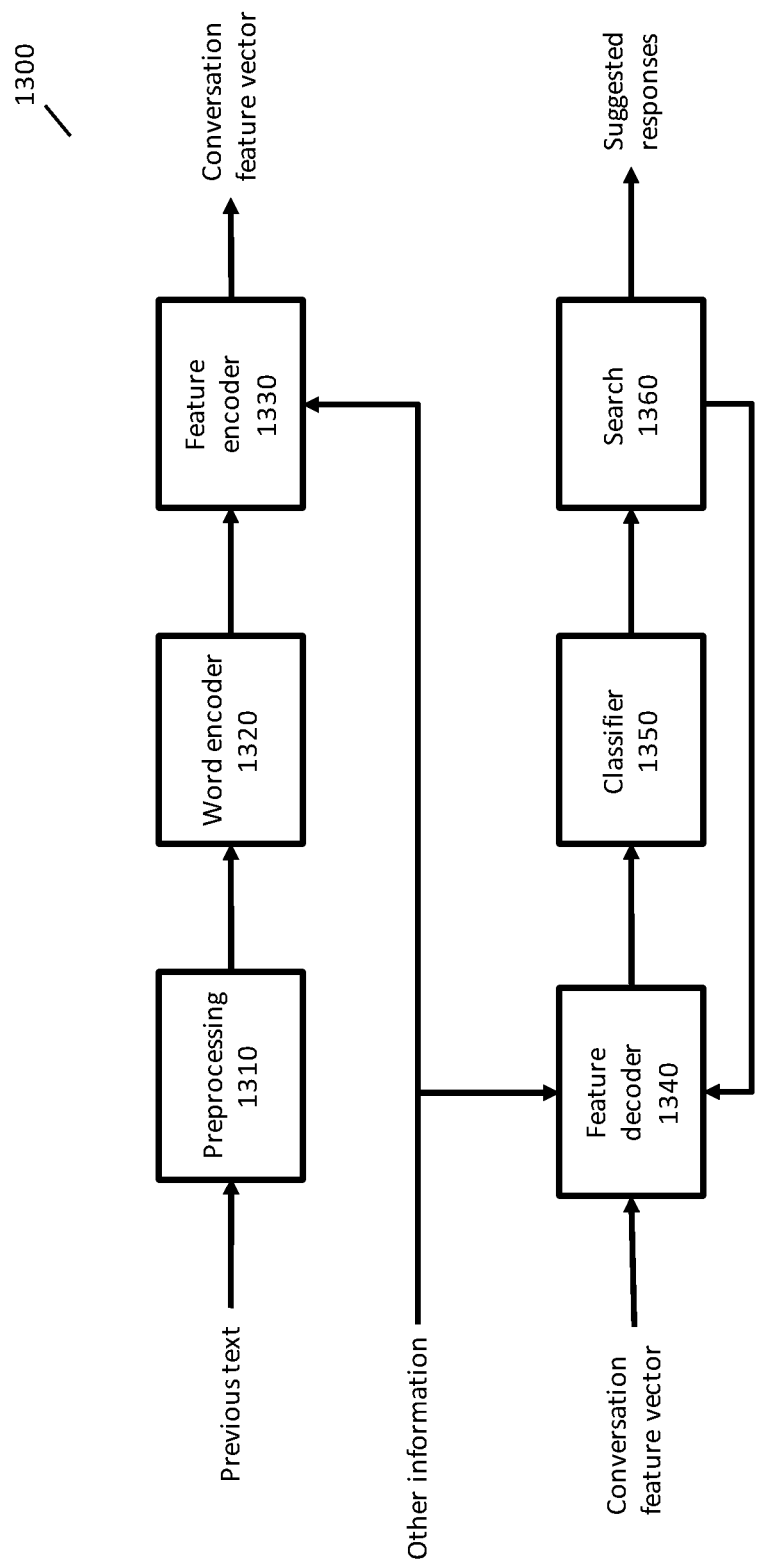
FIG. 13 illustrates a system for determining suggested responses using semantic processing.

FIG. 13 illustrates a system 1300 for implementing auto-suggestion of responses. In FIG. 13, previous text of a communications session is received. For example, the previous text may correspond to one or more messages between a customer and a CSR.

FIG. 13 includes a preprocessing component 1310 that may preprocess the previous text by performing any appropriate operations, such as converting the text to lower case, removing punctuation, and performing tokenization.

FIG. 13 includes a word encoder component 1320 that further processes the preprocessed previous text to generate a vectorized representation of the previous text. For example, each word of the previous text may be represented as a vector and the vectors for the words may be combined to represent the previous text as a matrix, which may be referred to as a word matrix. In some implementations, a neural network may be used to create the word matrix from the previous text. In some implementations, for example, each vectorized word may have a length of 50 to 500 elements. Accordingly, if there are N words in the previous text, the word matrix output by word encoder component 1320 may have N columns and 50 to 500 rows (or vice versa).

FIG. 13 includes a feature encoder component 1330 that encodes the word matrix received from word encoder component 1320 into a conversation feature vector. The conversation feature vector may be any feature vector that describes or relates to the meaning of the messages in the conversation. In some implementations, feature encoder component 1330 may use a neural network, such as an RNN or an RNN with long short-term memory units, as described above. Feature encoder component 1330 may iteratively process each word of the previous text by iteratively processing each column of the word matrix. For example, for a first iteration of an RNN, $x_1$ (in the RNN equations above) may be the first column of the word matrix, for a second iteration, $x_2$ may be the second column of the word matrix and so forth. After processing all of the words of the previous text, feature encoder component 1330 may output a conversation feature vector that may be denoted as $h_N^{conversation}$.

The conservation feature vector output by feature encoder component 1330 represents the previous text. This conservation feature vector may then be input into feature decoder component 1340 to generate suggested responses.

Feature decoder component 1340 may also use a neural network to decode the conversation feature vector into a response feature vector that may be used to generate words for suggested responses. In some implementations, the neural network may be an RNN or an RNN with long short-term memory units, as described above. Feature decoder component 1340 may iteratively process input feature vectors (e.g., a conversation feature vector or a response feature vector) and output a response feature vector at each iteration.

Feature decoder component 1340 may be initialized using information obtained from the final iteration of feature encoder component 1330. For example, where feature decoder component 1340 is implemented with an RNN, the initial response feature vector, denoted as $h_0^{response}$, may be set to the value of $h_N^{conversation}$, and $c_0$ may be initialized to $c_N$ from the last iteration of feature encoder component 1330. At the first iteration of feature decoder component 1340, the input to the RNN, $x_0$, may be a special vector indicating the beginning of a phrase. The RNN may output a response feature vector that may be referred to as $h_1^{response}$.

FIG. 13 includes classifier component 1350 that may process a response feature vector received from feature decoder component 1340 and determine one or more words for a suggested response. For example, the first iteration of classifier component 1350 may determine one or more words that may start a suggested response. Classifier component 1350 may use any appropriate classifier, such as a logistic regression classifier. For example, a logistic regression classifier may determine a score for each word of an allowed set of words, and a number of top scoring words may be selected as words that may be used for a suggested response.

FIG. 13 includes a search component 1360 that may be used to identify high scoring sequences of words that may be used for a suggested response. In some implementations, search component 1360 may perform a search for high scoring sequences words using a beam search as described above. Search component 1360 may create a search graph and add or extend paths in the search graph using the scores received from classifier component 1350.

Figure 14:
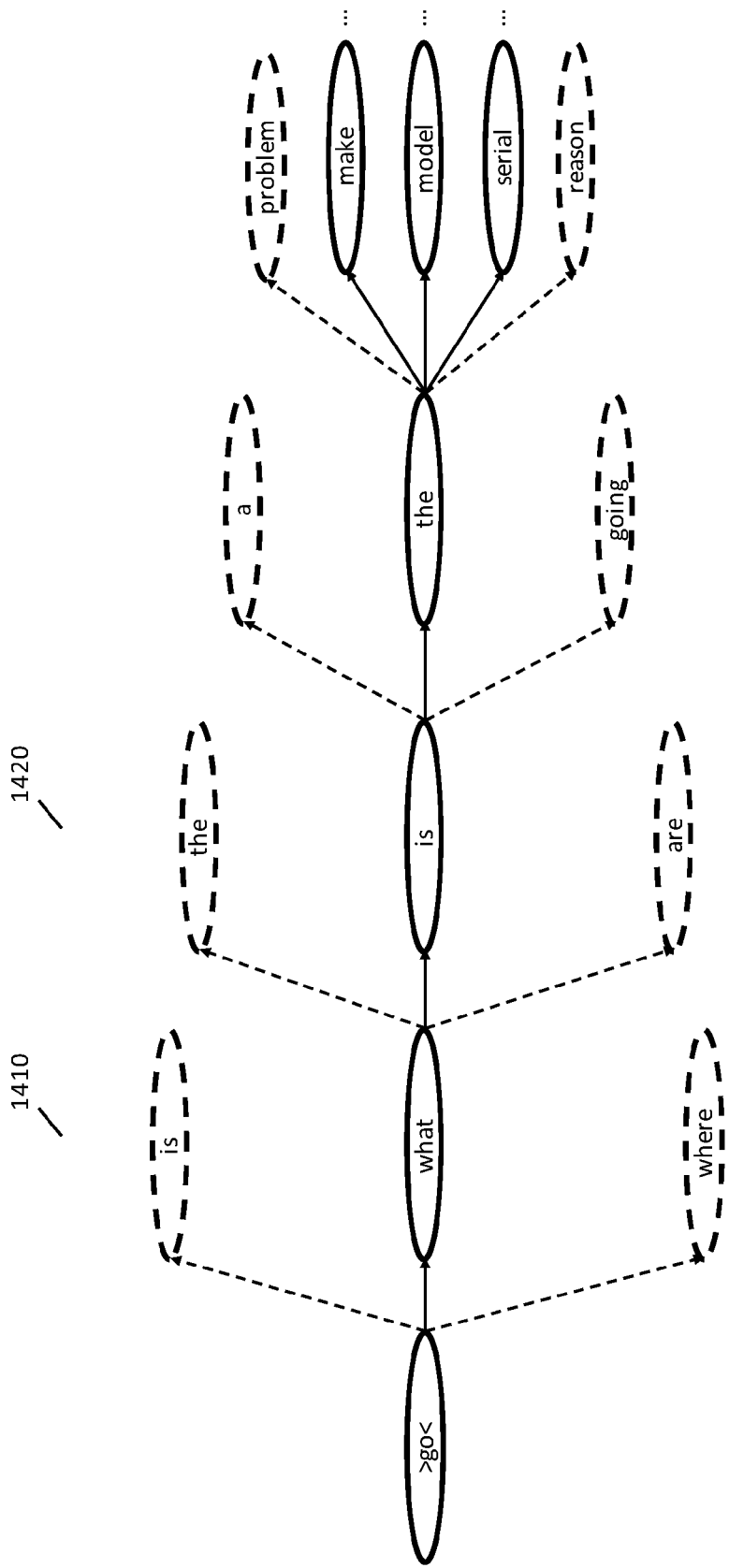
FIG. 14 illustrates a search graph that may be used to suggest a response.

FIG. 14 illustrates an example of a search graph that may be created by search component 1360. In FIG. 14, the special beginning token ">go<" is shown on the left, and possible sequences of subsequent words are shown. In this example, the beam width is 3, and the highest scoring sequences are "what is the make . . . ", "what is the model . . . ", and "what is the serial . . . ", where the ellipses indicate possible subsequent words. At the first step of building the search graph, the words "is", "what", and "where" are the three words with the highest scores and added as paths to the search graph.

To further add subsequent words to the search graph, processing may return to feature decoder component 1340 for each word added to the search graph (the new words may be encoded before returning to feature decoder component 1340). Feature decoder component 1340 may compute a new response feature vector that takes into account the new word that was added to a search path. For example, where feature extraction component 1340 is implemented using an RNN, a new response feature vector $h_{t+1}^{response}$ may be computed using the encoded new word, the previous response feature vector $h_t^{response}$ and the state of the RNN stored in $c_t$.

This above process may be repeated to determine scores for successive words, and as above, the search graph may be updated and the highest scoring paths retained. In the example of FIG. 14, a first stage of processing 1410, added the nodes "is", "what", and "where" to the search graph. At a second stage of processing 1420, paths were considered for words that could follow "is", "what", and "where". At the second stage, the paths "what the", "what is", and "what are" had the highest scores. Accordingly, the paths "is" and "where" were removed from the search and those paths were discarded or marked as inactive. This process may be repeated to build a search graph as shown in FIG. 14 where the dashed lines indicated paths that were considered but discarded during the beam search.

The search process may finish when an appropriate termination criteria has been met. For example, the search may terminate when each active path reaches an end of phrase marker. After the search is completed, one or more high scoring paths through the search graph may then be presented as possible suggested responses to a user.

In some implementations, other information may be used to improve the suggested responses. The other information may include any of the information described above, such as an identifier of the customer, an identifier of the CSR, or other information about the customer (e.g., as obtained from a customer profile). The other information may be used by components of the system 1300, such one or both of feature encoder component 1330 and feature decoder component 1340. The other information may be combined with other input to the components. For feature encoder component 1330, the other information may be appended to one or more vectorized words output by word encoder component 1320. For feature decoder component 1340, the other information may be appending to one or more of the conversation feature vector or the response feature vectors that are processed by feature decoder component 1340.

In some implementations, the suggested responses may include tokens that indicate types of information to be inserted. For example, possible tokens may indicate the name, gender, address, email address, or phone number of the customer. These tokens may be indicated using special symbols, such as ">name<" for the customer's name. Where a suggested response includes such a token, a post-processing operation may be performed to replace the token with the corresponding information about the customer. For example, a token ">name<" may be replaced with the customer's name before suggesting the response to the CSR.

The parameters of feature encoder component 1330 (e.g., a neural network or RNN), feature decoder component 1340 (e.g., another neural network), and classifier component 1350 (e.g., a logistic regression classifier) need to be trained using an appropriate training corpus. For example, existing customer support session logs may be used to train these parameters. For example, an RNN and/or a logistic regression classifier may be trained by minimizing the cross entropy between the negative log likelihood of the training corpus and encoded word input using stochastic gradient descent.

Figure 15:
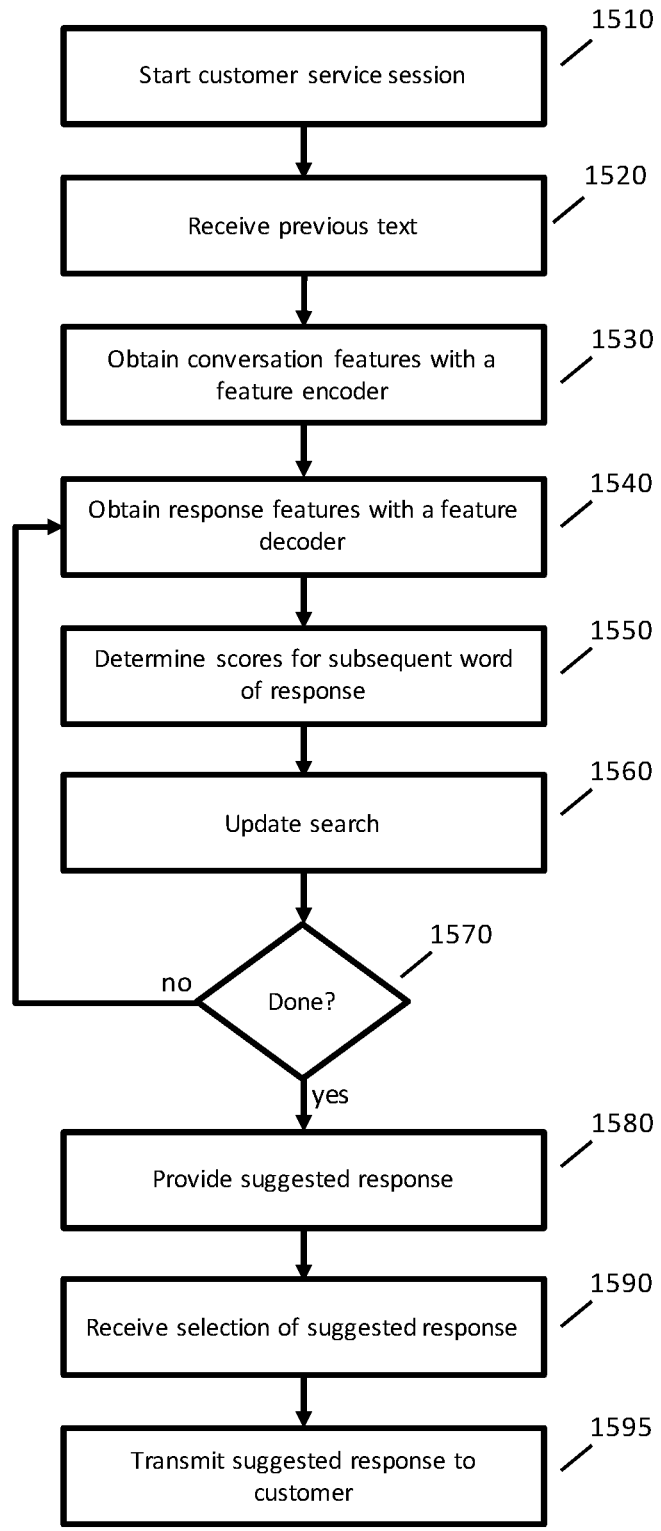
FIG. 15 is a flowchart of an example implementation of a suggesting a response using semantic processing.

FIG. 15 is a flowchart of an example implementation of suggesting responses to a CSR. In FIG. 15, the ordering of the steps is exemplary and other orders are possible, not all steps are required and, in some implementations, some steps may be omitted or other steps may be added. The process of the flowcharts may be implemented, for example, by any of the computers or systems described herein.

At step 1510, a customer service is session is started between a customer and a CSR, and at step 1520, previous text is received. The previous text may include any previous text sent by a customer or a CSR. In some implementations, the previous text may include, for example, all messages in the current conversation between the customer and the CRS or a number of most recent messages between them. The text may be entered using any appropriate input mechanism, such as a keyboard or using speech recognition.

At step 1530, conversation features are obtained for the previous text, such as a conversation feature vector. Any appropriate techniques may be used to obtain conversation features for the previous text. In some implementations, conversation features may be obtained by preprocessing the previous text, encoding the words of the previous text, and then obtaining conversation features from the encoded words. In some implementations, a neural network, such as an RNN, may be used to generate conversation features. For example, the previous text may be processed iteratively where each iteration processes a word of the previous text. In some implementations, other information may be used to generate conversation features. For example, information about the customer may be appended to an encoded word vector before processing the encoded word vector with a neural network.

At step 1540, response features are obtained, such as a vector of response features. For a first iteration of step 1540, response features may be obtained from the conversation features of step 1530. For later iterations of step 1540, response features may be obtained from the response features from a previous iteration. Any appropriate techniques may be used to obtain response features. In some implementations, a neural network, such as an RNN, may be used to generate response features. For example, a first iteration may generate response features by processing a special token indicating the beginning of a phrase and the conversation features with a neural network. Later iterations, may generate response features by processing a previously generated word and response features from a previous iteration. In some implementations, other information may be used to generate response features. For example, information about the customer may be appended to response features before processing them with a neural network.

At step 1550, scores are determined for one or more words that may start a phrase (at a first iteration) or follow a previously generated words (for iterations after the first). In some implementations, a score may be computed for each allowed word (e.g., all the words in a known words dictionary). Any appropriate techniques may be used to determine the scores, such as processing the response features with a classifier. Any appropriate classifier may be used, such as a logistic regression classifier.

At step 1560, a search graph is updated. In some implementations, paths of the search graph may be extended using the words and scores from the previous step. Path scores may be computed for extended paths, and some paths with lower path scores may be discarded. A beam search algorithm may be used to decide with paths to maintain and which paths to discard.

At step 1570, it is determined if the process is complete. Any appropriate criteria may be used to determine whether the process is complete. In some implementations, the process may be complete when all the paths of the search graph have reached a node indicating an end of a phrase.

If processing is not complete, then processing may proceed to step 1540 for each active path of the search graph. Steps 1540, 1550, and 1560 may be repeated to further extend each active path of the search graph.

If processing is complete, then processing proceeds to step 1580 where suggested responses are provided. One or more top scoring paths from the search graph may be used to determine suggested responses. For example, a top scoring path, a number of top scoring paths, or paths with a score exceeding a threshold may be used to provide suggested responses. The suggested responses may be presented to the CSR using any appropriate techniques, such as displaying the suggested responses below a text box where the CSR may enter text.

At step 1590, a selection of a suggested response by a CSR is received. For example, a CSR may click on a suggested response using a mouse or touch a suggestion on a touch screen.

At step 1595, a message is sent to the customer using the selected suggested response, and the message may be sent using any appropriate messaging techniques.

In some implementations, suggested responses may be provided to a user as described in the following clauses, combinations of any two or more of them, or in combination with other clauses presented herein.

1. A computer-implemented method for suggesting a response to a received message, the method comprising:
    receiving text of a message from a first user;
    generating a conversation feature vector using a first neural network and the text of the message from the first user;
    generating a first response feature vector using the conversation feature vector and a second neural network;
    generating a first plurality of suggested words using the first response feature vector, wherein the first plurality of words comprises a first suggested word;
    generating a second response feature vector using the first suggested word, the first response feature vector, and the second neural network;
    generating a second plurality of suggested words using the classifier and the second response feature vector, wherein the second plurality of suggested words comprises a second suggested word;
    generating a suggested response to the message from the first user using the first suggested word and the second suggested word.
2. The computer-implemented method of clause 1, wherein generating the conversation feature vector comprises using text of a message from the second user to the first user.
3. The computer-implemented method of clause 1, wherein the first neural network comprises a recurrent neural network with long short-term memory units.
4. The computer-implemented method of clause 1, wherein generating the first plurality of suggested words comprises processing the first response feature vector with a classifier.
5. The computer-implemented method of clause 4, wherein the classifier comprises a multinomial logistic regression classifier.
6. The computer-implemented method of clause 1, further comprising:
    causing the suggested response to be presented to the second user;
    receiving a selection of the suggested response by the second user;
    transmitting the suggested response to the first user.

7. The computer-implemented method of clause 1, wherein the first user is a customer of a company and the second user is a customer service representative of the company.

8. A system for suggesting a response to a received message, the system comprising:

at least one server computer comprising at least one processor and at least one memory, the at least one server computer configured to:

receive text of a message from a first user;

generate a conversation feature vector using a first neural network and the text of the message from the first user;

generate a first response feature vector using the conversation feature vector and a second neural network;

generate a first plurality of suggested words using the first response feature vector, wherein the first plurality of words comprises a first suggested word;

generate a second response feature vector using the first suggested word, the first response feature vector, and the second neural network;

generate a second plurality of suggested words using the classifier and the second response feature vector, wherein the second plurality of suggested words comprises a second suggested word;

generate a suggested response to the message from the first user using the first suggested word and the second suggested word.

9. The system of clause 8, wherein the first neural network comprises a recurrent neural network.

10. The system of clause 8, wherein the at least one server computer is configured to generate the suggested response by creating a graph, wherein the first suggested word corresponds to a first node of the graph and the second suggested word corresponds to a second node of the graph.

11. The system of clause 10, wherein the at least one server computer is configured to generate the suggested response by selecting the suggested response using a beam search algorithm and the graph.

12. The system of clause 8, wherein the at least one server computer is configured to generate the first conversation vector or the first response feature vector comprises using an identity of the first user, an identity of the second user, or information about the first user.

13. The system of clause 8, wherein the at least one server computer is configured to generate the first plurality of suggested words by processing the first response feature vector with a classifier.

14. The system of clause 13, wherein the classifier comprises a multinomial logistic regression classifier.

15. One or more non-transitory computer-readable media comprising computer executable instructions that, when executed, cause at least one processor to perform actions comprising:

receiving text of a message from a first user;

generating a conversation feature vector using a first neural network and the text of the message from the first user;

generating a first response feature vector using the conversation feature vector and a second neural network;

generating a first plurality of suggested words using the first response feature vector, wherein the first plurality of words comprises a first suggested word;

generating a second response feature vector using the first suggested word, the first response feature vector, and the second neural network;

generating a second plurality of suggested words using the classifier and the second response feature vector, wherein the second plurality of suggested words comprises a second suggested word;

generating a suggested response to the message from the first user using the first suggested word and the second suggested word.

16. The one or more non-transitory computer-readable media of clause 15, wherein generating the conversation feature vector comprises encoding the message from the first user with a matrix of word embeddings and processing the encoded message with the first neural network.

17. The one or more non-transitory computer-readable media of clause 15, wherein the first neural network is an encoder neural network and the second neural network is a decoder neural network.

18. The one or more non-transitory computer-readable media of clause 15, further comprising generating a second suggested response using the first suggested word and the second suggested word.

19. The one or more non-transitory computer-readable media of clause 15, wherein the first neural network comprises a recurrent neural network.

20. The one or more non-transitory computer-readable media of clause 15, wherein generating the first plurality of suggested words comprises processing the first response feature vector with a classifier.

Automatic Suggestion of Resources

A CSR may need to access various types of resources when assisting a customer. As used herein, a resource may include any information used by a CSR to assist a customer or any user interface that allows the CSR to access information or perform an action. Ordinarily, a CSR may have to spend a significant amount of time in navigating a user interface to obtain needed resources. The following are several examples of resources that may be used by a CSR to assist a customer.

A CSR may need to use a troubleshooting tree to assist a customer with a problem (e.g., the customer's Internet connection is not working). In some existing implementations, a CSR may need to navigate to a user interface that provides access to troubleshooting trees and then find a desired troubleshooting tree. Where a large number of troubleshooting trees are available, it may be a time consuming process to find the desired troubleshooting tree.

A CSR may need to obtain information about products and services to respond to a customer's question. For example, a customer may want to know if a particular cable modem is compatible with the network in the customer's home. To find details about a particular product or service (e.g., a cable modem), the CSR may need to navigate to a user interface that provides information about products and services, and then find a particular product or service. Where a large number of products or services are available, it may again be a time consuming process.

A CSR may need to obtain information about a particular transaction, such as a purchase of an item (e.g., a movie rental) or an invoice or payment of an invoice. Again, it may be time consuming for a CSR to navigate a user interface to find information about a particular transaction or to take an action regarding a particular transaction (e.g., provide a refund for a purchase item).

Figure 18B:
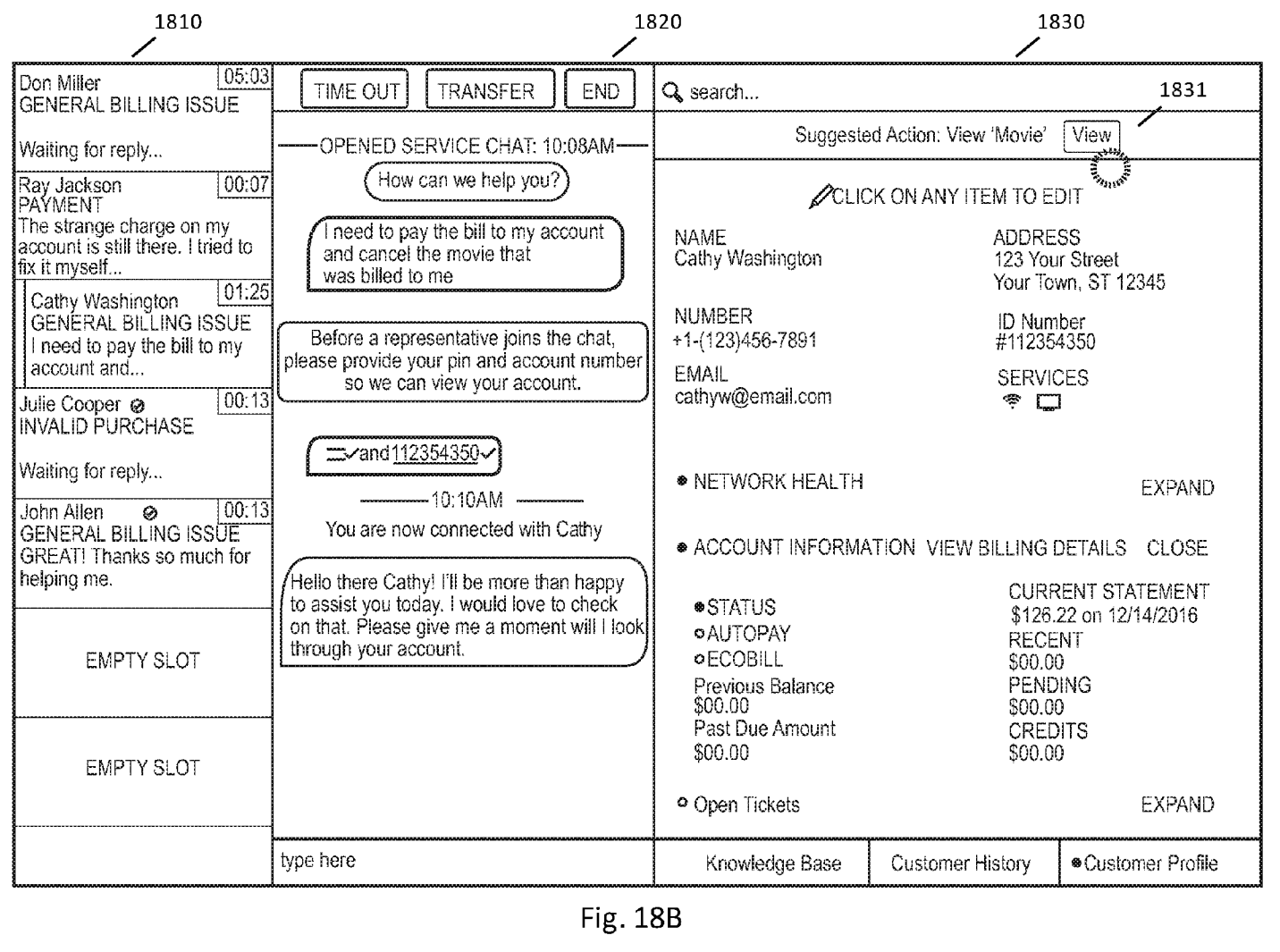
Figure 18E:
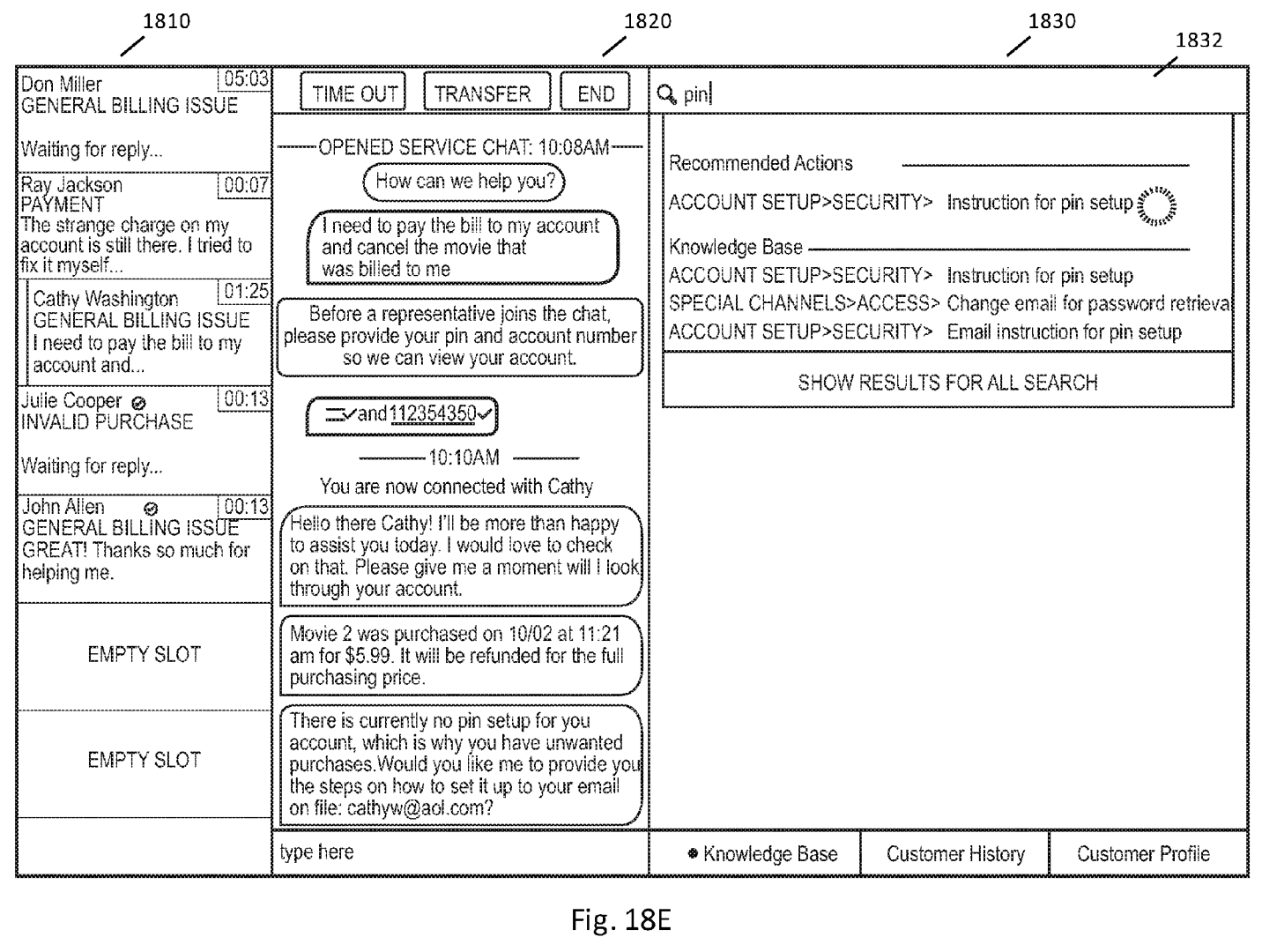
Figure 18F:
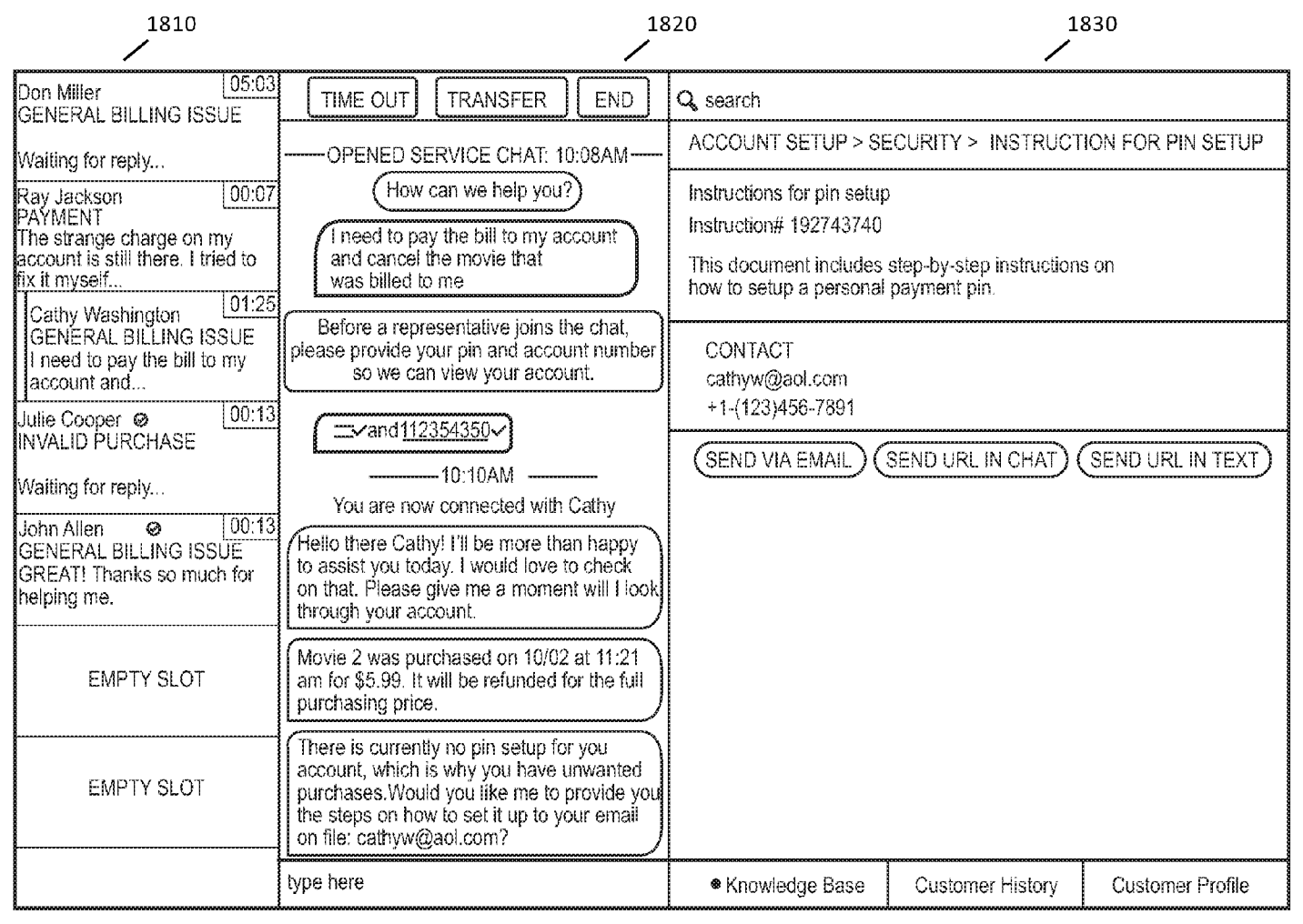
Figure 18G:
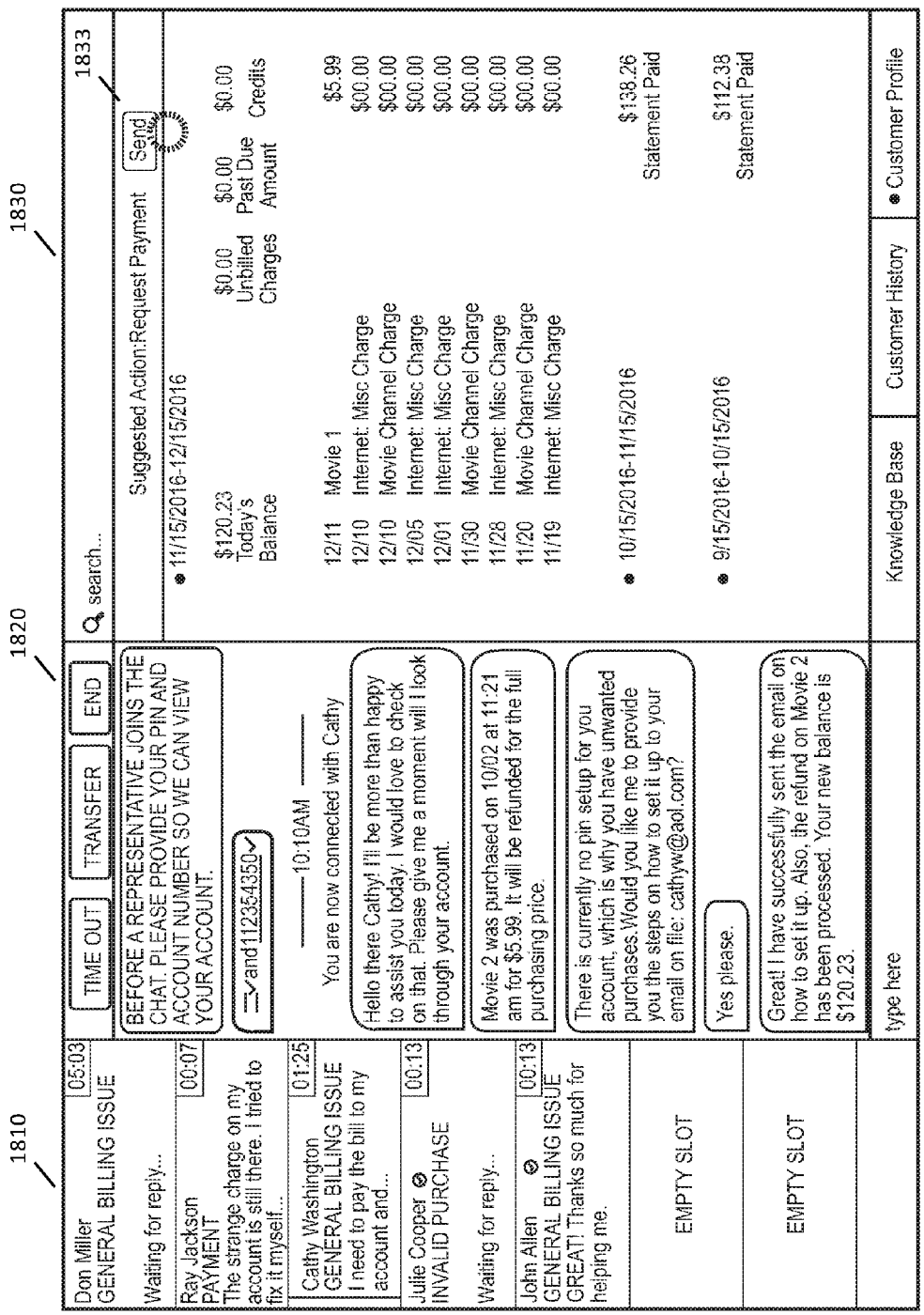
FIGS. 18A-18Q illustrate example user interfaces for a customer support session between a customer and a customer support representative.
Figure 18H:
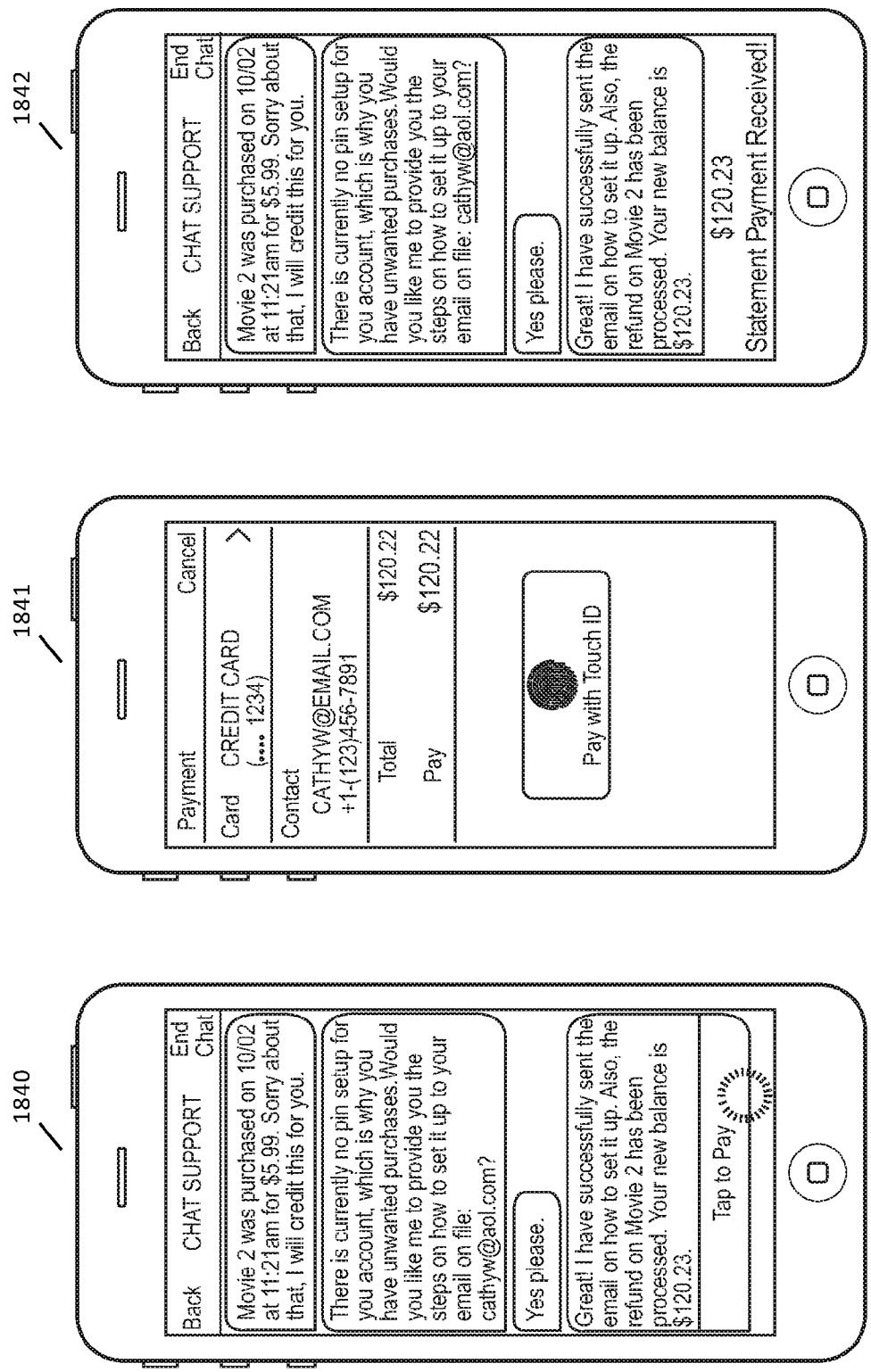
Figure 18I:
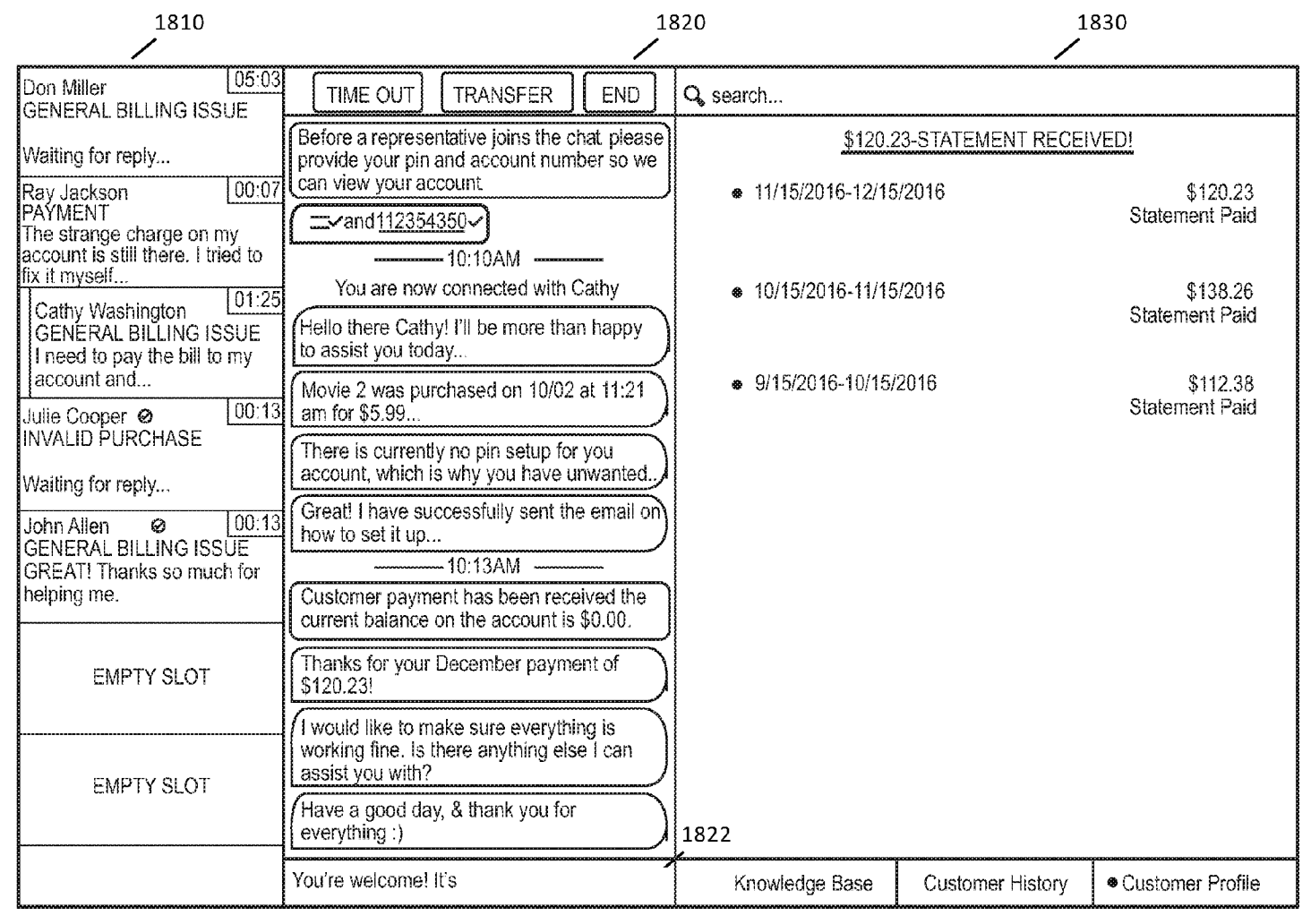
Figure 18J:
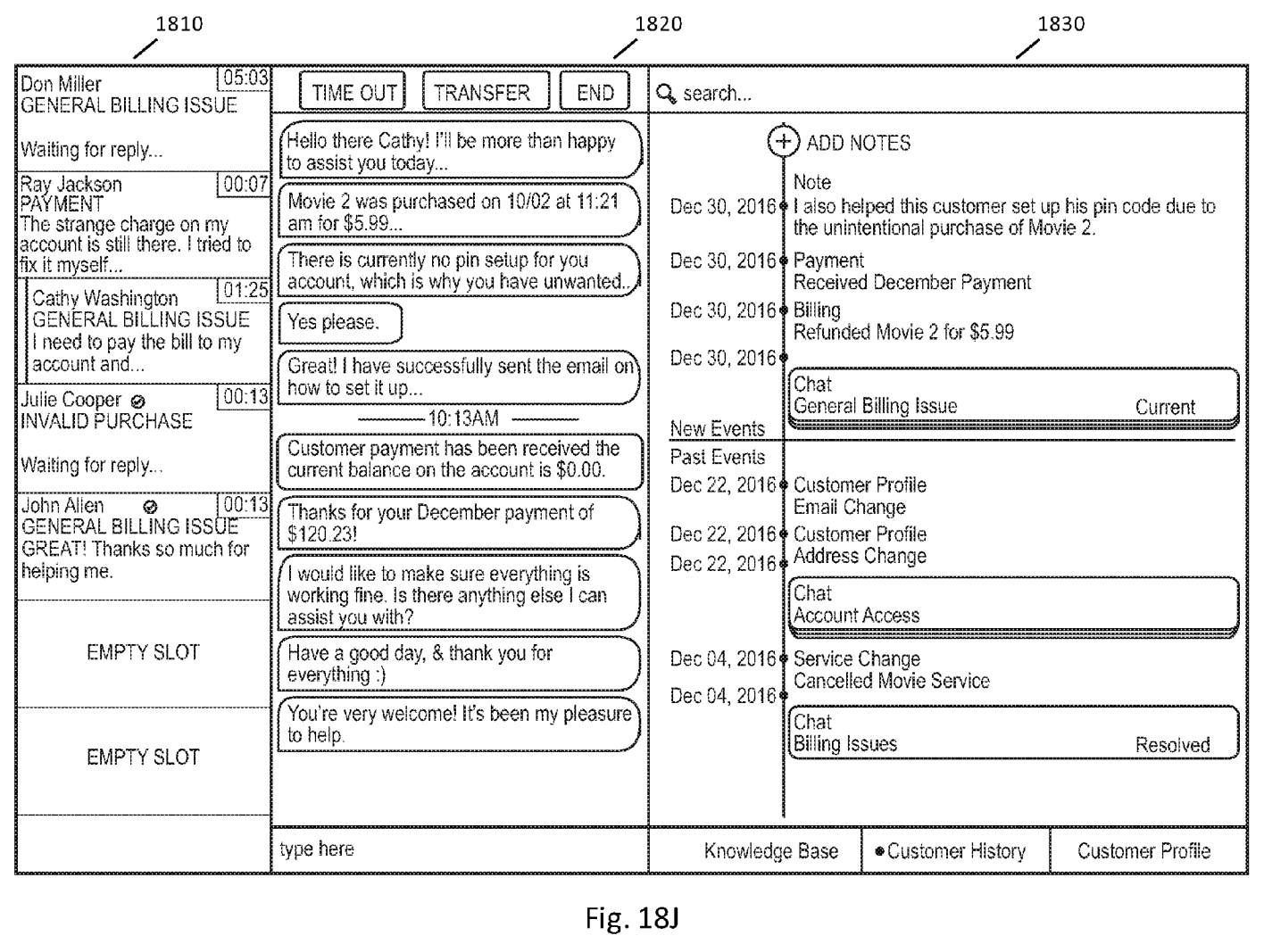
Figure 18K:
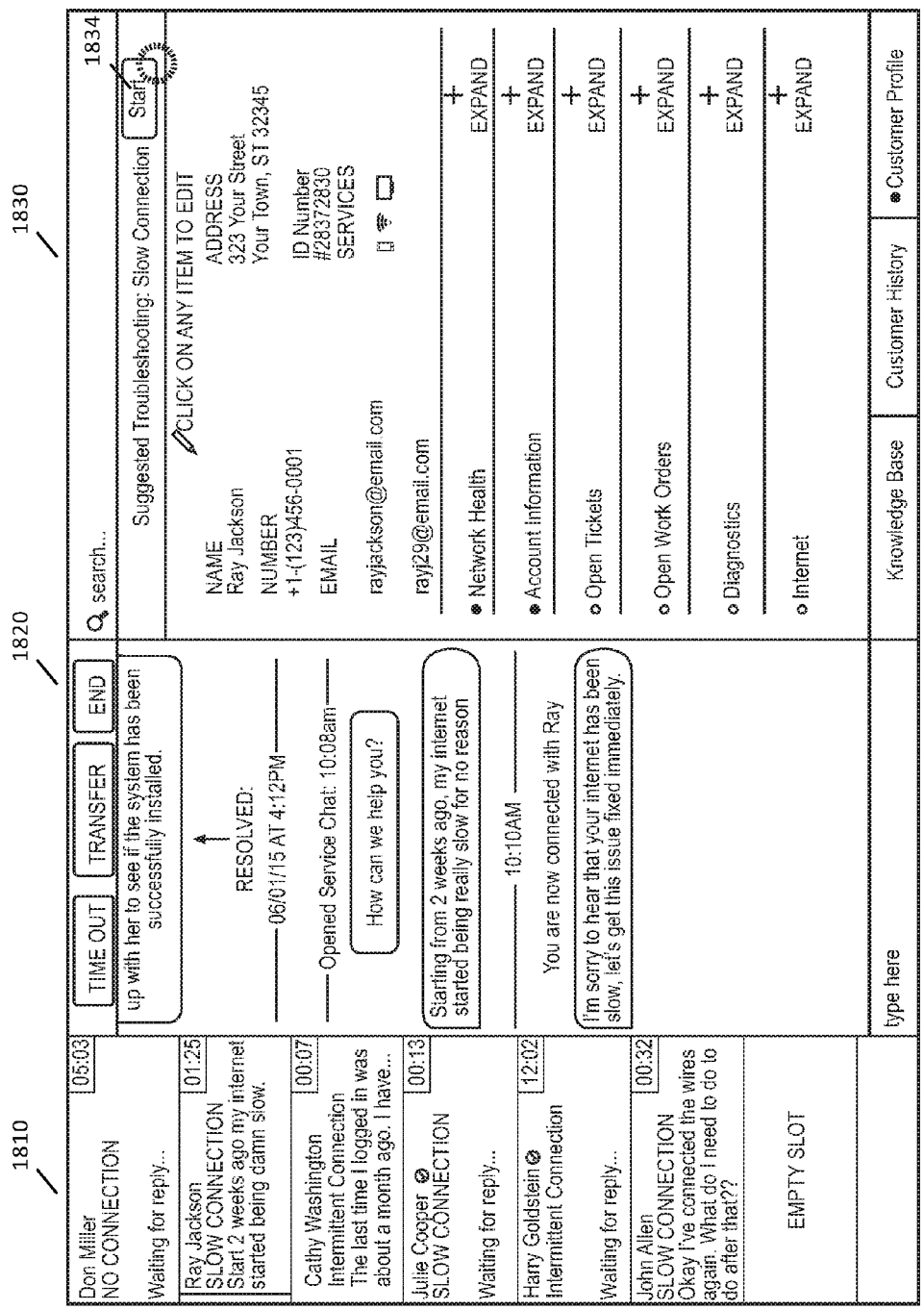

FIGS. 18B, 18G, and 18K illustrate examples of automatically suggesting resources. In FIG. 18B, the suggested resource allows the CSR to quickly review a transaction referenced by the customer in a message. In FIG. 18G, the suggested resource allows the CSR to send the customer a payment request. In FIG. 18K, the suggested resource allows the CSR to access a trouble shooting tree to solve the issue stated by the customer.

Semantic processing of messages may be used to automatically suggest resources to a CSR. After each message between a customer and a CSR, one or more of the messages may be processed to anticipate the needs of the CSR and update the CSR user interface (or a portion of it) to suggest a resource relevant to the conversation. The resource may, for example, provide information to the CSR and/or allow the CSR to take an action.

Figure 16:
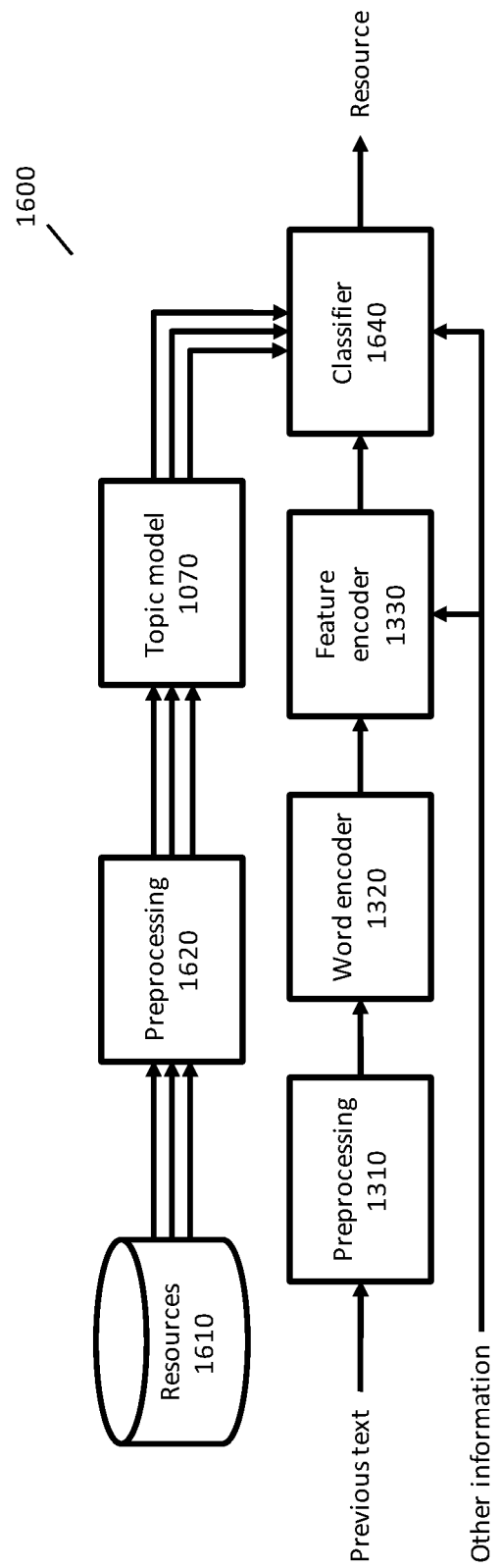
FIG. 16 illustrates a system for suggesting a resource using semantic processing.

FIG. 16 illustrates a system 1600 for suggesting a resource to a CSR. FIG. 16 includes a resources data store 1610 that may store information about resources that may be presented to a CSR. Resources data store 1610 may include any relevant information about resources, including but not limited to the following: a text description of the resource, text that may be presented for a resource, or instructions or code (e.g., HTML or Javascript) for presenting the resource. For example, resources data store 1610 may store text corresponding to the nodes of a troubleshooting tree and/or information indicating how to present the troubleshooting tree to a CSR. In some implementations, software stored in other locations may retrieve the text of the troubleshooting tree and format it appropriately for presentation to a CSR.

During a conversation between a CSR and a customer, the text of the conversation may relate to a resource. To identify resources that are relevant to the conversation, features may be computed for each resource, and these features may be compared to the text of the conversation to identify resources that are relevant to the conversation. Any appropriate features may be used for a resource, such as a feature vector or a topic model. In some implementations, a topic vector may be computed for each resource.

In the example of FIG. 16, a preprocessing component 1620 and a topic model component 1070 may be used to obtain a topic vector for resources. Preprocessing component 1620 may implement any of the techniques described above for preprocessing component 1060 of FIG. 10, and may implement additional techniques for performing preprocessing of resources. For example, preprocessing component 1620 may be configured to extract information about a resource from resources data store 1610 that is relevant to computing a topic vector for a resource. Topic model component 1070 may implement any of the techniques of topic model component 1070 of FIG. 10. In some implementations, topic model component 1070 may be replaced more generally with a feature vector component that computes feature vectors describing a resource.

The system of FIG. 16 may compute a topic vector for each resource stored in resources data store 1610. In some implementations, some or all of the topic vectors may be computed in advance and the topic vectors may be stored for later use. For example, the topic vectors may also be stored in resources data store 1610 in association with the corresponding resources.

The system of FIG. 16, may process the topic vectors for the resources to identify resources that are relevant to the current conversation. For example, the topic vectors may be compared to conversation features computed from one or more messages between a customer and a CSR. The one more messages between a customer and a CSR may be referred to as previous text.

To obtain conversation features for the previous text, the previous text may be processed using preprocessing component 1310, word encoder component 1320, and feature encoder component 1330. These components may be implemented using any of the techniques described above for the corresponding components of FIG. 13. As above, feature encoder component 1330 may output a conversation feature vector that describes the previous text and may process other information, such as an identification of the customer, an identification of the customer service representative, or information about a customer, such as data from a customer profile.

FIG. 16 includes a classifier component 1640 that may select one or more resources that are relevant to the conversation between the customer and the CSR. Classifier component 1640 may select one or more resources by processing the conversation feature vectors received from feature encoder component 1330 and topic vectors (or other feature vectors) corresponding to resources.

Classifier component 1640 may include any appropriate classifier for selecting a resource using the conversation feature vector describing the previous text and the topic vectors describing the resources. In some implementations, classifier component 1640 may be implemented using a multi-layer perceptron (MLP) classifier, such as a two-layer MLP with a sigmoid output.

In some implementations, an MLP may be implemented as follows. Let x be a conversation feature vector received from feature encoder 1330 that describes the previous text of the conversation. Let y be a topic vector for a resource. Let z be a vector that is a concatenation of x and y. Let N be a size of the MLP model. A score indicating a match between the resource and the conversation may be computed as follows:

$$h_1 = \text{relu}(W_1 z + b_1)$$

$$h_2 = \text{relu}(W_2 h_1 + b_2)$$

$$\text{relu}(x)_i = \max(x_i, 0)$$

$$s(x,y) = \sigma(W_3 h_2)$$

where matrices $W_1$ and $W_2$ are matrices of parameters of size N by N; vectors $W_3$, $b_1$, and $b_2$ are vectors of parameters of size N; and $\sigma(\ )$ is the sigmoid function as described above. The score $s(x, y)$ may indicate a match between the previous text and the resource.

Using classifier component 1640, a score may be computed for each resource, and one or more resources may be selected using the scores. For example, a top scoring resource may be selected if the score is above a threshold, all resources with a score above a threshold may be selected, or a top scoring number of resources may be selected. In some implementations, classifier component 1640 may also use other information in generating scores, such as an identification of the customer, an identification of the customer service representative, or information about a customer.

In some implementations, other techniques may be applied to reduce computations when selecting a resource, for example, where there are a large number of resources. For example, the feature vectors for the resources (e.g., topic vectors) may be clustered into different clusters using an algorithm such as k-means clustering. Selecting a resource may then proceed in multiple steps to reduce overall computations. First, a centroid may be computed for each cluster, where the centroid represents an approximate value of the feature vectors in the cluster. The computation of the cluster centroids may be performed in advance. Second, a highest scoring cluster is selecting using the classifier and the centroids for the clusters. Third, one or more high scoring resources are selected from the selected cluster by computing scores for the resources in the selected cluster using the feature vectors corresponding to the resources.

In some implementations, classifier component 1640 may be implemented using a distance, such as a cosine distance. A distance may be computed between the conversation feature vector for the previous text and a feature vector for each of the resources. A resource may be selected that is closest to the previous text according to the distance metric. In some implementations, the computations may be reduced by using techniques, such as locally-sensitive hashing, to select a resource that is closest to the previous text. For example, a random projection method may be used to create one or more hashes that may be used to select a resource with a minimum distance to the previous text.

The one or more selected resources may then be presented to a CSR. For example, data corresponding to the selected resource may be retrieved from resources data store 1610, instructions may be created for presenting the resource (e.g., HTML), and the resource may be presented to a CSR. Where the resource allows a CSR to take an action, a selection of an action by the CSR may be received and the action may be performed.

In some implementations, a selected resource may have one or more parameters or slots that need to be filled in. For example, a resource may relate to viewing a transaction for the purchase of the movie, and an identifier of the movie or the name of the movie may be a slot that needs to be filling in before presenting the resource to the CSR. In some implementations, the slot may be filled by processing the previous text (e.g., using named entity recognition techniques) and/or information from the customer profile. For example, the name of the movie may be in the previous text or obtained from a history of the customer's purchases. The slot in the resource may then be filled in, and the filled in resource presented to the CSR.

The parameters of the classifier of classifier component 1640 may be trained using any appropriate techniques. For example, where the classifier includes an MLP classifier, the MLP classifier may be trained using a corpus of training data and minimizing a triplet rank loss for the corpus. The corpus of training data may include transcripts of conversations between customers and CSRs where the conversations have been labeled (either manually or automatically) with resources that are appropriate to the conversations.

In some implementations, the classifier may be trained as follows. Let $x_1$ be a conversation feature vector (e.g., as produced by feature encoder component 1330) for a first conversation of the training corpus and let $y_1$ be a topic vector (e.g., as produced by topic model component 1070) for a resource that has been determined to be relevant to the conversation (e.g., determined manually or automatically). Let $x_2$ be a conversation feature vector for another conversation that is randomly selected from the training corpus. The parameters of the model may be trained by minimizing the triplet rank loss:

$$l(x_1, x_2, y_1) = \max(1 - s(x_1, y_1) + s(x_2, y_1), 0)$$

This function may be minimized using any appropriate techniques, such as stochastic gradient descent. The above process may be repeated for other conversations in the training corpus until a desired convergence has been obtained.

Figure 17:
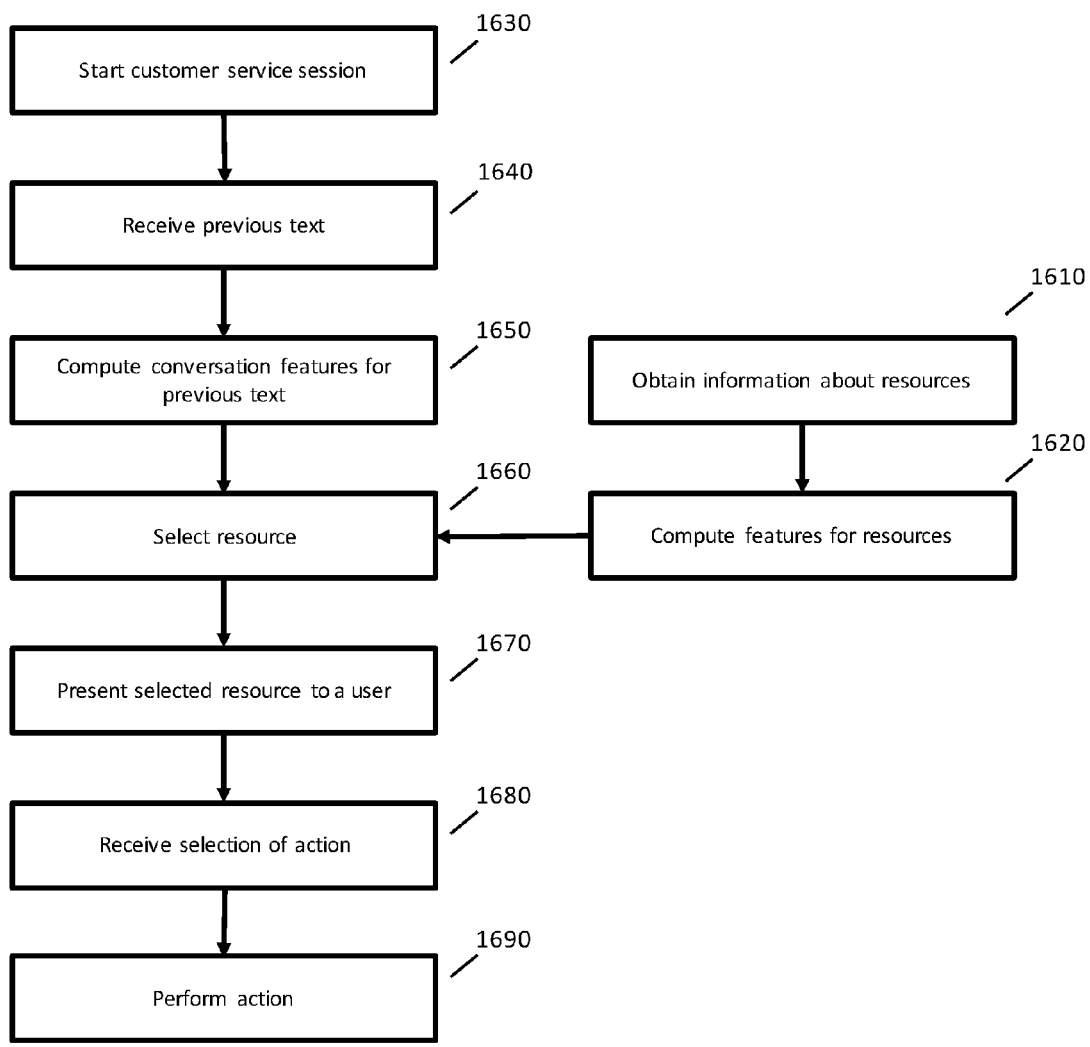
FIG. 17 is a flowchart of an example implementation of a suggesting a resource using semantic processing.

FIG. 17 is a flowchart of an example implementation of automatically suggesting a resource to a CSR. In FIG. 17, the ordering of the steps is exemplary and other orders are possible, not all steps are required and, in some implementations, some steps may be omitted or other steps may be added. The process of the flowcharts may be implemented, for example, by any of the computers or systems described herein.

At step 1710, information about resources are obtained. The information about the resources may include any text that is descriptive of or relevant to the resources. The resources may include any of the resources described above.

At step 1720, features are computed for each resource. Any appropriate features may be used, such as a feature vector or topic vector computed for each resource using text that is descriptive of or relevant to the resource. Steps 1710 and 1720 may be computed once in advance of the subsequent steps of FIG. 17.

At step 1730, a customer service session is started, and at step 1740, previous text of the customer service session is received. These steps may be performed using any of the techniques described above for steps 1510 and 1520 of FIG. 15.

At step 1750, conversation features are computed that describes the previous text. Any appropriate conversation features may be used, such as a conversation feature vector created using a neural network, such as an RNN.

At step 1760, a resource is selected using the conversation features for the previous text and the features for the resources. For example, a classifier, such as an MLP classifier, may compute a score for each resource, and one or more resources may be selected using the scores. For example, a resource with a highest score may be selected if the score is above a threshold.

At step 1770, the selected resource is presented to a CSR. For example, data corresponding to the resource may be converted into a format to allow the resource to be presented on a display. In some implementations, HTML may be generated using data of the resource and an HTML template. The resource may be presented using any appropriate techniques. For example, where the CSR user interface is a web page, AJAX techniques may be used to modify a portion of the user interface to present the resource to the CSR.

In some implementations, the selected resource may present relevant information to the CSR, and in some implementations, the selected resource may include an action that may be taken by the CSR. For example, the resource may include a selectable item, such as a button, that the CSR may click to perform an action. Where the selected resource allows the CSR to take an action, processing may proceed to steps 1780 and 1790.

At step 1780, a selection of an action by the CSR is received. For example, the CSR may click the selectable item on the displayed resource. At step 1790, the action is performed. For example, the action may correspond to issuing a refund to the customer, or asking the customer a question relevant to troubleshooting a problem.

In some implementations, resources may be suggested to a user as described in the following clauses, combinations of any two or more of them, or in combination with other clauses presented herein.

1. A computer-implemented method for suggesting a resource to a second user in responding to a first user, the method comprising:

receiving text of a message between the first user and the second user;

generating a conversation feature vector using a neural network and the text of message;

obtaining a first feature vector corresponding to a first resource;

generating a first score for the first resource using the conversation feature vector and the first feature vector;

obtaining a second feature vector corresponding to a second resource;

generating a second score for the second resource using the conversation feature vector and the second feature vector;

selecting the first resource using the first score and the second score; and causing the first resource to be presented to the second user.

2. The computer-implemented method of clause 1, wherein the first feature vector comprises a topic vector, wherein each element of the topic vector comprises a score corresponding to a topic of a plurality of topics.

3. The computer-implemented method of clause 1, wherein the neural network comprises a recurrent neural network with long short-term memory units.

4. The computer-implemented method of clause 1, generating the first score for the first resource comprises processing the conversation feature vector and the first feature vector with a classifier.

5. The computer-implemented method of clause 4, wherein the classifier comprises a multi-layer perceptron neural network.

6. The computer-implemented method of clause 1, wherein the first user is a customer of a company and the second user is a customer service representative of the company.

7. The computer-implemented method of clause 1, wherein generating the conversation feature vector comprises using an identity of the first user, an identity of the second user, or information about the first user.

8. A system for suggesting a resource to a second user in responding to a first user, the system comprising:

at least one server computer comprising at least one processor and at least one memory, the at least one server computer configured to:

receive text of a message between the first user and the second user;

generate a conversation feature vector using a neural network and the text of message;

obtain a first feature vector corresponding to a first resource;

generate a first score for the first resource using the conversation feature vector and the first feature vector;

obtain a second feature vector corresponding to a second resource;

generate a second score for the second resource using the conversation feature vector and the second feature vector;

select the first resource using the first score and the second score; and cause the first resource to be presented to the second user.

9. The system of clause 8, wherein the at least one server computer is configured to generate the conversation feature vector using text of a plurality of messages between the first user and the second user.

10. The system of clause 8, wherein the at least one server computer is configured to generate the first score for the first resource by computing a distance using the conversation feature vector and the first feature vector.

11. The system of clause 8, wherein the at least one server computer is configured to select the first resource using the first score and the second score by selecting a resource with a highest score.

12. The system of clause 8, wherein the at least one server computer is configured to cause the first resource to be presented to the second user by:

generating HTML using information about the first resource; and inserting the HTML into a web page.

13. The system of clause 12, wherein the presentation of the first resource includes a selectable item, and the at least one server computer is configured to:

receive a selection of the selectable item by the second user; and cause a message to be sent to the first user in response to the selection of the selectable item.

14. The system of clause 8, wherein the at least one server computer is configured to generate the first score for the first resource using an identity of the first user, an identity of the second user, or information about the first user.

15. The system of clause 8, wherein the neural network comprises a recurrent neural network.

16. One or more non-transitory computer-readable media comprising computer executable instructions that, when executed, cause at least one processor to perform actions comprising:

receiving text of a message between the first user and the second user;

generating a conversation feature vector using a neural network and the text of message;

obtaining a first feature vector corresponding to a first resource;

generating a first score for the first resource using the conversation feature vector and the first feature vector;

obtaining a second feature vector corresponding to a second resource;

generating a second score for the second resource using the conversation feature vector and the second feature vector;

selecting the first resource using the first score and the second score; and causing the first resource to be presented to the second user.

17. The one or more non-transitory computer-readable media of clause 16, wherein the first feature vector and the second feature vector are computed before receiving the text of the message between the first user and the second user.

18. The one or more non-transitory computer-readable media of clause 16, wherein the first feature vector is computed using an autoencoder.

19. The one or more non-transitory computer-readable media of clause 16, generating the first score for the first resource comprises processing the conversation feature vector and the first feature vector with a classifier.

20. The one or more non-transitory computer-readable media of clause 16, wherein the classifier comprises a multi-layer perceptron neural network.

Example CSR User Interface

FIGS. 18A-Q illustrate example user interfaces that may be used by a CSR and a customer and that may incorporate the techniques described above.

FIG. 18A illustrates an example user interface (UI) that may be used by a CSR to communicate with one or more customers. The UI of FIG. 18A includes different portions that contain different types of information. For example, FIG. 18A includes a customer list portion 1810 that includes a list of customers who the CSR is currently communicating with. In this example, the CSR is communicating with five different customers, and the customer named Cathy Washington is a selected or active customer. Because Cathy Washington is the selected or active customer, other portions of the UI may show other information relevant to Cathy Washington, such as sequence of messages between Cathy Washington and the CSR.

FIG. 18A also includes a conversation portion 1820 that shows messages between the customer and the CSR. In the example of FIG. 18A, a first message to the customer reads "How can we help you?" This message may be automatically generated for each new customer support session or may be typed by the CSR. The customer responds "I need to pay the bill to my account and cancel the Avengers movie that was billed to me."

In another message, the customer is asked to provide a PIN and an account number. The PIN and account number may be used to allow the CSR access to information from the customer's account. In this example, the PIN is shown as asterisks so that the CSR does not have access to the PIN number.

FIG. 18A also includes an information portion 1830 that may present other information relevant to the customer. In this example, information portion 1830 has three tabs along the bottom that allows a CSR to select between three different types of information. The three tabs are "knowledge base," "customer history," and "customer profile." In FIG. 18A, the customer history tab is selected and information portion 1830 shows a history of events for the selected customer.

FIG. 18B illustrates a possible subsequent UI for the CSR. In FIG. 18B, the CSR has typed a message to the customer, and this message may be seen in conversation portion 1820. Additionally, information portion 1830 now shows the tab for "customer profile" and a suggested resource 1831 for "View Avengers 2" is shown near the top.

The suggested resource 1831 may be selected as described above. Because the customer's message stated that he wants to cancel the Avenger's movie, a suggested resource relating to viewing that particular transaction was selected and presented to the CSR. To identify the movie that the customer wants to cancel, the text of the conversation may be analyzed, such as by using named entity recognition techniques. The purchase history of the customer may also be used to improve the named entity recognition. For example, the customer asked about a refund for "the Avengers movie," but because the customer actually purchased Avengers 2, the recognized named entity is Avengers 2. The resource may then be combined with the identified transaction to suggest a resource to allow the CSR to view the transaction corresponding to the purchase of the Avengers 2 movie.

FIG. 18C illustrates a possible subsequent UI for the CSR, after the CSR has clicked the "View" button corresponding the suggested action to view the Avengers 2 transaction from FIG. 18B. In FIG. 18C, information portion 1830 now shows a list of transactions of the customer including the purchase of the Avengers 2 movie. In FIG. 18C, a popup menu shows possible further actions that may be performed by the CSR. The popup menu may appear automatically as a result of the CSR selecting the View action from FIG. 18B or may be a result of a further action of the CSR, such as clicking or hovering a mouse over the entry for Avengers 2. The popup menu includes a "Refund" button that the CSR may use to provide the customer with a refund.

FIG. 18D illustrates a possible subsequent UI for the CSR, after the CSR has clicked the Refund button from FIG. 18C. In the conversation portion 1820 of FIG. 18D, a new message is shown from the CSR to the customer to inform the customer that the requested refund has been processed. This message may be automatically generated and sent to the customer in response to the CSR clicking the Refund button in FIG. 18C.

The bottom of conversation portion 1820 of FIG. 18D also shows a suggested response 1821 that is an example of the automatic suggestion of responses described above. The text of the conversation between the customer and the CSR may be processed to generate a feature vector that describes the conversation. That feature may then be processed to generate the text of a suggested response as described above. The suggested response here states that the customer has not set up a PIN for purchases and offers to assist the customer in setting up the PIN.

For this example, the suggested response depends on information from a customer profile. This suggested response applies only where the customer has not already set up a PIN for purchases. In some implementations, the generation of a suggested response may use additional features incorporating information from the customer profile. For example, the feature vector processed by classifier 1350 may be augmented with additional features, such as whether the customer has set up a PIN. By incorporating customer profile information as features in suggesting responses to a CSR, more relevant responses may be suggested to a CSR.

For this example, suggested response 1821 also includes information about the customer, the customer's email address. A suggested response may include a special token that indicates a particular type of information, and the token may be replaced by the corresponding information about the customer. For example, a suggested response may include a token ">email address<" and in presenting the suggested response to the CSR, the special token may be replaced with the actual email address of the customer.

FIG. 18E illustrates a possible subsequent UI for the CSR, after the CSR selected the suggested response from FIG. 18D. As a result of the selection of the suggested response, the message is sent to the customer, and accordingly the message appears in conversation portion 1820 of FIG. 18E. Further, the customer has responded that he would like to set up a PIN.

Information portion 1830 of FIG. 18E also includes several resources that a CSR may use. In some implementations, these suggested resources are automatically presented based on processing the text of the conversation between the customer and the CSR. In some implementations, the CSR may search for resources by typing in search bar 1832 at the top of information portion 1830. In this example, the CSR has typed "pin". The text typed be the CSR may be used to search resources database 1610 and present resources that match the search terms. Any appropriate search techniques may be used for performing a search, such as term frequency inverse document frequency algorithms.

FIG. 18F illustrates a possible subsequent UI for the CSR, after the CSR selected "Instructions for PIN setup" from FIG. 18E. In information portion 1830 of FIG. 18F, the CSR has the option of sending the instructions to the customer in three different ways.

FIG. 18G illustrates a possible subsequent UI for a CSR, after the CSR selected to send the instructions via email from FIG. 18F. In FIG. 18G, the CSR has also sent a message to the customer to inform the customer that the PIN setup instructions have been sent and that the refund for Avengers 2 has been processed.

Information portion 1830 of FIG. 18G also shows another suggested resource 1833. After processing the most recent messages, the suggested resource allows the CSR to request payment from the customer within the customer support session.

FIG. 18H illustrates an example UI that may be used by the customer in communicating with the CSR. In some implementations, the UI of FIG. 18H may be generated by a special purpose application created by the company (e.g., a smartphone app). UI 1840 shows the UI with the most recent messages between the customer and the CSR and a pay button that was sent to the customer in response to the CSR selecting the request payment button from suggested resource 1833. In FIG. 18H, the customer may activate the pay button in UI 1840 (e.g., by touching it), authorize payment in US 1841 (e.g., using a fingerprint sensor to authorize payment), and see confirmation that payment was received in UI 1842.

FIG. 18I illustrates a possible subsequent UI for the CSR after processing the customer's payment. In FIG. 18I, information portion 1830 indicates that payment from the customer has been processed. Also in FIG. 18I, a message has been sent to the customer to thank the customer for making the payment. This message may be automatically sent in response to receiving the payment and need not be typed by the CSR.

At the bottom of conversation portion 1820 in FIG. 18I is a text entry box 1822 where the CSR may type messages to be sent to the customer. FIG. 18I illustrates an example of providing a suggested automatic completion to the text typed by the CSR. In this example, the CSR has typed "You're very welcome! It's". The suggested completion, "been my pleasure to help," is presented afterwards. This suggested completion may be determined using the techniques described above. The CSR may select the completion to use it and send the completed message to the customer.

FIG. 18J illustrates a possible subsequent UI for the CSR after the CSR has sent a message using the suggested completion. The completed message has been sent to the customer as can be seen in conversation portion 1820 of FIG. 18J.

The CSR may now be finished assisting this customer and may assist another customer. The CSR may select another customer from customer list portion 1810, and FIG. 18K illustrates a possible subsequent UI for the CSR after selecting the customer Ray Jackson.

In FIG. 18K, the customer has sent the message "Starting from 2 weeks ago, my internet started being really slow for no reason." After processing the text of the conversation, a suggested resource 1834 is presented in information portion 1830. Since the customer is having problems with an Internet connection, the suggested resource allows the CSR to start a trouble shooting tree to assist the customer in fixing the problem.

Figure 18L:
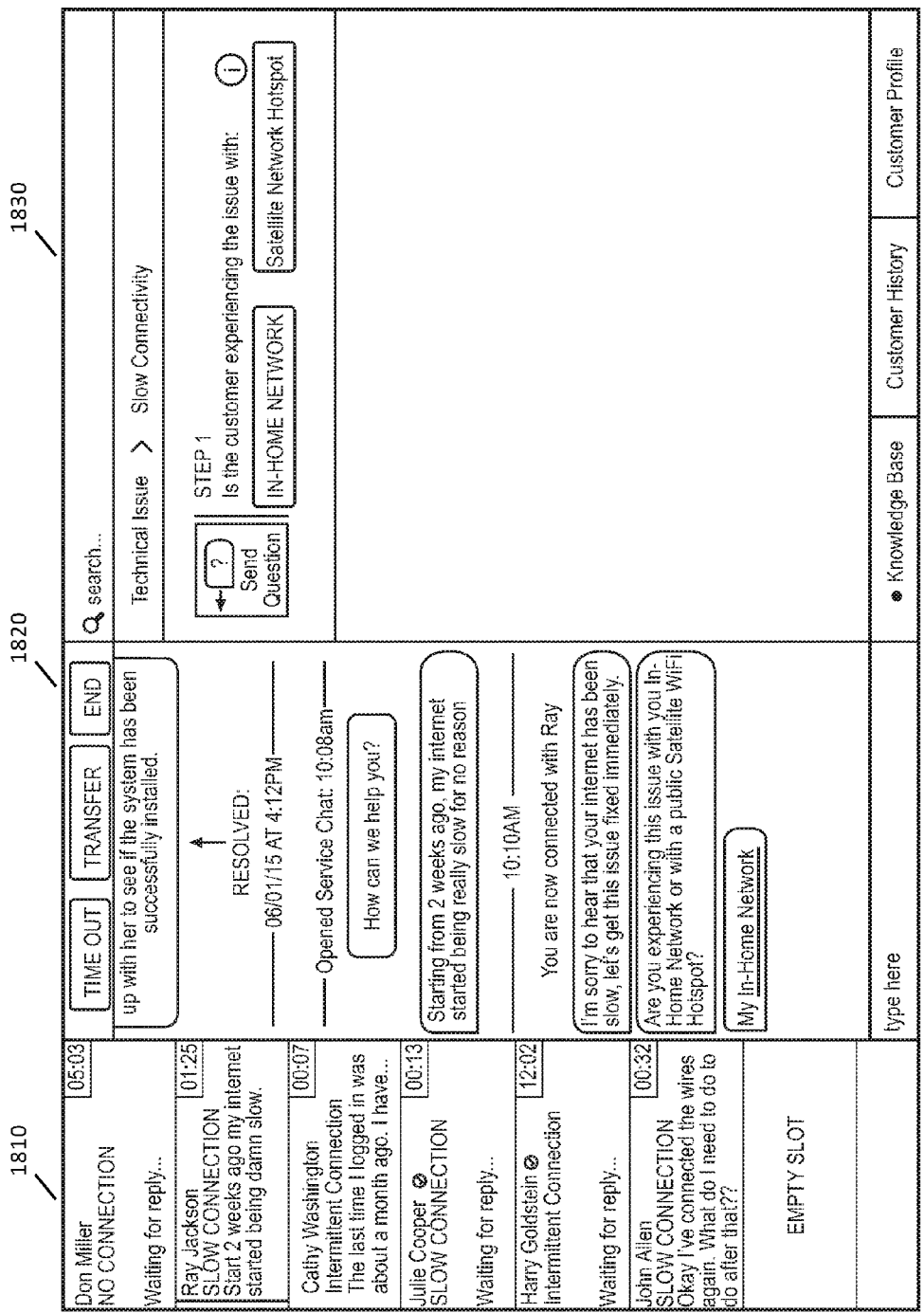

FIG. 18L illustrates a possible subsequent UI for the CSR after the CSR has selected the Start button from FIG. 18K to start using the trouble shooting tree. In FIG. 18L, the first step of the trouble shooting tree is to ask the customer if the problem is with the in-home network or a Wi-Fi hotspot. The CSR may select the Send Question button from information portion 1830 to send this question to the customer.

In some implementations, the question may be sent to the customer as text, and the customer may respond by typing a response. In some implementations, sending the question to the customer may cause buttons (or some other user interface element) to appear in the UI of the customer's device. Accordingly, the customer may be able answer the question by selecting the appropriate button. In FIG. 18L, the conversation portion indicates that the customer has responded by indicating that the problem is with the in-home network.

Figure 18M:
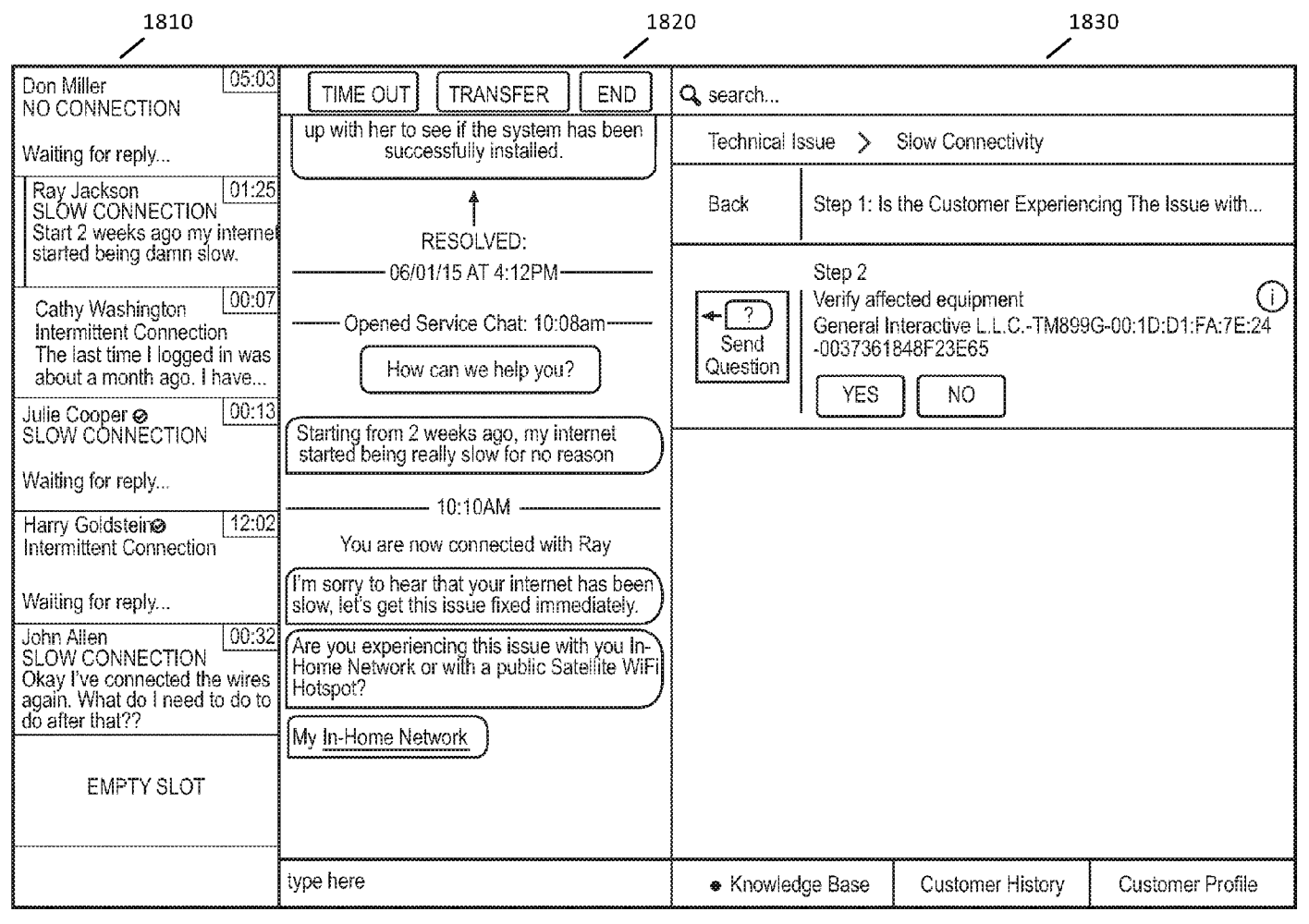

FIG. 18M illustrates a possible subsequent UI for the next step of the troubleshooting tree. This UI may be displayed in response to the CSR selecting the In-Home Network button from information portion 1830 of FIG. 18L. In FIG. 18M, the step of the troubleshooting tree relates to confirming the customer's equipment, and the CSR may again send the question to the customer by clicking the Send Question button. Conversation portion 1820 of FIG. 18M shows that the question has been sent to the customer and that the customer has responded with a serial number of her equipment.

Figure 18N:
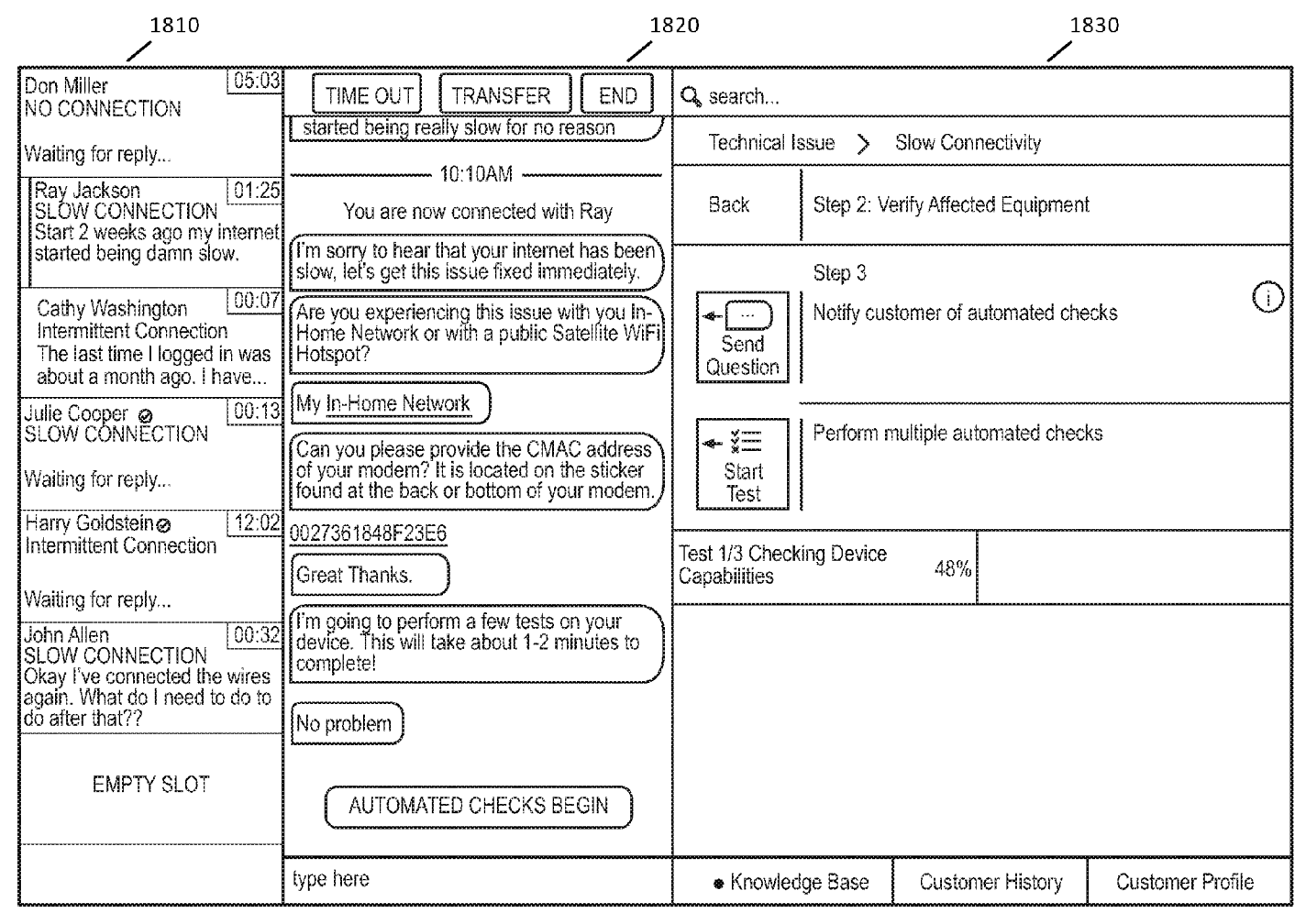

FIG. 18N illustrates a possible subsequent UI for the next step of the troubleshooting tree. This UI may be displayed in response to the CSR selecting the Yes button from information portion 1830 of FIG. 18M. The next step of the troubleshooting relates to performing automated checks. Information portion 1830 of FIG. 18N includes a button to allow the CSR to send a message to the customer to inform her that the CSR will be initiating automated checks and another button to start the automated checks. In FIG. 18N, the CSR has selected both buttons, and a corresponding message is sent to the customer as shown in conversation portion 1820 and the automated checks are in progress as shown by the progress bar in information portion 1830.

Figure 18O:
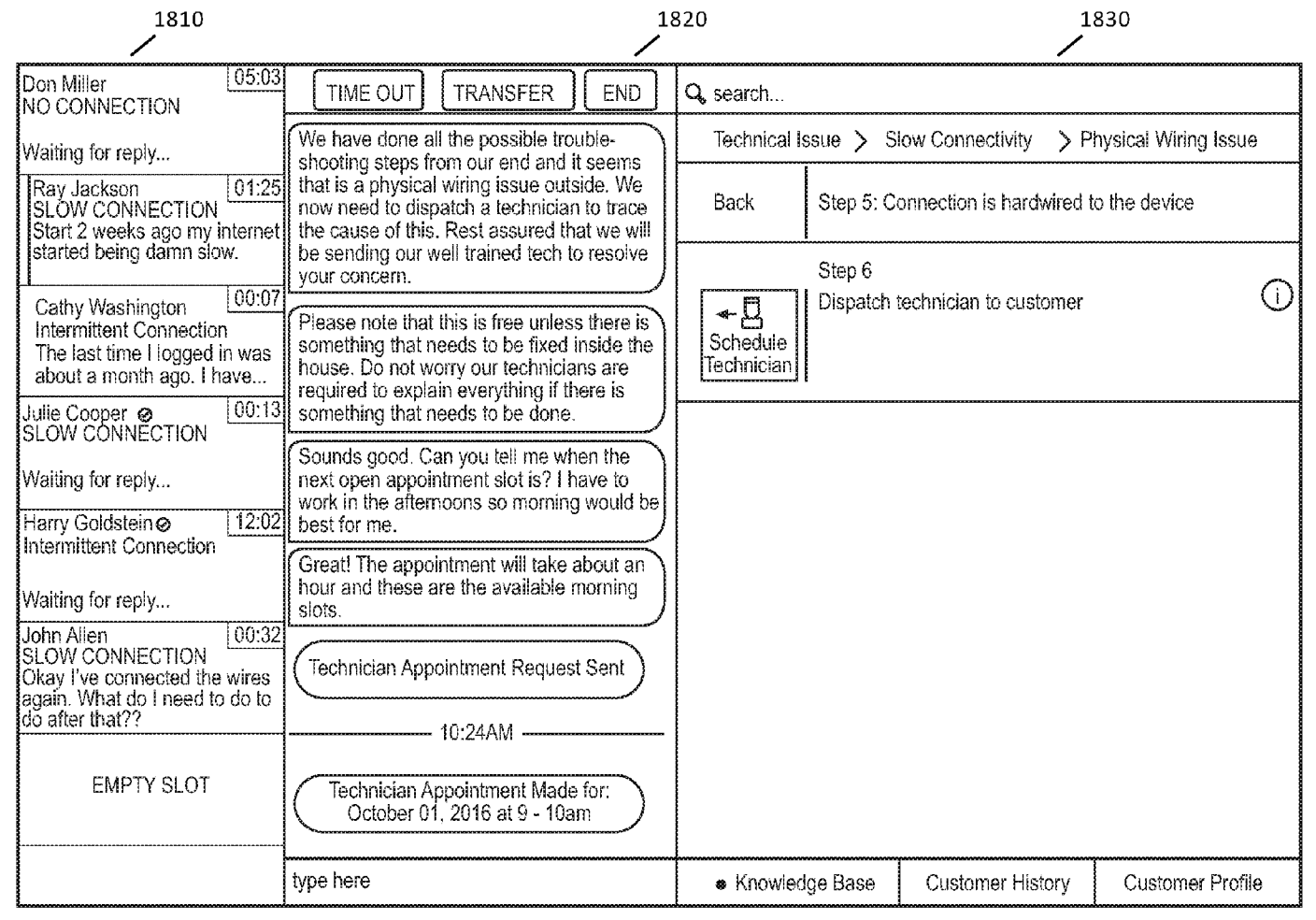

FIG. 18O illustrates a possible subsequent UI for the CSR after the automated checks have been performed. For this example, the result of the automated checks is that a technician needs to be sent to the customer's house. Messages informing the customer of the results of the checks and that a technician is needed may be automatically sent to the customer and examples of such messages are shown in conversation portion 1820 of FIG. 18O.

Information portion 1830 of FIG. 18O also includes a button to allow the CSR to schedule an appointment for the technician with the customer. In some implementations, pressing this button will send a message to the customer with information about open slots for appointments, and the customer may respond by typing to indicate a desired appointment. In some implementations, a UI may be presented to the customer to facilitate the selection of appointment.

Figure 18P:
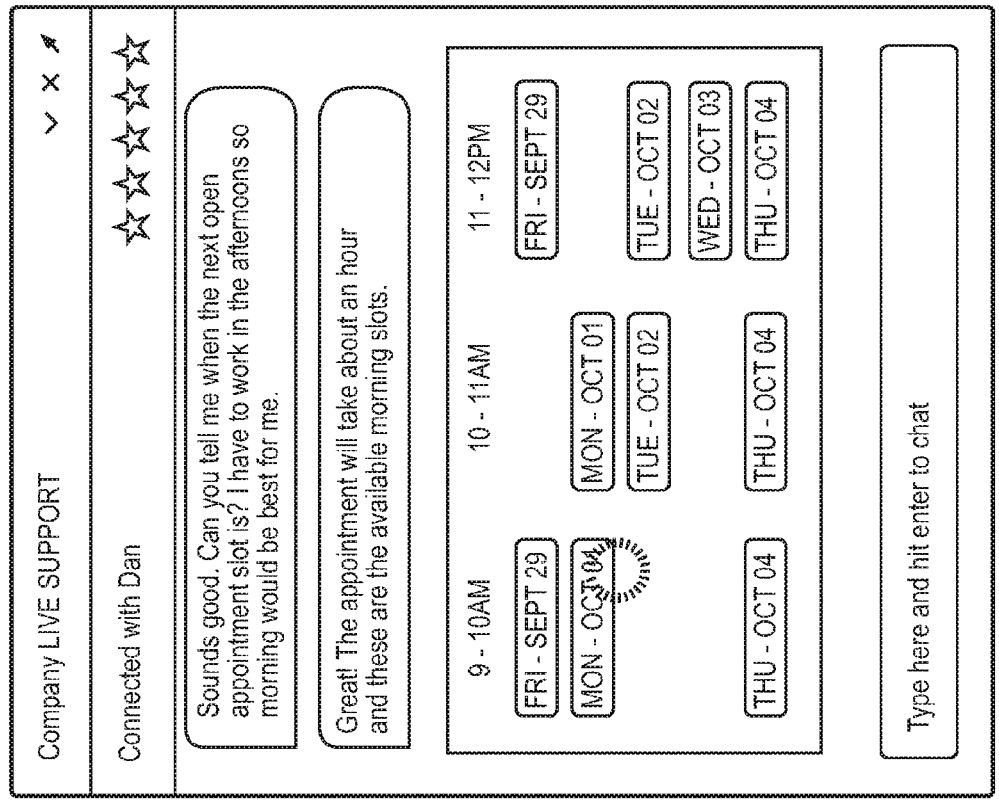
Figure 18Q:
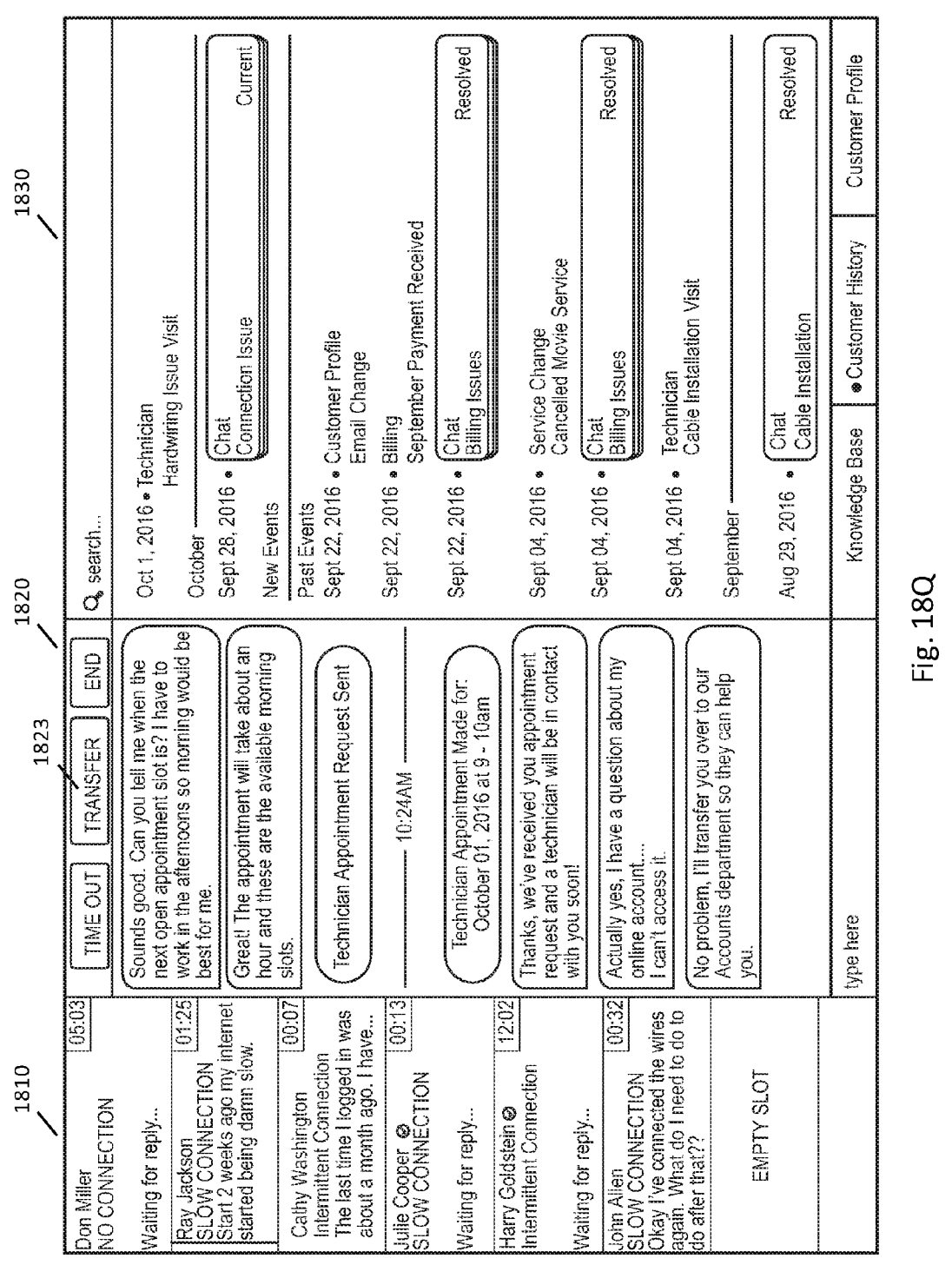

FIG. 18P illustrates an example UI that may be presented to a customer to allow the customer to select an appointment time for a technician. In this example, available dates and times for appointments are shown and the customer may select an available appointment. After the customer has made a selection, the selected appointment may appear in the CSR UI as shown in the conversation portion 1820 of FIG. 18O.

FIG. 18Q illustrates a possible subsequent UI for the CSR after additional messages have been sent between the customer and the CSR. Here, the customer would like additional assistance with her online account. In some implementations, a company may have CSRs with different specialties, and thus a CSR who assists with technical support may be different from a CSR who assists with online accounts. In this example, the CSR may use the transfer button 1823 to transfer the customer to another CSR who can assist the customer with her online account.

Third-Party Semantic Processing Service

Figure 19A:
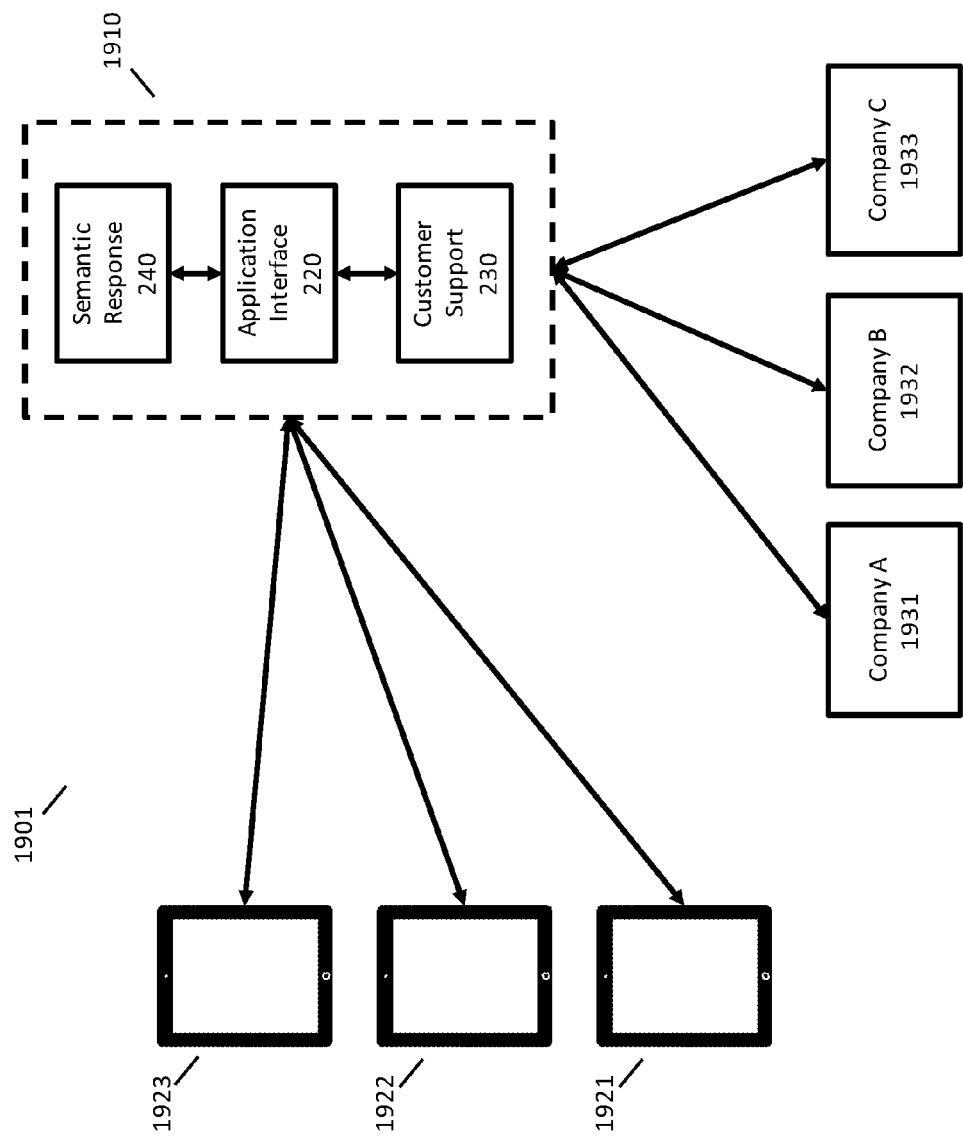
Figure 19C:
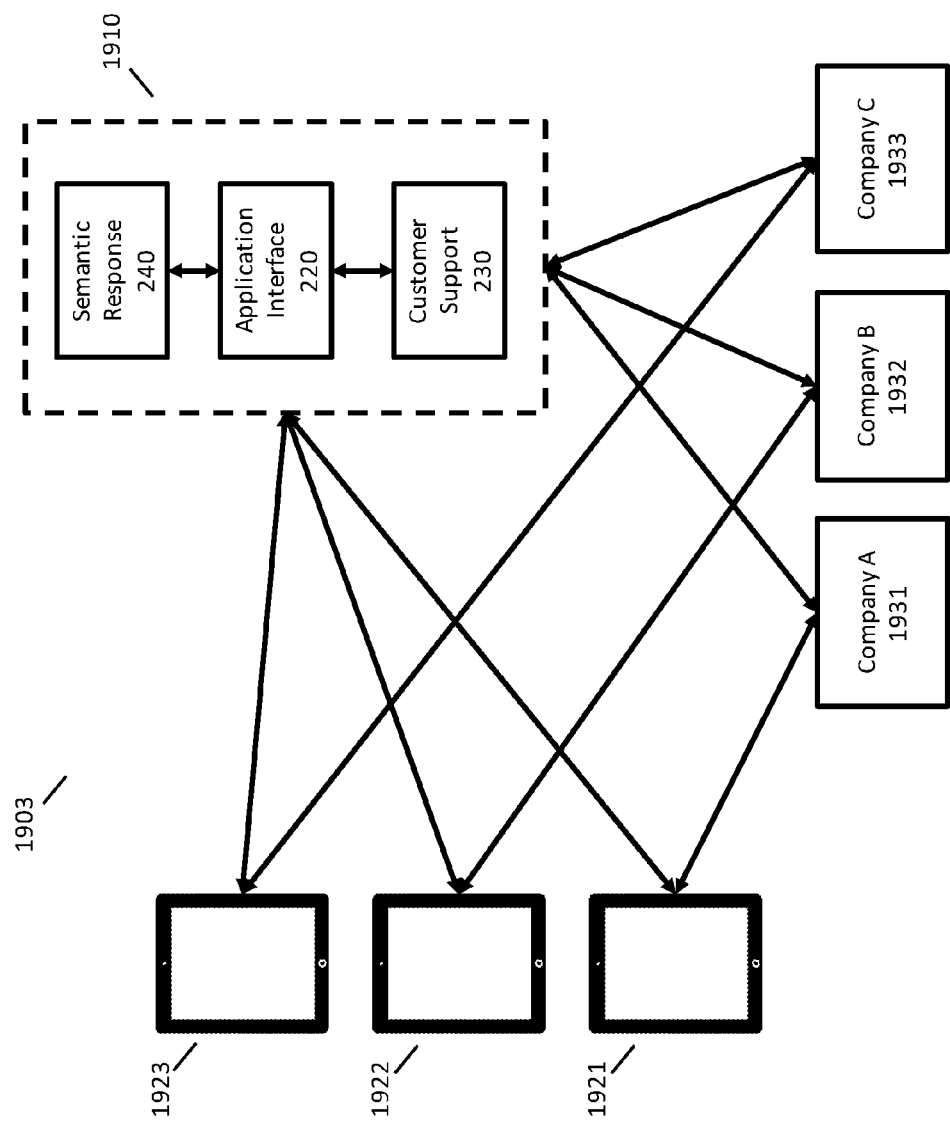

In some implementations, the above techniques and services may be provided directly by a company to its customers to improve customer service and reduce customer service expenses. Some companies, however, may desire to provide such services to their customers but may prefer to use a solution provided by a third party. For example, smaller companies may find it more cost effective to use a third party service than to build their own services for performing semantic processing. FIGS. 19A-C illustrate three different architectures that may be used by a third party to provide semantic processing services.

FIG. 19A illustrates a system 1901 that allows a third party to provide semantic processing services to multiple companies where the third party is an intermediary between the customer and the company for all communications between the customer and the company. In FIG. 19A, three customers are interacting with three different companies. Customer device 1921 is interacting with company 1931, customer device 1922 is interacting with company 1932, and customer device 1923 is interacting with company 1933.

A customer may interact with the third party service using any of the communication methods described above. For example, a customer may be using a website or app provided by the company, may be using a website or app provided by the third party, may be sending a message to an email address or phone number associated with the company, or may be sending a message to an email or phone number associated with the third party. From the perspective of the customer, it may or may not be apparent that the customer is interacting with the company via a third party instead of directly with the company.

For automatic processing of requests, the request of the customer may be sent to the third party instead of to the company. The third party may receive the customer's request, perform the processing described above to determine an automated response, and send the automated response back to the customer. For example, the third party may implement an application interface component 220 to receive the customer's request and may implement a semantic response component 240 to determine a response to the customer's request.

The techniques described above for using semantic processing to respond to a customer request used one or more of an action graph, node classifiers, customer data, other data, and action classifiers. In some implementations, all needed information for responding to a customer request may be stored by servers controlled by the third party and the third party may not need to request such information from a company.

In some implementations, some of the needed information for responding to a customer request may be stored by servers of the company instead of servers of the third party. For example, a company may not want to allow a third party to store copies of large amounts of customer data. Where a company stores some of the information needed to respond to a customer request, servers of the third party may send requests for information to servers of a company. For example, a company may have an API (e.g., a REST API) that allows the third party to obtain needed information. Accordingly, FIG. 19 includes network connections between the third party and each of the companies.

In some implementations, the third party may implement some or all aspects of the CSR user interface described above. For example, a CSR working on behalf of a company may provide customer service to customer by logging in to a web site provided by the third party. After logging in to the third party website, the CSR may see a UI similar to FIG. 18A.

The third party may relay messages between the customer and the CSR. For example, the third party may receive a message from a customer and cause it to be displayed in the UI used by the CSR. Similarly, the third party may receive a message from the CSR and cause it to be displayed on a UI of the customer's device.

The third party may assist the CSR by providing one or more of the semantic processing services described above. For example, the third party may process the messages transmitted between the customer and CSR (and possibly other information as described above) and provide automatic completions to the CSR, provide suggestions of responses to the CSR, and automatically suggest resources to assist the CSR.

A third party may also provide semantic processing services to companies without communicating directly with customers. FIG. 19B illustrates a system 1902 that allows a third party to provide semantic processing services to multiple companies where the third party communicates with the company but does not communicate directly in the customer. In FIG. 19A, the customer devices now have network connections with the corresponding companies but not directly with the third party.

To use the semantic processing services of the third party, a company may issue requests to servers of the third party. For example, the third party may provide an API (e.g., a REST API) via its servers to allow the company to use the semantic processing services.

A company may receive a request from a customer and desire to use semantic processing to provide an automatic response. The company may have its servers issue a request to servers of the third party to determine a response. In some implementations, the request from the company to the third party may include all information needed for the third party to determine a response, such as the text of the request, previous messages between the customer and the company, or any of the other information described above. In some implementations, the servers of the third party may request information from servers of the company in performing processing to determine an automatic response.

To use semantic processing to assist CSRs with automatic completion, automatic suggestion of responses, and automatic suggestion of resources, the company servers may again send requests to servers of the third party to perform the requested semantic processing. The request may include all needed information or servers of the third party may request needed information from the company.

A third party may also provide semantic processing services to companies using a combination of the techniques described above. FIG. 19C illustrates a system 1903 that allows a third party to provide semantic processing services to multiple companies where the customer devices may communicate directly with both the company and the third party. In FIG. 19C, the customer devices now have network connections with both the corresponding companies and the third party.

Where the customer devices are connected to both the company and the third party, each of the two connections may be used for different kinds of requests. For example, where the customer is interacting with the company in a way that does not require semantic processing (e.g., navigating a web site or an app), the customer device may use the connection with the company. Where the customer is interacting with the company in a way that semantic processing may facilitate the interaction, the connection with the third party may be used.

Any combination of the above architectures may be used. For example, for automatic responses to customer requests, the customer device may use the connection with the third party, but for a customer support session, the customer may use the connection with the company, and the company server can make semantic processing requests to the servers of the third party as needed (e.g., for automatic completion, automatic suggestion of responses, or automatic suggestion of resources with CSRs).

Figure 20:
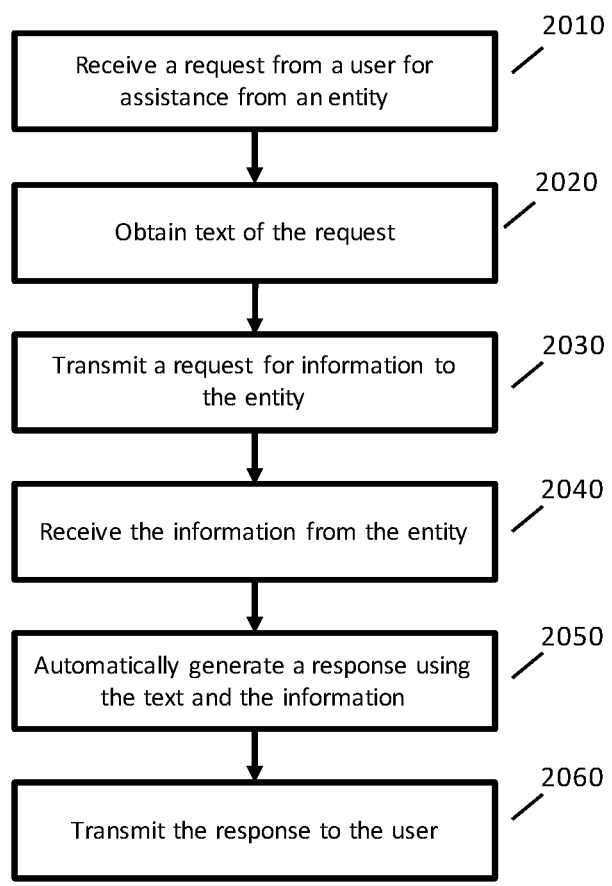
FIG. 20 is a flowchart of an example implementation of providing a semantic processing service.

FIG. 20 is a flowchart of an example implementation of a semantic processing service. In FIG. 20, the ordering of the steps is exemplary and other orders are possible, not all steps are required and, in some implementations, some steps may be omitted or other steps may be added. The process of the flowcharts may be implemented, for example, by any of the computers or systems described herein.

At step 2010, a request is received from a user (e.g., a customer) for assistance from an entity. As used herein, an entity may refer to an individual, a company (e.g., a corporation or a limited liability company), or any collection of individuals (e.g., a partnership). The request may be received from the user, such as a device of the user or may be received from the entity, where the entity previously received the request from the user. The user may transmit the request using any of the techniques described above (e.g., using a web page or app or sending a text message). The request may include any request that may be expressed in natural language, such as a request for information (e.g., when a package is being delivered) or a request for an action to be performed (e.g., changing the user's address).

At step 2020, text of the request is obtained. For example, the text may be extracted from the request or speech recognition may be performed to obtain text from an audio signal.

At step 2030, a request for information is transmitted to the entity. For example, the request for information may be transmitted from a server of the third-party service provider to a server of the entity where the request is in the form of a REST API request. The information requested may include any of the information described above that may be used to provide a response using semantic processing. The request may include information about the user, such as a user ID number or an authentication token.

At step 2040, the first information is received from the entity.

At step 2050 a response to the request is generated using the text and the information. The response may be generated using any of the techniques described above, such as a selecting a node from an action graph using a node selector classifier and/or selecting an action using an action selector classifier. The response may be formatted using any appropriate techniques, such as in the form of text, structured data (e.g., XML or JSON), or presented as HTML.

At step 2060, the response is transmitted to the user. In some implementations, the response may be transmitted directly to the user, such as by transmitting the response to a device of the user. In some implementations, the response may be transmitted to the user via the entity.

In some implementations, semantic processing services may be provided as described in the following clauses, combinations of any two or more of them, or in combination with other clauses presented herein.

1. A computer-implemented method for assisting entities in responding to users, the method comprising:
receiving a first request from a first user, wherein the first request seeks assistance from a first entity;
obtaining first text corresponding to the first request;
transmitting a first request for first information to a first server of the first entity;
receiving the first information from the first entity;
automatically generating a first response using the first text and the first information;
transmitting the first response to the first user;
receiving a second request from a second user, wherein the second request seeks assistance from a second entity;
obtaining second text corresponding to the second request;
transmitting a second request for second information to a second server of the second entity;
receiving the second information from the second entity;
automatically generating a second response using the second text and the second information; and
transmitting the second response to the second user.

2. The computer-implemented method of clause 1, wherein the first request comprises information identifying the first user.

3. The computer-implemented method of clause 1, wherein the first information comprises information about the first user.

4. The computer-implemented method of clause 1, wherein the first user is a customer of the first entity and the second user is a customer of the second entity.

5. The computer-implemented method of clause 1, wherein automatically generating the first response comprises processing the first text with a neural network.

6. The computer-implemented method of clause 1, wherein automatically generating the first response comprises selecting a first node from a first action graph, and generating the second response comprises selecting a second node from a second action graph.

7. The computer-implemented method of clause 1, wherein the first request is received from a first device of the first user and the first response is transmitted to the first device of the first user.

8. A system for assisting entities in responding to users, the system comprising:
at least one server computer comprising at least one processor and at least one memory, the at least one server computer configured to:
receive a first request from a first user, wherein the first request seeks assistance from a first entity;
obtain first text corresponding to the first request;
transmit a first request for first information to a first server of the first entity;
receive the first information from the first entity;
automatically generate a first response using the first text and the first information;
transmit the first response to the first user;
receive a second request from a second user, wherein the second request seeks assistance from a second entity;
obtain second text corresponding to the second request;
transmit a second request for second information to a second server of the second entity;
receive the second information from the second entity;
automatically generate a second response using the second text and the second information; and
transmit the second response to the second user.

9. The system of clause 8, wherein the first information comprises information about the first user.

10. The system of clause 8, wherein the at least one server computer is configured to automatically generate the first response by processing the first text with a neural network.

11. The system of clause 8, wherein the at least one server computer is configured to automatically generate the first response by selecting a first node from a first action graph, and automatically generate the second response by selecting a second node from a second action graph.

12. The system of clause 8, wherein the at least one server computer is configured to automatically generate the first response by selecting a first node from a first action graph using a first classifier.
13. The system of clause 12, wherein the first classifier comprises a logistic regression classifier.
14. The system of clause 8, wherein the first request is received from the first entity and the first response is transmitted to the first entity.
15. One or more non-transitory computer-readable media comprising computer executable instructions that, when executed, cause at least one processor to perform actions comprising:
    receiving a first request from a first user, wherein the first request seeks assistance from a first entity;
    obtaining first text corresponding to the first request;
    transmitting a first request for first information to a first server of the first entity;
    receiving the first information from the first entity;
    automatically generating a first response using the first text and the first information;
    transmitting the first response to the first user;
    receiving a second request from a second user, wherein the second request seeks assistance from a second entity;
    obtaining second text corresponding to the second request;
    transmitting a second request for second information to a second server of the second entity;
    receiving the second information from the second entity;
    automatically generating a second response using the second text and the second information; and
    transmitting the second response to the second user.
16. The one or more non-transitory computer-readable media of clause 15, wherein the first information comprises information about the first user.
17. The one or more non-transitory computer-readable media of clause 15, wherein automatically generating the first response comprises processing the first text with a neural network.
18. The one or more non-transitory computer-readable media of clause 15, wherein automatically generating the first response comprises selecting a first node from a first action graph, and generating the second response comprises selecting a second node from a second action graph.
19. The one or more non-transitory computer-readable media of clause 15, wherein automatically generating the first response comprises selecting a first node from a first action graph using a first classifier.
20. The one or more non-transitory computer-readable media of clause 15, wherein the first classifier comprises a logistic regression classifier.

Figure 21:
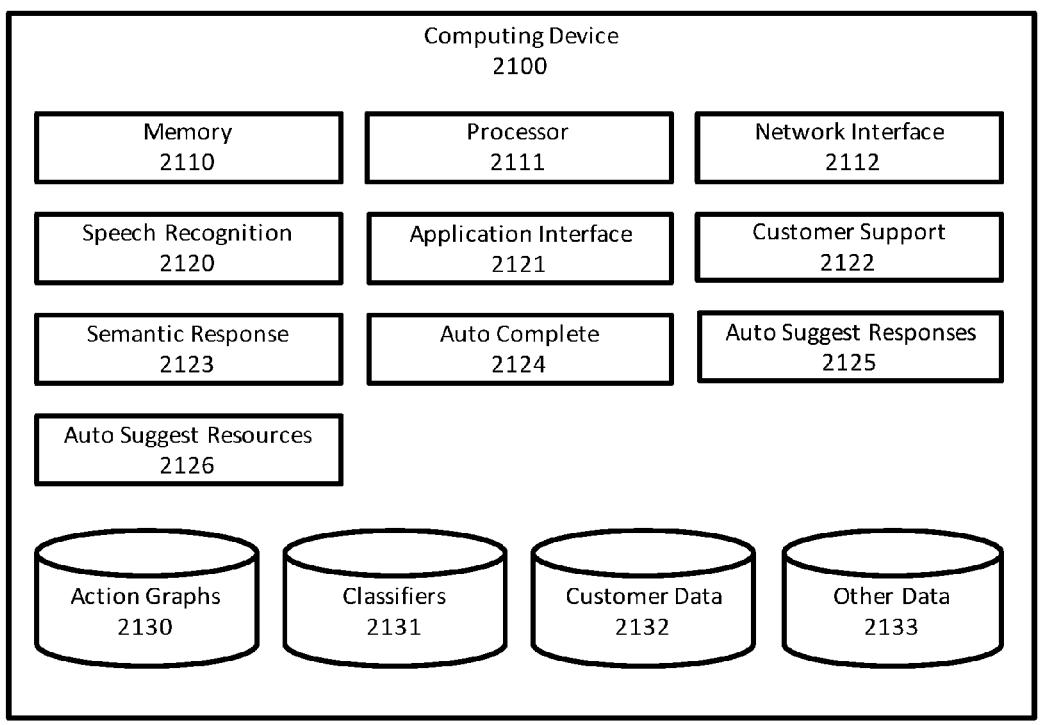
FIG. 21 is an exemplary computing device that may be used to perform semantic processing.

FIG. 21 illustrates components of one implementation of a computing device 2100 for implementing any of the techniques described above. In FIG. 21, the components are shown as being on a single computing device 2100, but the components may be distributed among multiple computing devices, such as a system of computing devices, including, for example, an end-user computing device (e.g., a smart phone or a tablet) and/or a server computing device (e.g., cloud computing).

Computing device 2100 may include any components typical of a computing device, such as volatile or nonvolatile memory 2110, one or more processors 2111, and one or more network interfaces 2112. Computing device 2100 may also include any input and output components, such as displays, keyboards, and touch screens. Computing device 2100 may also include a variety of components or modules providing specific functionality, and these components or modules may be implemented in software, hardware, or a combination thereof. Below, several examples of components are described for one example implementation, and other implementations may include additional components or exclude some of the components described below.

Computing device 2100 may have a speech recognition component 2120 that processes an audio signal containing speech to obtain text corresponding to the speech. Computing device 2100 may have an application interface component 2121 that may implement any processing needed to receive information from other computers or to transmit information to other computers (e.g., load balancers, web servers, etc.). Application interface component 2121 may also facilitate communications between other components. For example, application interface component 2121 may receive audio of a request, cause speech recognition to be performed, and then transmit the text to other components. Computing device 2100 may have a customer support component 2123 that facilitates customer support sessions between customers and CSRs. For example, customer support component 2123 may provide a user interface for the customer and/or the CSR and may facilitate the exchange of messages. Computing device 2100 may have a semantic response component 2123 that may facilitate providing automatic responses to customer requests using semantic processing as described above. Computing device 2100 may have an auto complete component 2124 that uses semantic processing to provide suggestions for completions of text the CSRs have started typing as described above. Computing device 2100 may have an auto-suggest responses component 2125 that uses semantic processing to provide suggested responses to CSRs as described above. Computing device 2100 may have an auto-suggest resources component 2126 that uses semantic processing to suggest resources to CSRs as described above.

Computing device 2100 may include or have access to various data stores, such as data stores 2130, 2131, 2132, and 2133. Data stores may use any known storage technology such as files or relational or non-relational databases. For example, computing device 2100 may have an action graphs data store 2130 to store the action graphs described above. Computing device 2100 may have a classifiers data store 2131 that may store information about any of the classifiers described above. Computing device 2100 may have customer data data store 2132 that may be used to store any relevant information about customers. Computing device 2100 may have an other data data store 2133 that may be used to store any other relevant data that may be used in performing the semantic processing tasks described above, such as a company knowledge base or information about the operation of company services (e.g., network outages).

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon.

Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer-implemented method for suggesting a completion to text entered by a user on a computing device, the method comprising:
   receiving, at a sever, text of a message from a first computing device of a first user;
   computing a topic vector using the text of the message from the first computing device, wherein each element of the topic vector comprises a score corresponding to a topic of a plurality of topics;

causing the message to be presented by a second computing device to a second user;

receiving text from the second computing device entered by the second user;

computing a first feature vector using the topic vector and the text entered by the second user;

identifying a first plurality of characters to follow the text entered by the second user by processing, by the server, the first feature vector, wherein the first plurality of characters comprises a first character;

computing a second feature vector using the topic vector and the first character;

identifying a second plurality of characters to follow the first character by processing, by the server, the second feature vector, wherein the second plurality of characters comprises a second character;

generating a suggested completion to the text entered by the second user, the suggested completion comprising the first character and the second character, and transmitting the suggested completion to the second computing device for presenting to the second user.

2. The computer-implemented method of claim 1, wherein computing the topic vector comprises using text of a second message between the first user and the second user.

3. The computer-implemented method of claim 1, wherein computing the first feature vector comprises using a neural network.

4. The computer-implemented method of claim 3, wherein the neural network comprises a recurrent neural network with long short-term memory units.

5. The computer-implemented method of claim 1, wherein identifying the first plurality of characters comprises processing the first feature vector with a classifier.

6. The computer-implemented method of claim 5, wherein the classifier comprises a logistic regression classifier.

7. The computer-implemented method of claim 1, wherein the first user is a customer of a company and the second user is a customer service representative of the company.

8. A system for suggesting a completion to text entered by a user on a computing device, the system comprising:

at least one server computer comprising at least one processor and at least one memory, the at least one server computer configured to:

receive, at the server, text of a message from a first computing device of a first user;

compute a topic vector using the text of the message from the first computing device, wherein each element of the topic vector comprises a score corresponding to a topic of a plurality of topics;

cause the message to be presented by a second computing device to a second user;

receive text from the second computing device entered by the second user;

compute a first feature vector using the topic vector and the text entered by the second user;

identify a first plurality of characters to follow the text entered by the second user by processing, by the server, the first feature vector, wherein the first plurality of characters comprises a first character;

compute a second feature vector using the topic vector and the first character;

identify a second plurality of characters to follow the first character by processing, by the server, the second feature vector, wherein the second plurality of characters comprises a second character;

generate a suggested completion to the text entered by the second user, the suggested completion comprising the first character and the second character, and transmit the suggested completion to the second computing device for presenting to the second user.

9. The system of claim 8, wherein the at least one server computer is configured to compute the first feature vector using a neural network.

10. The system of claim 8, wherein the at least one server computer is configured to compute the first feature vector by:

computing a sequence of 1-hot vectors using the text entered by the second user;

computing a sequence of input vectors by combining each of the 1-hot vectors with the topic vector; and processing the sequence of input vectors with a neural network.

11. The system of claim 8, wherein the at least one server computer is configured to generate the suggested completion by creating a graph, wherein the first character corresponds to a first node of the graph and the second character corresponds to a second node of the graph.

12. The system of claim 11, wherein the at least one server computer is configured to generate the suggested completion by selecting the suggested completion using a beam search algorithm and the graph.

13. The system of claim 8, wherein the at least one server computer is configured to:

present the suggested completion to the second user;

receive a selection of the suggested completion by the second user;

transmit a message to the first user, the transmitted message comprising the suggested completion.

14. The system of claim 8, wherein the at least one server computer is configured to generate a second suggested completion to the text entered by the second user, the second suggested completion comprising the first character and the second character.

15. One or more non-transitory computer-readable media comprising computer executable instructions that, when executed, cause at least one processor to perform actions comprising:

receiving, at a server, text of a message from a first computing device of a first user;

computing a topic vector using the text of the message from the first computing device, wherein each element of the topic vector comprises a score corresponding to a topic of a plurality of topics;

causing the message to be presented by a second computing device to a second user;

receiving text from the second computing device entered by the second user;

computing a first feature vector using the topic vector and the text entered by the second user;

identifying a first plurality of characters to follow the text entered by the second user by processing, by the server, the first feature vector, wherein the first plurality of characters comprises a first character;

computing a second feature vector using the topic vector and the first character;

identifying a second plurality of characters to follow the first character by processing, by the server, the second feature vector, wherein the second plurality of characters comprises a second character;

generating a suggested completion to the text entered by the second user, the suggested completion comprising the first character and the second character, and transmitting the suggested completion to the second computing device for presenting to the second user.

16. The one or more non-transitory computer-readable media of claim 15, wherein computing the topic vector comprises using an autoencoder.

17. The one or more non-transitory computer-readable media of claim 15, wherein computing the first feature vector comprises using a neural network.

18. The one or more non-transitory computer-readable media of claim 17, wherein the neural network comprises a recurrent neural network.

19. The one or more non-transitory computer-readable media of claim 15, wherein identifying the first plurality of characters comprises processing the first feature vector with a classifier.

20. The one or more non-transitory computer-readable media of claim 19, wherein the classifier comprises a logistic regression classifier.

\* \* \* \* \*

UNITED STATES PATENT AND TRADEMARK OFFICE
CERTIFICATE OF CORRECTION

PATENT NO. : 9,807,037 B1
APPLICATION NO. : 15/254041
DATED : October 31, 2017
INVENTOR(S) : Gustavo Sapoznik et al.

Page 1 of 2

It is certified that error appears in the above-identified patent and that said Letters Patent is hereby corrected as shown below:

On the Title Page

Item (56), in Column 2, under "Other Publications", Line 2, delete "hilp:" and insert -- http: --, therefor.

On page 2, in Column 1, under "Other Publications", Line 16, delete "deepleaming." and insert -- deeplearning. --, therefor.

On page 2, in Column 1, under "Other Publications", Line 22, delete "Courbarius," and insert -- Courbariaux, --, therefor.

On page 2, in Column 2, under "Other Publications", Line 7, delete "Leaming" and insert -- Learning --, therefor.

In the Specification

In Column 18, Line 34, delete "Knesser" and insert -- Kneser --, therefor.

In Column 20, Lines 26-32, delete "
$$g_t^1 = \sigma(U_1 x_1 + V_1 h_{t-1} + b_1)$$
$$g_t^2 = \sigma(U_2 x_1 + V_2 h_{t-1} + b_2)$$
$$g_t^3 = \sigma(U_3 x_1 + V_3 h_{t-1} + b_3)$$
$$g_t^4 = tanh(U_4 x_1 + V_4 h_{t-1} + b_4)$$
,, Signed and Sealed this
Twenty-seventh Day of March, 2018

Andrei Iancu
*Director of the United States Patent and Trademark Office*

CERTIFICATE OF CORRECTION (continued)
U.S. Pat. No. 9,807,037 B1 and insert --
$$g_t^1 = \sigma(U_1 x_t + V_1 h_{t-1} + b_1)$$
$$g_t^2 = \sigma(U_2 x_t + V_2 h_{t-1} + b_2)$$
$$g_t^3 = \sigma(U_3 x_t + V_3 h_{t-1} + b_3)$$
$$g_t^4 = tanh(U_4 x_t + V_4 h_{t-1} + b_4)$$
--, therefor.

In Column 28, Line 4, delete "$h_t^{response}$" and insert -- $h_t^{response}$, --, therefor.

In Column 48, Line 48, delete "an other data data" and insert -- another data --, therefor.

In the Claims

In Column 52, Line 64, delete "sever," and insert -- server, --, therefor.